CAR ROUTING SYSTEM FOR RAILROADS

Filed Dec. 26, 1958 60 Sheets-Sheet 1

INVENTORS
D. BLAISDELL AND
H. C. KENDALL
BY
Forest B. Hitchcock
THEIR ATTORNEY

AUTOMATIC READ-OUT PROGRAMMING UNIT FOR ROUTING MEMORY

INVENTORS
D. BLAISDELL AND
H. C. KENDALL
BY Forest B. Hitchcock
THEIR ATTORNEY

INVENTORS
D. BLAISDELL AND
H. C. KENDALL
BY *Forest B. Hitchcock*
THEIR ATTORNEY INVENTORS
D. BLAISDELL AND
H. C. KENDALL
BY Forest B. Hitchcock
THEIR ATTORNEY

CONTROL PANEL FOR ADDRESS READ-OUT PROGRAMMING UNIT

REFER TO FIG. 23 FOR WIRING OF APPARATUS

INVENTORS
D. BLAISDELL AND
H.C. KENDALL
BY Forest B. Hitchcock
THEIR ATTORNEY

TYPICAL HYSTERESIS LOOP OF FERRITE CORE

INVENTORS
D. BLAISDELL AND
H. C. KENDALL

BY Forest B. Hitchcock

THEIR ATTORNEY

INVENTORS
D.BLAISDELL AND
H.C.KENDALL
BY Forest B. Hitchcock
THEIR ATTORNEY

CAR ROUTING SYSTEM FOR RAILROADS

Filed Dec. 26, 1958 60 Sheets-Sheet 8

INVENTORS
D. BLAISDELL AND
H.C. KENDALL
BY Forest B. Hitchcock
THEIR ATTORNEY

CAR ROUTING SYSTEM FOR RAILROADS

INVENTORS
D. BLAISDELL AND
H. C. KENDALL
BY Forest B. Hitchcock
THEIR ATTORNEY

CAR ROUTING SYSTEM FOR RAILROADS

Filed Dec. 26, 1958

INVENTORS
D. BLAISDELL AND
H. C. KENDALL
BY Forest B. Hitchcock
THEIR ATTORNEY

CAR ROUTING SYSTEM FOR RAILROADS

Filed Dec. 26, 1958

60 Sheets-Sheet 11

INVENTORS
D. BLAISDELL AND
H. C. KENDALL
BY
Forest B. Hitchcock
THEIR ATTORNEY

CAR ROUTING SYSTEM FOR RAILROADS

Filed Dec. 26, 1958

60 Sheets-Sheet 12

KEY

INTERCONNECTION DIAGRAM BETWEEN FERRITE MEMORY UNIT AND READ-OUT UNITS (CONSOLE)

INVENTORS
D. BLAISDELL AND
H. C. KENDALL
BY Forest B. Hitchcock
THEIR ATTORNEY

INVENTORS
D. BLAISDELL AND
H. C. KENDALL
BY
Forest B. Hitchcock
THEIR ATTORNEY

Oct. 12, 1965 D. BLAISDELL ETAL 3,211,907

CAR ROUTING SYSTEM FOR RAILROADS

Filed Dec. 26, 1958 60 Sheets-Sheet 14

INVENTORS
D.BLAISDELL AND
H.C.KENDALL
BY Forest B. Hitchcock
THEIR ATTORNEY

CAR ROUTING SYSTEM FOR RAILROADS

Filed Dec. 26, 1958 60 Sheets-Sheet 15

INVENTORS
D. BLAISDELL AND
H. C. KENDALL
BY Forest B. Hitchcock
THEIR ATTORNEY

CAR ROUTING SYSTEM FOR RAILROADS

Filed Dec. 26, 1958 60 Sheets-Sheet 16

| WIRE NO. LINE | UNITS LIGHTS | WIRE NO. TRACK |
|---|---|---|
| A6 | 0 | A8 |
| B6 | 1 | B8 |
| C6 | 2 | C8 |
| D6 | 3 | D8 |
| E6 | 4 | E8 |
| F6 | 5 | F8 |
| G6 | 6 | G8 |
| H6 | 7 | H8 |
| J6 | 8 | J8 |
| K6 | 9 | K8 |

| WIRE NO. LINE | TENS LIGHTS | WIRE NO. TRACK |
|---|---|---|
| A5 | 00 | A7 |
| B5 | 10 | B7 |
| C5 | 20 | C7 |
| D5 | 30 | D7 |
| E5 | 40 | E7 |
| F5 | 50 | F7 |
| G5 | 60 | G7 |
| H5 | 70 | H7 |
| J5 | 80 | J7 |
| K5 | 90 | K7 |

*INVENTORS*
D. BLAISDELL AND
H.C. KENDALL

BY Forest B. Hitchcock
THEIR ATTORNEY

CAR ROUTING SYSTEM FOR RAILROADS

Filed Dec. 26, 1958 60 Sheets-Sheet 17

INVENTORS
D. BLAISDELL AND
H. C. KENDALL

BY Forest B. Hitchcock
THEIR ATTORNEY

Oct. 12, 1965 D. BLAISDELL ETAL 3,211,907

CAR ROUTING SYSTEM FOR RAILROADS

Filed Dec. 26, 1958 60 Sheets-Sheet 18

FIG. 12.

CODE CONVERSION CHART-
TELETYPE TO BINARY DECIMAL

| DECIMAL NO. | TENS OR UNITS RIP RELAY NUMBER | | | | | CORE MATRIX NUMBER | | | | | | | |
|---|---|---|---|---|---|---|---|---|---|---|---|---|---|
| | | | | | | TENS | | | | UNITS | | | |
| | 1 | 2 | 3 | 4 | 5 | 1 | 2 | 3 | 4 | 5 | 6 | 7 | 8 |
| 0 | S | M | M | S | M | 0 | 0 | 0 | 1 | 0 | 0 | 0 | 1 |
| 1 | M | M | M | S | M | 0 | 0 | 1 | 0 | 0 | 0 | 1 | 0 |
| 2 | M | M | S | S | M | 0 | 0 | 1 | 1 | 0 | 0 | 1 | 1 |
| 3 | M | S | S | S | S | 0 | 1 | 0 | 0 | 0 | 1 | 0 | 0 |
| 4 | S | M | S | M | S | 0 | 1 | 0 | 1 | 0 | 1 | 0 | 1 |
| 5 | S | S | S | S | M | 0 | 1 | 1 | 0 | 0 | 1 | 1 | 0 |
| 6 | M | S | M | S | M | 0 | 1 | 1 | 1 | 0 | 1 | 1 | 1 |
| 7 | M | M | M | S | S | 1 | 0 | 0 | 0 | 1 | 0 | 0 | 0 |
| 8 | S | M | M | S | S | 1 | 0 | 0 | 1 | 1 | 0 | 0 | 1 |
| 9 | S | S | S | M | M | 1 | 0 | 1 | 0 | 1 | 0 | 1 | 0 |
| TELETYPE CODE<br>M= MARK (RELAY UP)<br>S= SPACE (RELAY DOWN) | | | | | | BINARY CODE<br>0= ZERO STATE (INHIBIT)<br>1= ONE STATE (NO INHIBIT) | | | | | | | |

ADDITIONAL TELETYPE CODE USED

| | | | | | |
|---|---|---|---|---|---|
| FIGURE SHIFT (FS) = | M | M | S | M | M |
| LETTER SHIFT (LS) = | M | M | M | M | M |
| CANCEL (X) = | M | S | M | M | M |
| CARRIAGE RETURN (CR) = | S | S | S | M | S |
| LINE FEED (LF) = | S | M | S | S | S |
| DITTO (") = | M | S | S | S | M |
| PERIOD (°) | S | S | M | M | M |

TYPICAL SEQUENCES OF CODE USED

RESET & MEMORY CANCEL = FS, °, ", ", CR

TO READ-IN TRACK NO. = FS, ° N1,* N2,* CR

TO READ-IN "NO BILL" CAR = FS, °, 0, 0, CR

TO CANCEL TRACK NO. = X, PRIOR TO CR

* N1 = TENS DIGIT OF TRACK NO.
N2 = UNITS DIGIT OF TRACK NO.

INVENTORS
D. BLAISDELL AND
H. C. KENDALL
BY
Forest B. Hitchcock
THEIR ATTORNEY

FIG. 13A.

SEQUENCE CHART
FOR ADDRESS UNITS RELAYS

| COL | UNITS | | | | UDR |
|---|---|---|---|---|---|
| | 1 | 2 | 3 | 4 | |
| 0 | ↓ | (↓) | ↓ | (↓) | ↑ |
| 1 | (↑) | ↓ | ↓ | ↓ | ↓ |
| 2 | ↑ | ↓ | ↓ | (↑) | ↑ |
| 3 | ↑ | ↓ | (↑) | ↑ | ↓ |
| 4 | ↑ | ↓ | ↑ | (↓) | ↑ |
| 5 | ↑ | (↑) | ↑ | ↓ | ↓ |
| 6 | ↑ | ↑ | ↑ | (↑) | ↑ |
| 7 | ↑ | ↑ | (↓) | ↑ | ↓ |
| 8 | ↑ | ↑ | ↓ | (↓) | ↑ |
| 9 | (↓) | ↑ | ↓ | ↓ | ↓ |
| RESET UNITS ADV. TENS | ↓ | ↑ | ↓ | (↑) | ↑ |

POSITION OF UDR AT END OF EACH STEP

FIG. 13B.

SEQUENCE CHART
FOR ADDRESS TENS RELAYS

| ROW | TENS | | | | TDR |
|---|---|---|---|---|---|
| | 1 | 2 | 3 | 4 | |
| 00 | ↓ | ↓ | ↓ | (↓) | ↑ |
| 10 | (↑) | ↓ | ↓ | ↓ | ↓ |
| 20 | ↑ | ↓ | ↓ | (↑) | ↑ |
| 30 | ↑ | ↓ | (↑) | ↑ | ↓ |
| 40 | ↑ | ↓ | ↑ | (↓) | ↑ |
| 50 | ↑ | (↑) | ↑ | ↓ | ↓ |
| 60 | ↑ | ↑ | ↑ | (↑) | ↑ |
| 70 | ↑ | ↑ | (↓) | ↑ | ↓ |
| 80 | ↑ | ↑ | ↓ | (↓) | ↑ |
| 90 | (↓) | ↑ | ↓ | ↓ | ↓ |
| 100 | ↓ | ↑ | ↓ | (↑) | ↑ |
| 110 | ↓ | ↑ | (↑) | ↑ | ↓ |
| 120 | ↓ | ↑ | ↑ | (↓) | ↑ |
| 130 | ↓ | (↓) | ↑ | ↓ | ↓ |
| 140 | ↓ | ↓ | ↑ | (↑) | ↑ |
| RESET TENS ADV. UNITS | ↓ | ↓ | (↓) | ↑ | |

POSITION OF TDR AT END OF EACH STEP

NOTE: (↑) OR (↓) INDICATES CHANGE IN RELAY POSITION FROM PREVIOUS STEP

INVENTORS
D. BLAISDELL AND
H. C. KENDALL
BY Forest B. Hitchcock
THEIR ATTORNEY

INVENTORS
D. BLAISDELL AND
H.C. KENDALL
BY Forest B. Hitchcock
THEIR ATTORNEY

INVENTORS
D. BLAISDELL AND
H. C. KENDALL
BY Forest B. Hitchcock
THEIR ATTORNEY

INVENTORS
D. BLAISDELL AND
H. C. KENDALL
BY Forest B. Hitchcock
THEIR ATTORNEY

INVENTORS
D. BLAISDELL AND
H. C. KENDALL
BY
Forest B. Hitchcock
THEIR ATTORNEY

INVENTORS
D. BLAISDELL AND
H. C. KENDALL
BY
Forest B. Hitchcock
THEIR ATTORNEY

KEY

| | | | | |
|---|---|---|---|---|
| 14A | 14B | 14C | 14D | 14E |
| 14F | 14G | 14H | 14J | 14K |

INVENTORS
D. BLAISDELL AND
H.C. KENDALL
BY Forest B. Hitchcock
THEIR ATTORNEY

CAR ROUTING SYSTEM FOR RAILROADS

Filed Dec. 26, 1958 60 Sheets-Sheet 26

INVENTORS
D. BLAISDELL AND
H. C. KENDALL

BY Forest B. Hitchcock

THEIR ATTORNEY

INVENTORS
D. BLAISDELL AND
H.C. KENDALL
BY
Forest B. Hitchcock
THEIR ATTORNEY

INVENTORS
D. BLAISDELL AND
H. C. KENDALL
BY
Forest B. Hitchcock
THEIR ATTORNEY

INVENTORS
D.BLAISDELL AND
H.C.KENDALL
BY
Forest B. Hitchcock
THEIR ATTORNEY

INVENTORS
D. BLAISDELL AND
H. C. KENDALL
BY Forest B. Hitchcock
THEIR ATTORNEY

Oct. 12, 1965 D. BLAISDELL ETAL 3,211,907

CAR ROUTING SYSTEM FOR RAILROADS

Filed Dec. 26, 1958 60 Sheets-Sheet 31

INVENTORS
D. BLAISDELL AND
H. C. KENDALL
BY Forest B. Hitchcock
THEIR ATTORNEY

Oct. 12, 1965 D. BLAISDELL ETAL 3,211,907

CAR ROUTING SYSTEM FOR RAILROADS

Filed Dec. 26, 1958 60 Sheets-Sheet 32

INVENTOR.
D. BLAISDELL AND
H. C. KENDALL
BY
Forest B. Hitchcock
THEIR ATTORNEY

INVENTORS
D. BLAISDELL AND
H. C. KENDALL
BY
Forest B. Hitchcock
THEIR ATTORNEY

CAR ROUTING SYSTEM FOR RAILROADS

Filed Dec. 26, 1958 60 Sheets-Sheet 34

INVENTORS
D. BLAISDELL AND
H. C. KENDALL
BY Forest B. Hitchcock
THEIR ATTORNEY

INVENTORS
D. BLAISDELL AND
H. C. KENDALL
BY
Forest B. Hitchcock
THEIR ATTORNEY

INVENTORS
D. BLAISDELL AND
H. C. KENDALL
BY Forest B. Hitchcock
THEIR ATTORNEY

CAR ROUTING SYSTEM FOR RAILROADS

Filed Dec. 26, 1958 60 Sheets-Sheet 37

INVENTORS
D. BLAISDELL AND
H. C. KENDALL
BY Forest B. Hitchcock
THEIR ATTORNEY

INVENTORS
D.BLAISDELL AND
H.C.KENDALL
BY
Forest B. Hitchcock
THEIR ATTORNEY

INVENTORS
D. BLAISDELL AND
H. C. KENDALL
BY
Forest B. Hitchcock
THEIR ATTORNEY

INVENTORS
D. BLAISDELL AND
H. C. KENDALL
BY Forest B. Hitchcock
THEIR ATTORNEY

INVENTORS
D. BLAISDELL AND
H.C. KENDALL
BY Forest B. Hitchcock
THEIR ATTORNEY

TELETYPE READ-IN
TYPICAL 1ST. AND 2ND. CAR SEQUENCE

INVENTORS
D. BLAISDELL AND
H. C. KENDALL
BY
Forest B. Hitchcock
THEIR ATTORNEY

CAR ROUTING SYSTEM FOR RAILROADS

Filed Dec. 26, 1958 60 Sheets-Sheet 43

INVENTORS
D. BLAISDELL AND
H.C. KENDALL
BY Forest B. Hitchcock
THEIR ATTORNEY

CAR ROUTING SYSTEM FOR RAILROADS

Filed Dec. 26, 1958

INVENTORS
D. BLAISDELL AND
H. C. KENDALL
BY Forest B. Hitchcock
THEIR ATTORNEY

CAR ROUTING SYSTEM FOR RAILROADS

Filed Dec. 26, 1958

TELETYPE READ-IN

TYPICAL 99TH AND 100TH CAR SEQUENCE

INVENTORS
D. BLAISDELL AND
H. C. KENDALL
BY Forest B. Hitchcock
THEIR ATTORNEY

INVENTORS
D. BLAISDELL AND
H. C. KENDALL
BY Forest B. Hitchcock
THEIR ATTORNEY

INVENTORS
D. BLAISDELL AND
H. C. KENDALL
BY Forest B. Hitchcock
THEIR ATTORNEY

INVENTORS
D. BLAISDELL AND
H. C. KENDALL
BY
Forest B. Hitchcock
THEIR ATTORNEY

Oct. 12, 1965 D. BLAISDELL ETAL 3,211,907

CAR ROUTING SYSTEM FOR RAILROADS

Filed Dec. 26, 1958 60 Sheets-Sheet 49

INVENTORS
D. BLAISDELL AND
H. C. KENDALL

BY Forest B. Hitchcock

THEIR ATTORNEY

INVENTORS
D. BLAISDELL AND
H. C. KENDALL
BY Forest B. Hitchcock
THEIR ATTORNEY

INVENTORS
D. BLAISDELL AND
H. C. KENDALL
BY Forest B. Hitchcock
THEIR ATTORNEY

Oct. 12, 1965 D. BLAISDELL ETAL 3,211,907
CAR ROUTING SYSTEM FOR RAILROADS
Filed Dec. 26, 1958 60 Sheets-Sheet 52

INVENTORS
D. BLAISDELL AND
H. C. KENDALL
BY Forest B. Hitchcock
THEIR ATTORNEY

CAR ROUTING SYSTEM FOR RAILROADS

Filed Dec. 26, 1958

INVENTORS
D. BLAISDELL AND
H. C. KENDALL
BY Forest B. Hitchcock
THEIR ATTORNEY

INVENTORS
D. BLAISDELL AND
H. C. KENDALL
BY Forest B. Hitchcock
THEIR ATTORNEY

INVENTORS
D. BLAISDELL AND
H. C. KENDALL
BY Forest B. Hitchcock
THEIR ATTORNEY

INVENTORS
D. BLAISDELL AND
BY H. C. KENDALL
Forest B. Hitchcock
THEIR ATTORNEY

KEY

| | | | |
|---|---|---|---|
| FIG.21A. | FIG.21B. | FIG.21C. | FIG.21D. |
| FIG.21E. | FIG.21F. | FIG.21G. | FIG.21H. |
| FIG.21J. | FIG.21K. | FIG.21L. | FIG.21M. |

INVENTORS
D. BLAISDELL AND
H. C. KENDALL
BY Forest B. Hitchcock
THEIR ATTORNEY

FIG. 22.

BINARY CODE CHART FOR
CODE STORAGE RELAYS

| CODE STORAGE RELAYS | CS7 | CS6 | CS5 | CS4 | CS3 | CS2 | CS1 | |
|---|---|---|---|---|---|---|---|---|
| BINARY | $2^6$ | $2^5$ | $2^4$ | $2^3$ | $2^2$ | $2^1$ | $2^0$ | A |
| DECIMAL | 64 | 32 | 16 | 8 | 4 | 2 | 1 | B |
| 53(EXAMPLE) | 0 | 1 | 1 | 0 | 1 | 0 | 1 | C |
| RELAY POSITION | ↓ | ↑ | ↑ | ↓ | ↑ | ↓ | ↑ | D |

ROW A = BINARY POWERS ASSOCIATED WITH RELAYS
ROW B = EQUIVALENT DECIMAL NUMBER
ROW C = 1 IF BINARY POWER IS INCLUDED
0 IF BINARY POWER IS EXCLUDED
ROW D = ↑ RELAY ENERGIZED
↓ RELAY DEENERGIZED

TO DETERMINE NUMBER MULTIPLY EACH COLUMN OF ROW A BY EACH COLUMN OF ROW C RESPECTIVELY AND ADD.

INVENTORS
D. BLAISDELL AND
H. C. KENDALL
BY
THEIR ATTORNEY

Oct. 12, 1965 D. BLAISDELL ETAL 3,211,907

CAR ROUTING SYSTEM FOR RAILROADS

Filed Dec. 26, 1958 60 Sheets-Sheet 59

INVENTORS
D. BLAISDELL AND
H. C. KENDALL

BY Forest B. Hitchcock

THEIR ATTORNEY

INVENTORS
D. BLAISDELL AND
H. C. KENDALL
BY Forest B. Hitchcock
THEIR ATTORNEY 3,211,907
Patented Oct. 12, 1965

1

3,211,907

CAR ROUTING SYSTEM FOR RAILROADS

Donald Blaisdell and Hugh C. Kendall, Rochester, N.Y., assignors to General Signal Corporation, a corporation of New York Filed Dec. 26, 1958, Ser. No. 783,651
10 Claims. (Cl. 246—3)

Figure 1:
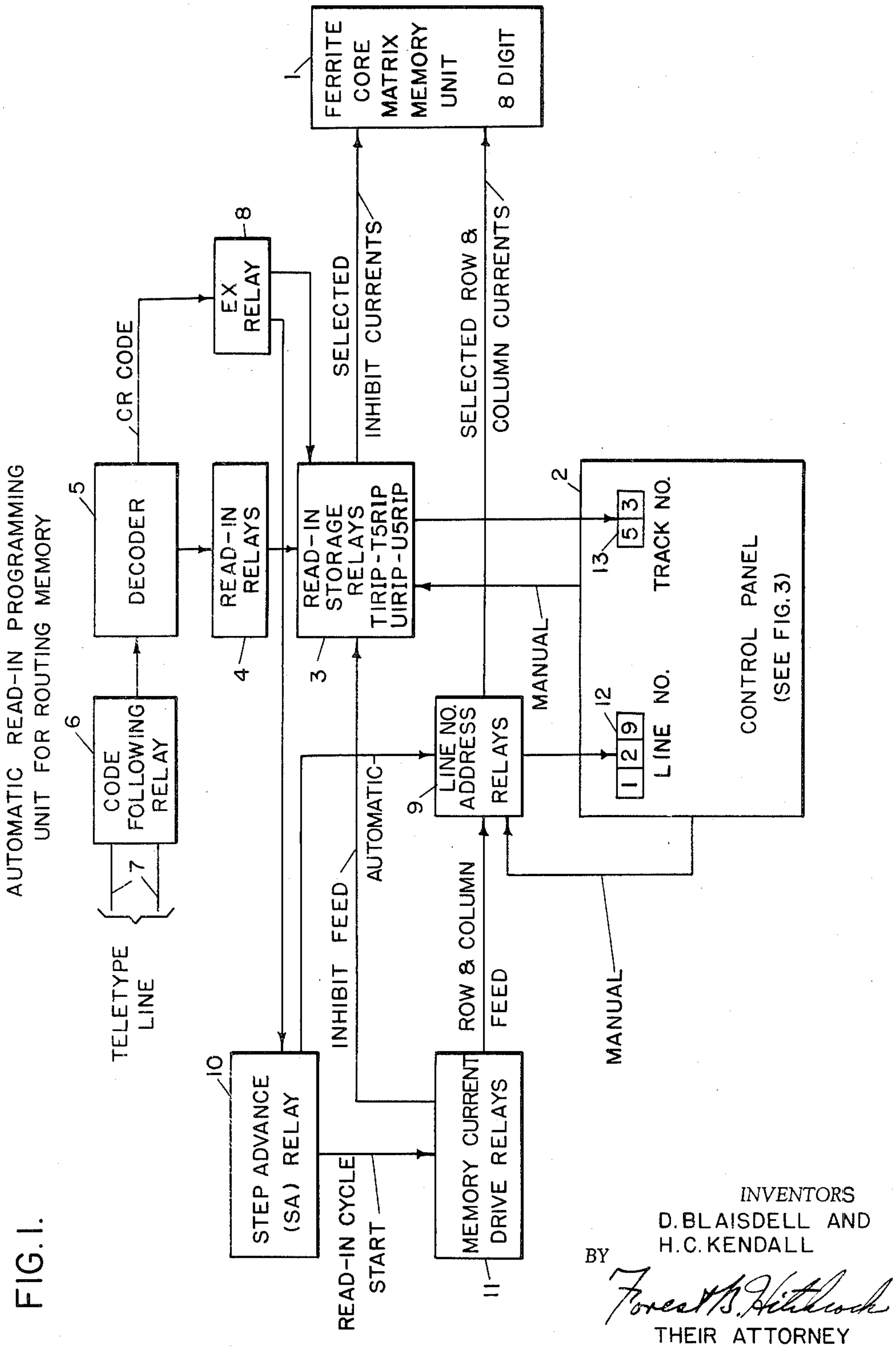

This invention relates to a system for automatically controlling the track switches of a railroad yard for routing cars to assigned destinations, and more particularly pertains to a system for receiving and storing information from a remote point as to the assigned destination of the cars of a train and using such stored information for automatically routing the cars upon the arrival of such train.

When trains of a railroad are made up for different remote points, each train may contain cars for a number of different destinations. A list of the cars of a train is known as a "consist," and it both identifies the cars of the train and includes a brief description of their lading and specifies their respective destinations.

It is proposed in accordance with the present invention to provide apparatus for receiving and storing the information pertinent to the routing of the cars of a train when the "consist" information is transmitted from the originating point of the train, which stored information will be made available upon the arrival of that train for the automatic control of the switches of a yard for routing those cars of such train to their assigned destinations.

This routing of the cars for the different destinations involves the use of a classification yard in which the cars are passed over a so-called hump and are automatically switched to different classification tracks dependent upon their assigned destination.

One of the objects of the present invention is to provide such a system with a receiving and storage means which is readily adaptable to railroad practice wherein the "consist" of a train may be changed during the travel of a train from its starting point to its destination, which system for the reception and storage of the original "consist" includes means for permitting the ready revision of such stored information.

Another object of the present invention is to provide an organization in which the stored information can be set up for a number of different trains in succession and provide means for rendering such stored information available for the automatic switching operation as such trains respectively arrive at the switching point.

Another object of the present invention is to use a type of storage means which can be employed for storage of adequate amount different information which in its specific form employs a ferrite core memory matrix.

Another object of the present invention is to provide a storage organization in which an operator has random access to the various items of stored information for the purpose of effecting their revision.

Another object of the present invention is to make available the stored information for the individual cars as their switching automatically takes place for routing such cars to classification tracks respectively assigned to their destinations, which stored information for the individual cars is employable for the automatic switching regardless of whether the cars are switched singly or in cuts including a plurality of cars.

Another object of the present invention is to provide a receiving and storing means which is capable of storing the information for the cars of the respective trains and which permits the use of the stored information for the respective trains in any order in which the trains may arrive.

Another object of the present invention is to provide a routing or automatic switching system controlled by the

2 associated storage apparatus in a way that the passage of successive cars advances the stored information in succession regardless of whether a plurality of cars are included in the same cut or in single cuts and which is operative in the case of a cut having a plurality of cars to employ for switching purposes only the assigned destination of the leading car.

Another object of the present invention is to provide control of the organization in response to the passage of cars to advance the information for use regardless of whether single cars or a plurality of cars are included in a particular cut or group.

Another object of the present invention is to display the actively used information as it is transferred from the memory storage unit to the automatic switching control circuits to permit an operator to check the automatic operation with the "consist" for the car then being automatically classified.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views. Also, the several views have been given titles for the purpose of more readily identifying them, and which titles have accompanying brief descriptions for each of the several views as follows:

FIG. 1—Automatic read-in programming unit for routing memory. This figure illustrates in block diagram form the major components of the read-in programming system. The arrows connecting the blocks show the normal path over which data flows through the system.

Figure 2:
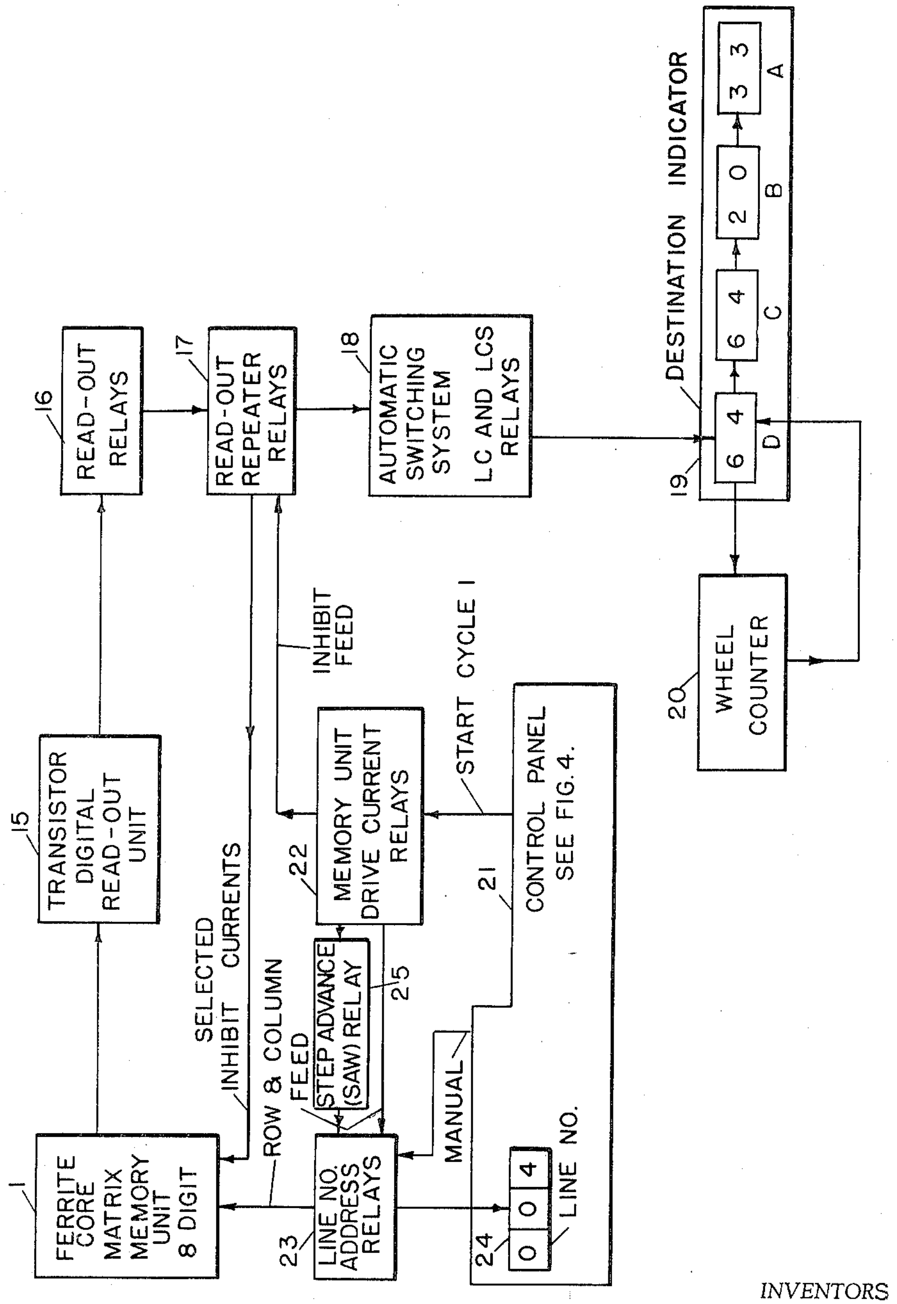

FIG. 2—Automatic read-out programming unit for routing memory. This figure illustrates in block diagram form the major components of the read-out system. Note that the memory unit 1 is used here as well as in FIG. 1 since this is a plug-in type of unit and serves as a link between the two systems.

Figure 3A:
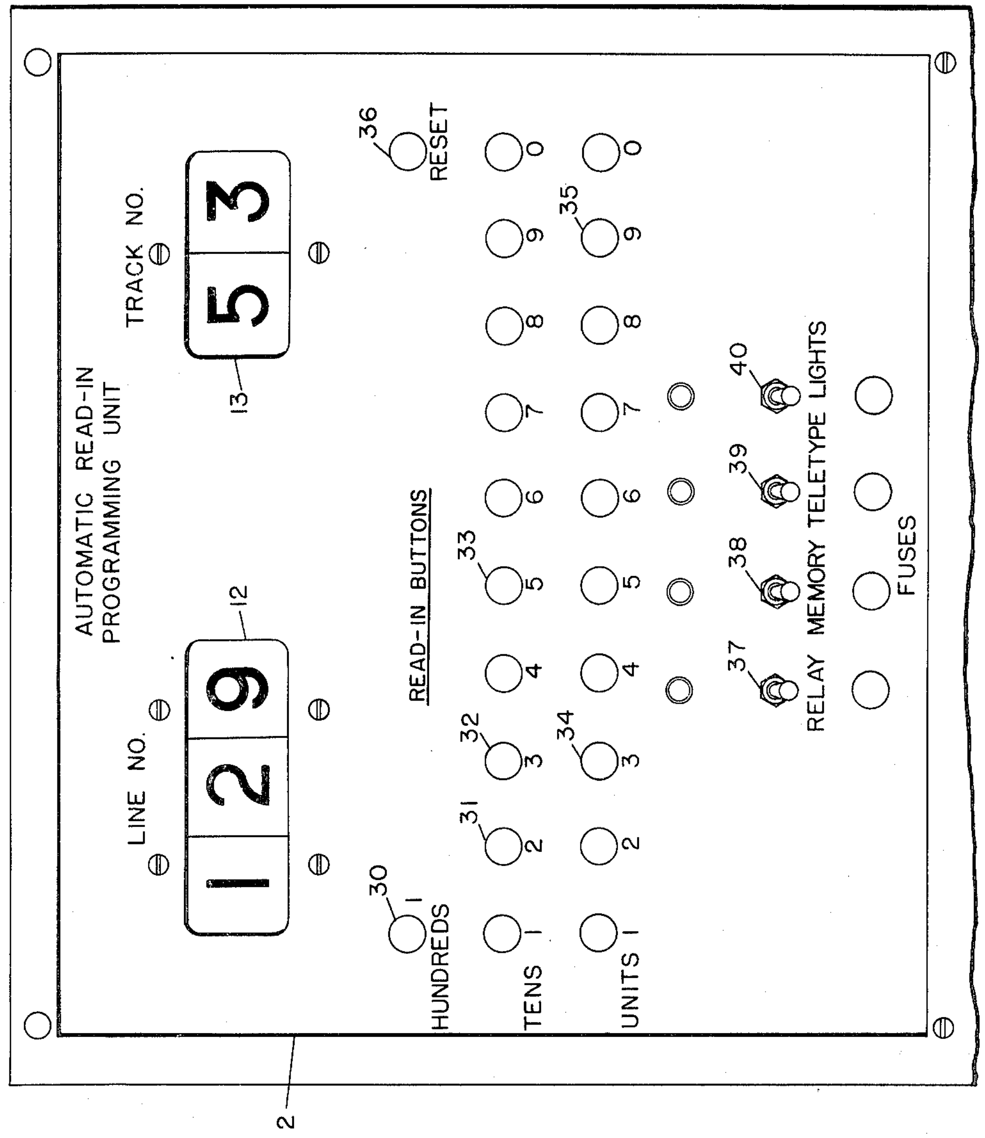

FIG. 3A—Control panel for automatic read-in programming unit. This figure shows the panel arrangement which supplies power for operating the system of FIG. 1. The panel also contains push buttons for the control and display of line and track number.

Figure 3B:
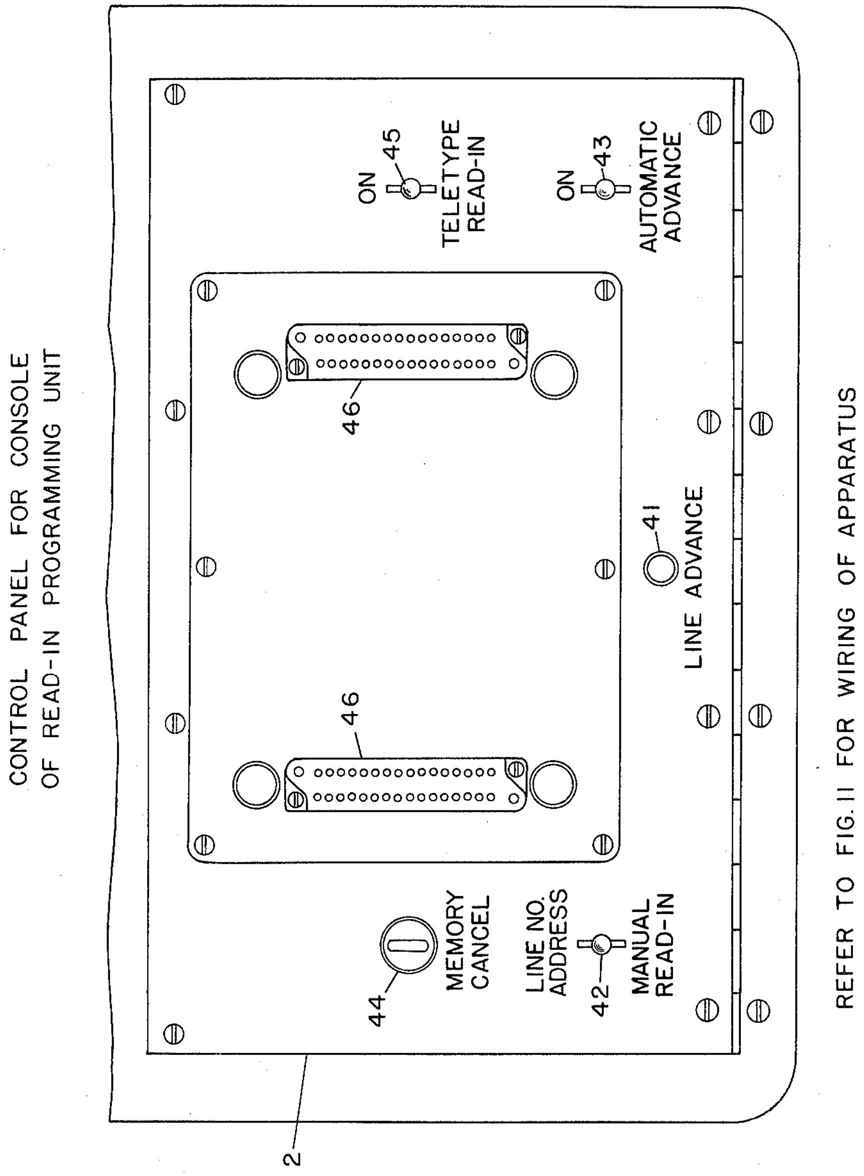

FIG. 3B—Control panel for console of read-in programming unit. This figure illustrates the arrangement of functional switches on the console as well as the receptacles 46 which receive the memory unit.

Figure 4B:
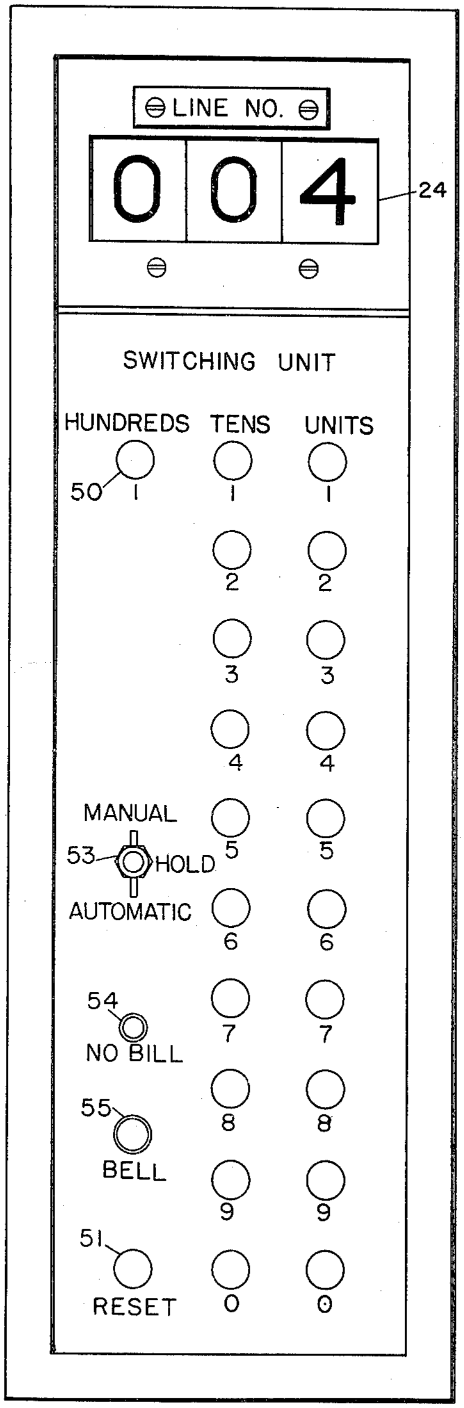
Figure 4A:
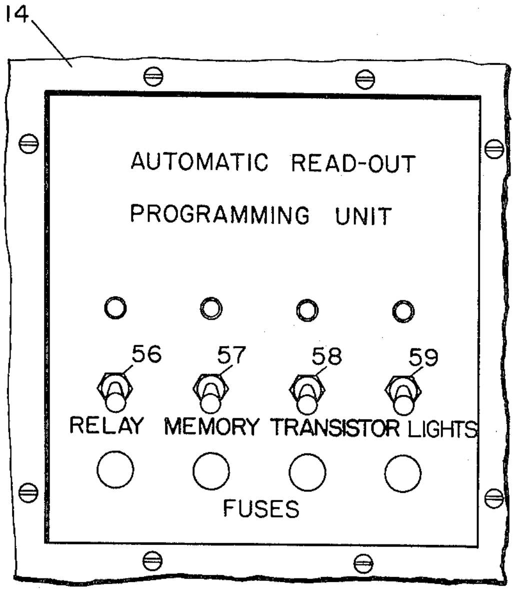

FIG. 4A—Control panel for automatic read-out programming unit. This figure represents the panel which supplies power to the read-out programming system.

FIG. 4B—Control panel for address read-out programming unit. This figure displays the address panel essentially consisting of a group of push buttons to manually control the line number and a window for the display of this number. The "MANUAL-HOLD-AUTOMATIC" switch mounted on this panel provides the operator with control over the read-out system.

Figure 5:
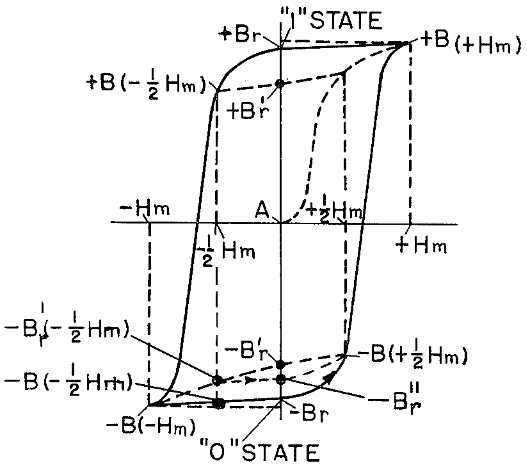

FIG. 5—Typical hysteresis loop of a ferrite core.

Figure 6:
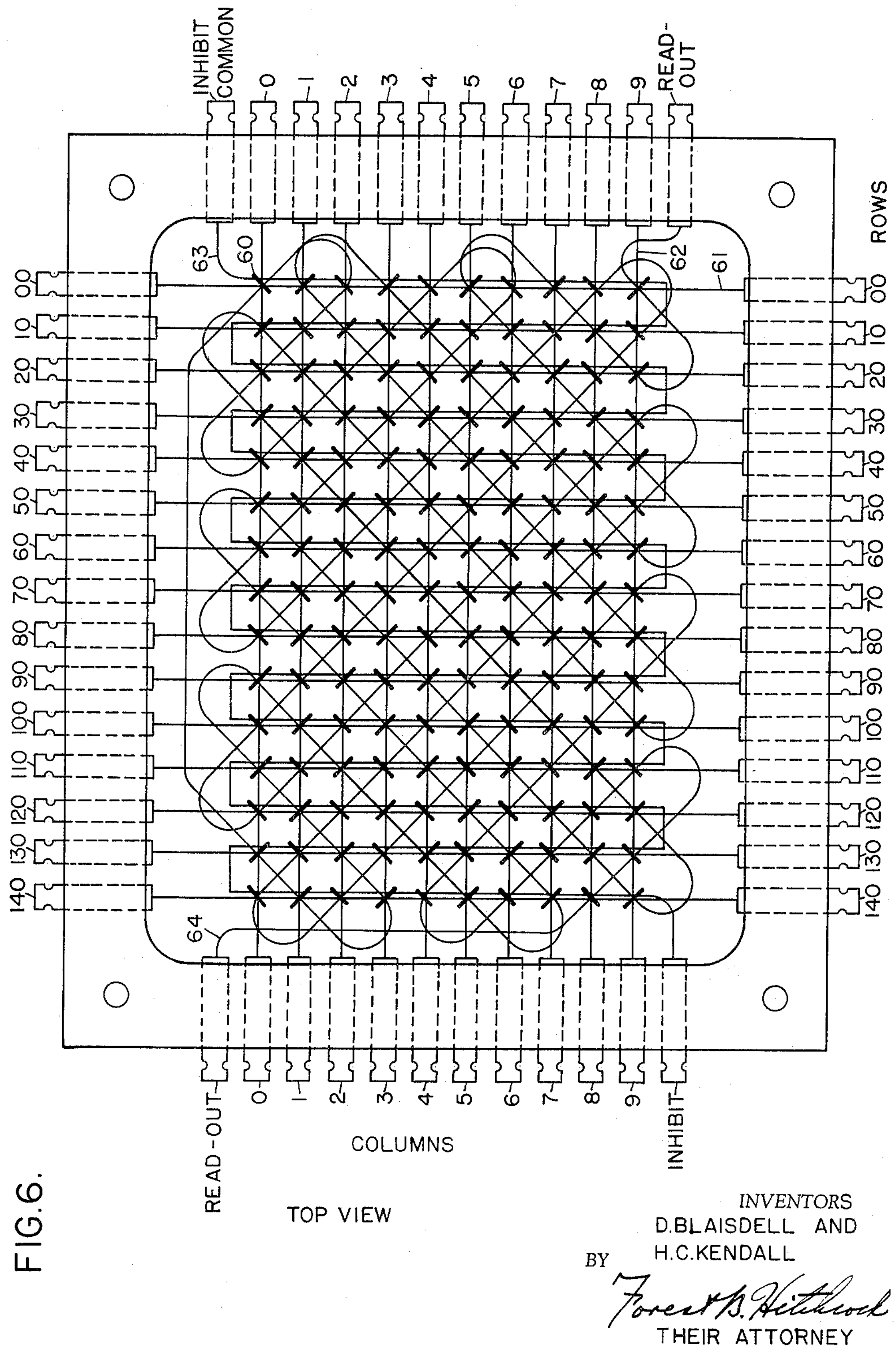

FIG. 6—Typical wiring plan of ferrite matrix. This figure shows the relationship between the toroidal shaped cores and the wires which thread through these cores, composing an arrangement in matrix form wherein each core has a specific significance with respect to Teletype line or car number.

Figure 7:
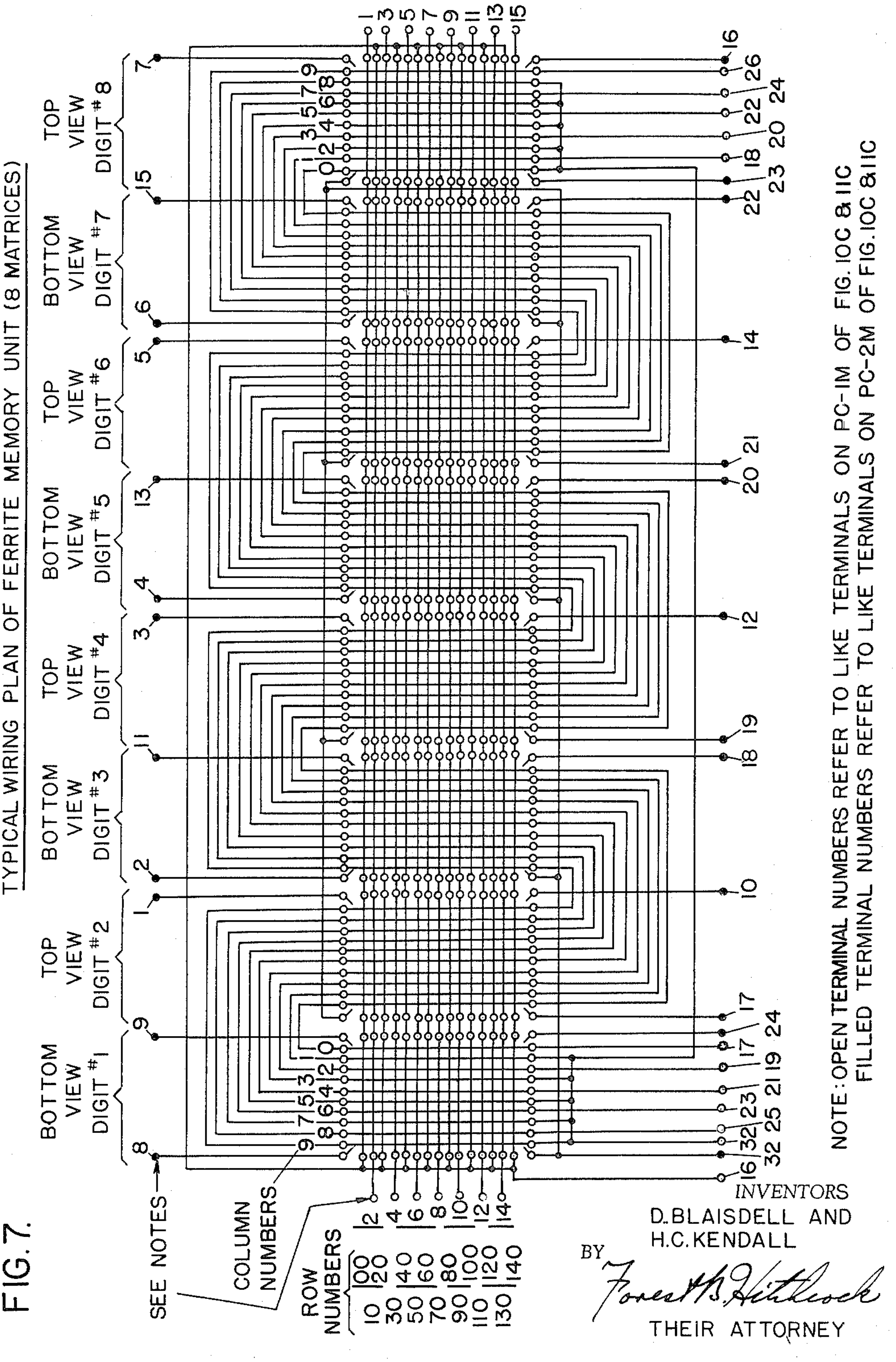
Figure 10D:
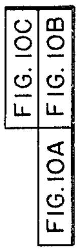

FIG. 7—Typical wiring plan of ferrite memory unit (8 matrices). This figure shows the interconnections between eight (8) matrices, one of which is shown in FIG. 6. The external terminals of this unit plug into the receptacles as represented in FIGS. 10C and 11C.

Figure 8A:
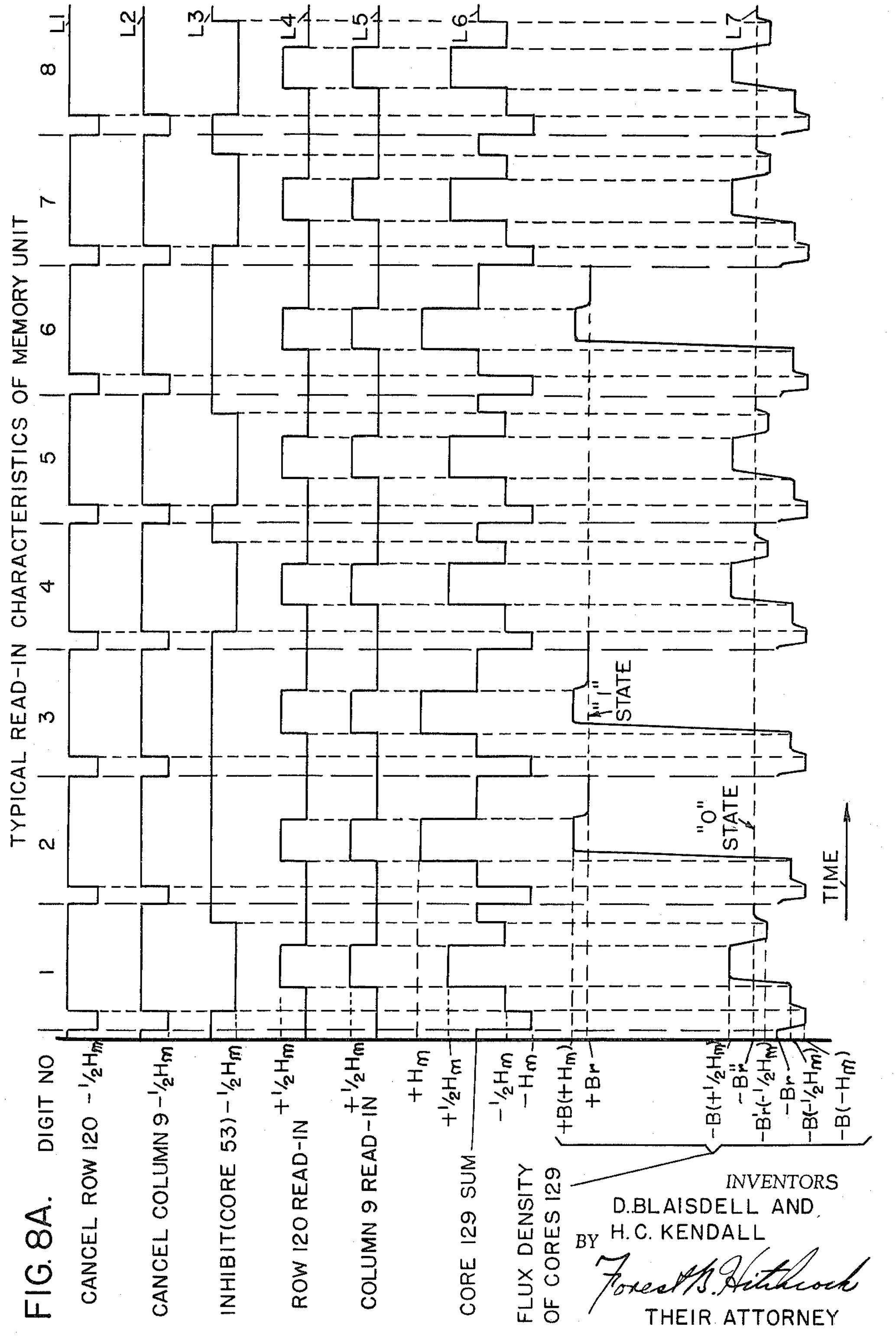

FIG. 8A—Typical read-in characteristics of the memory unit. In this figure each line or L number of this diagram represents the current (I) applications to a similarly located particular core in each of the eight matrices which results in flux density changes determining the magnetic status of these eight cores.

Figure 8B:
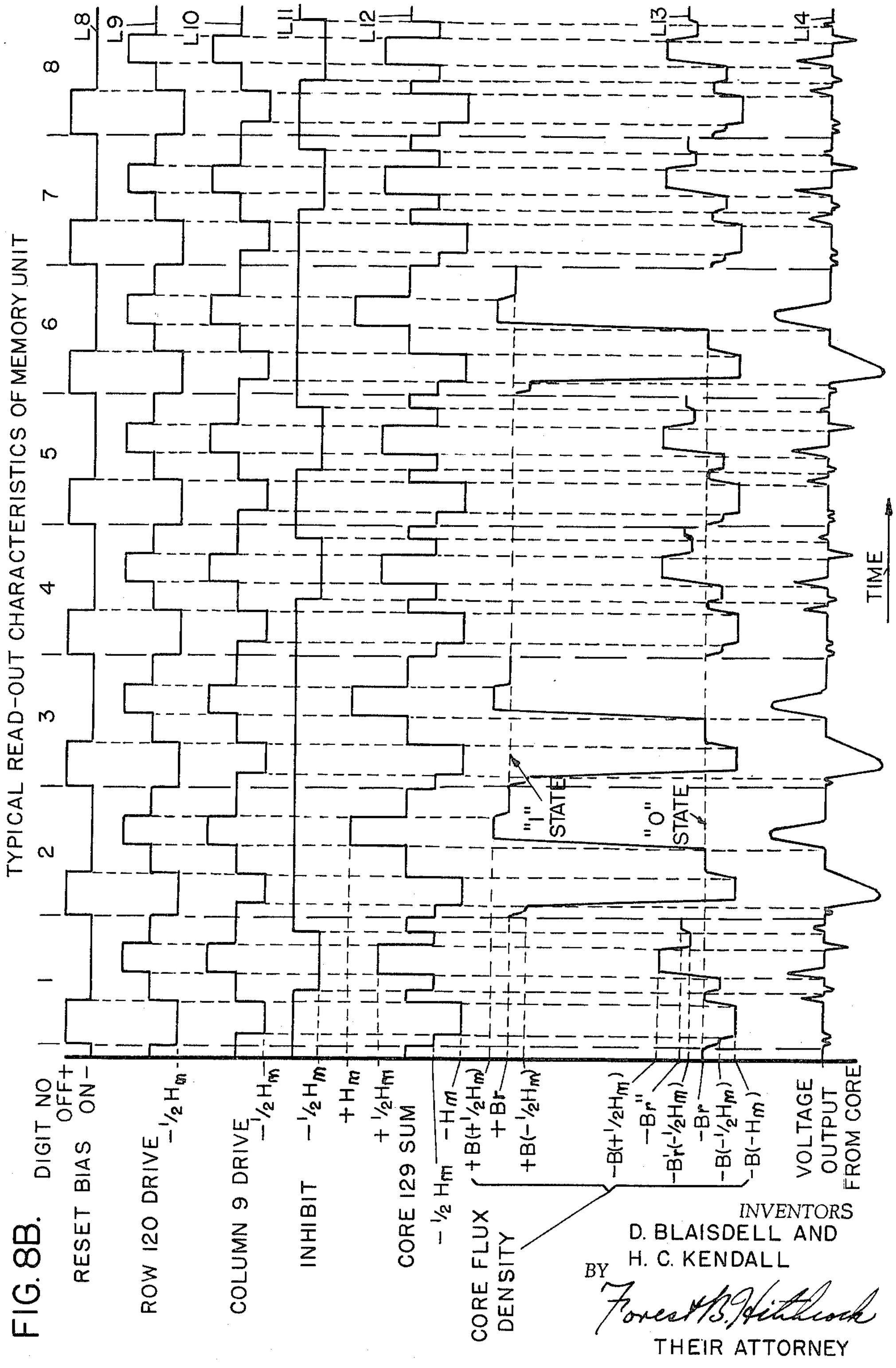

FIG. 8B—Typical read-out characteristics of the memory unit. In this figure each line of this diagram represents current (I) applications to the same cores as in FIG. 8A resulting in a voltage output as shown by L14 which occurs prior to the final status of the cores from the read-back operation as shown by L13.

Figure 9:
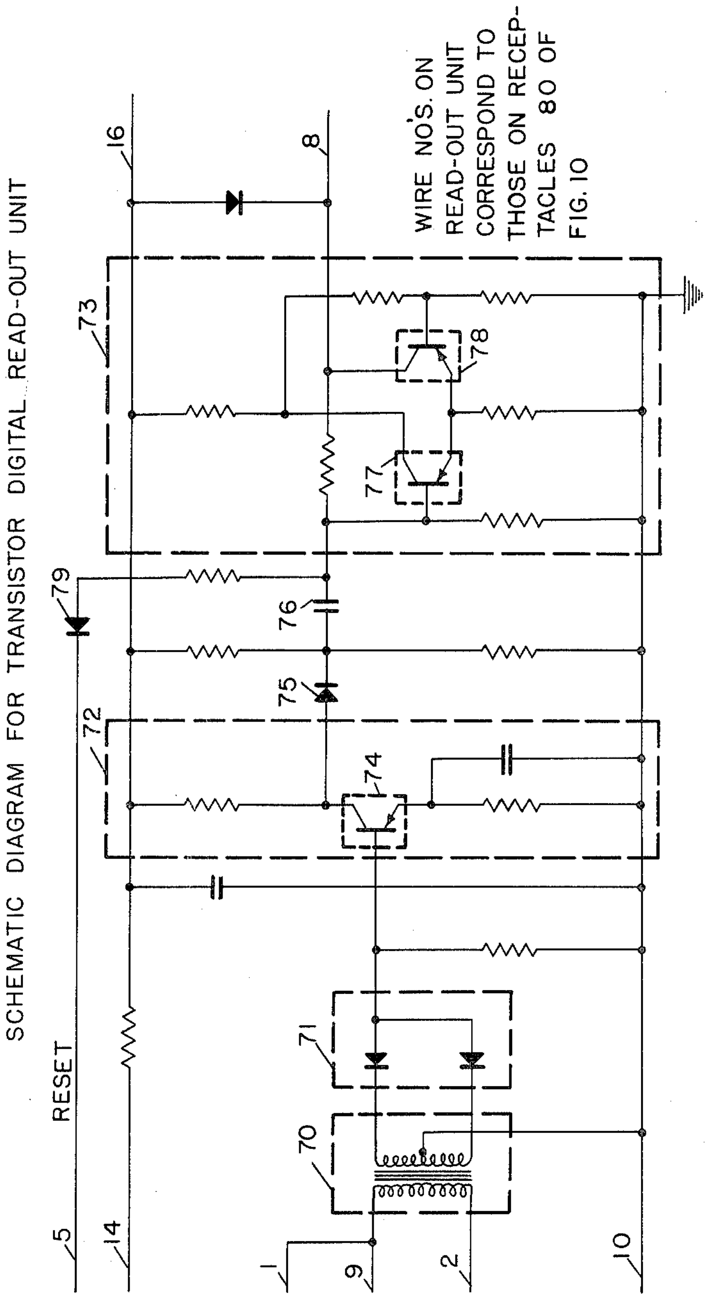

FIG. 9—Schematic diagram for transistor digital read-out unit. In this figure the diagram represents the apparatus contained in a plug-in type unit, eight (8) of which are required to operate the read-out system. The wire numbers or terminations correspond to the receptacle numbers as shown in FIGS. 10A and 10B.

Figure 10A:
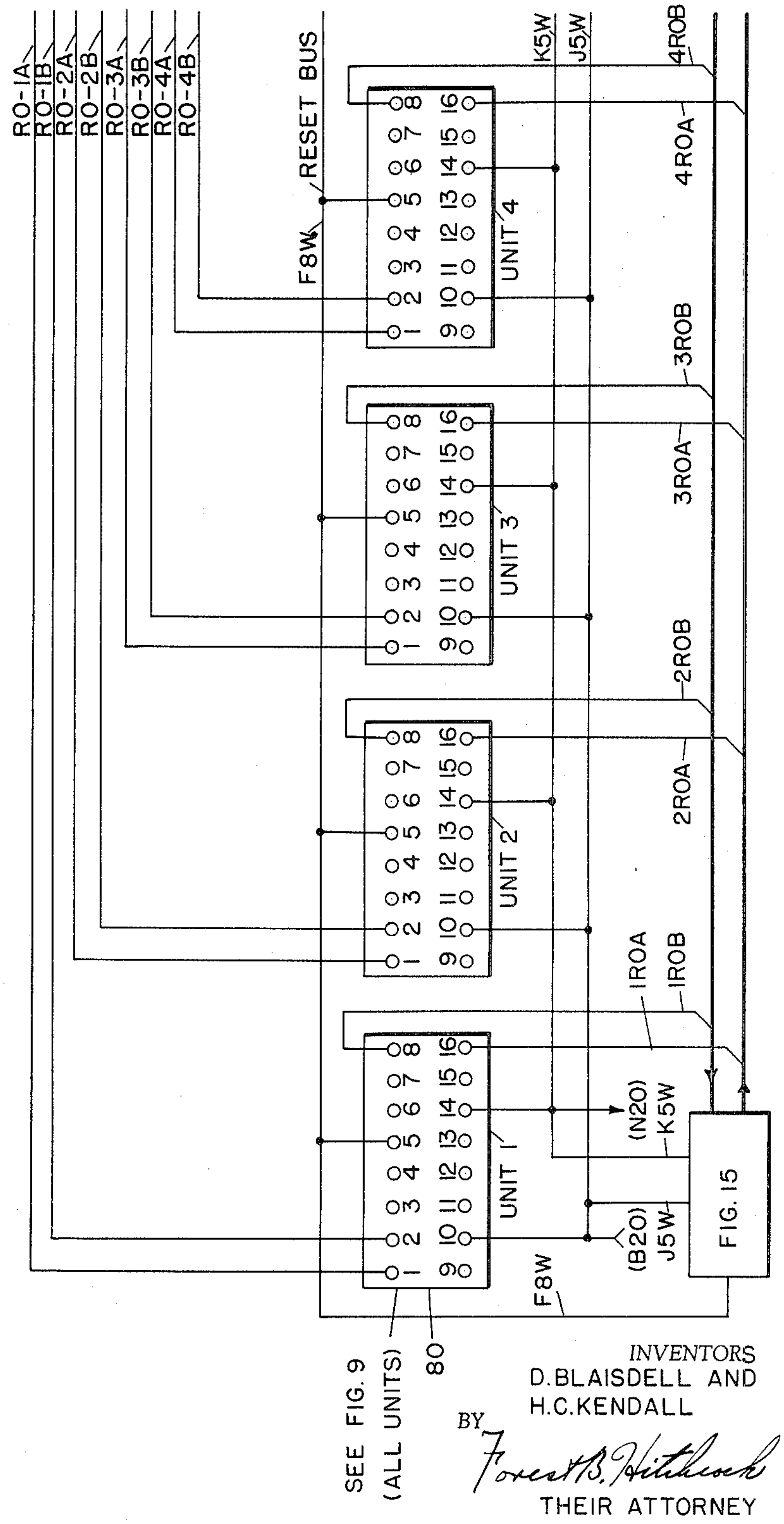
Figure 10B:
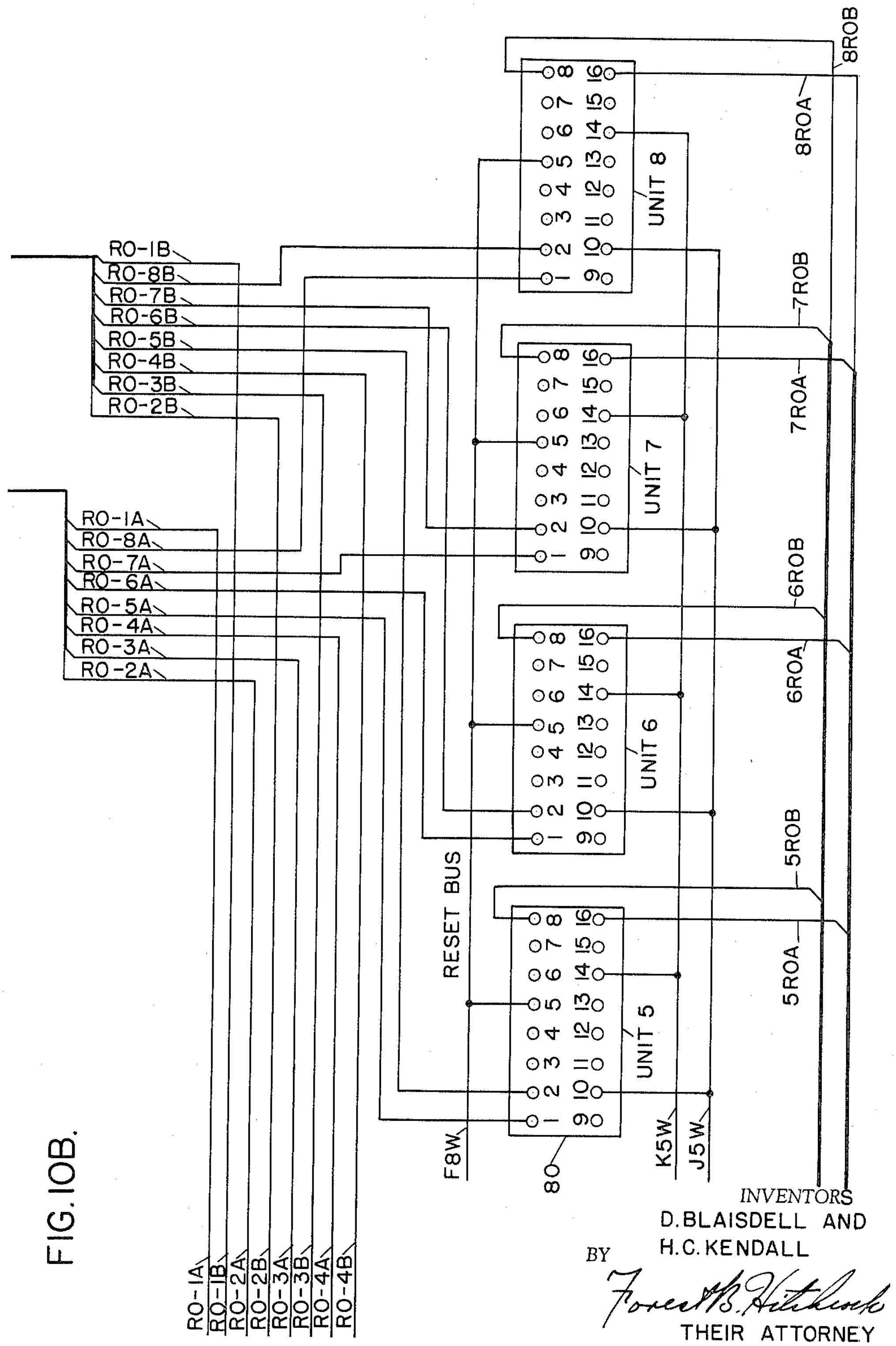
Figure 10C:
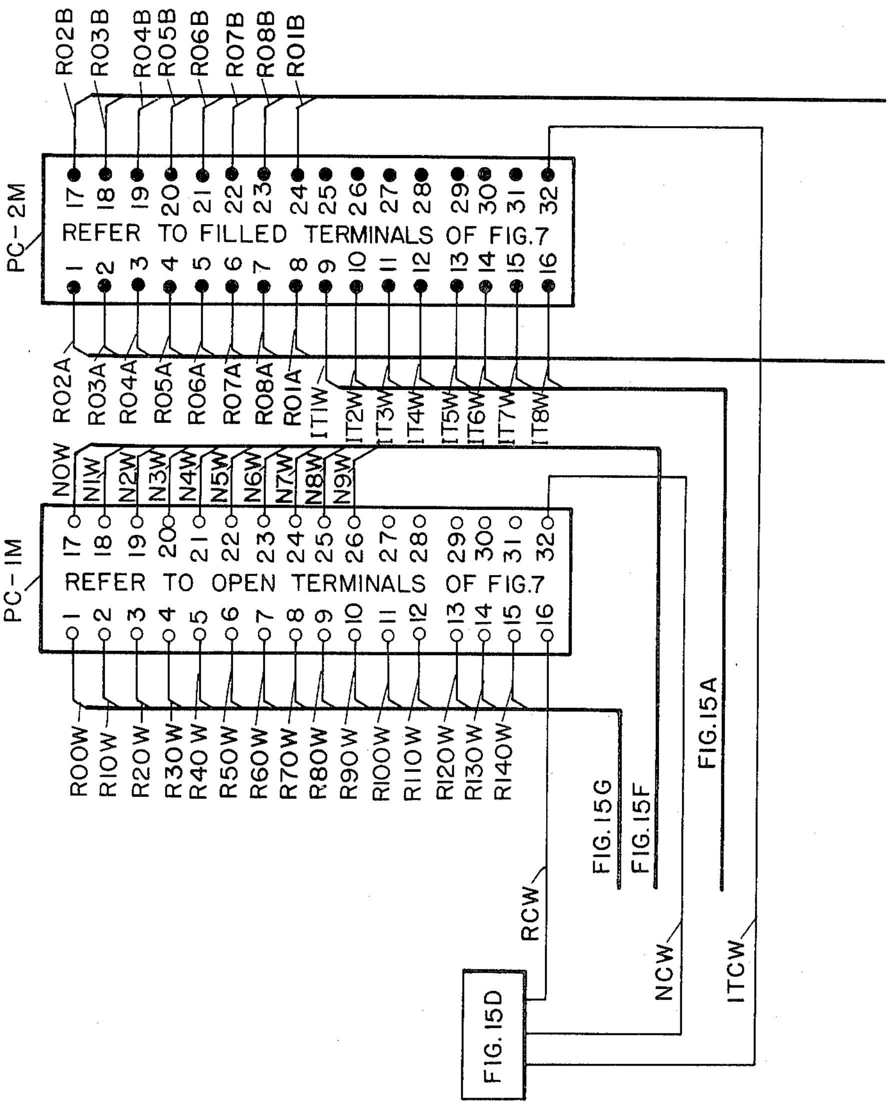

FIGS. 10A, 10B, 10C—Interconnection diagram between ferrite memory unit and read-out units (console). In these figures, the physical apparatus which this diagram represents is not shown on any drawing, since it it merely a console type panel containing receptacles for the plug-in of the memory unit and eight digital read-out units. This diagram should be arranged as indicated by the key of FIG. 10D.

FIG. 10D—Shows arrangement of FIGS. 10A, 10B and 10C.

FIGS. 11A, 11B, 11C, 11D, 11E—These figures show a connection diagram for panels (FIGS. 3A and 3B) of the read-in programming unit. This diagram should be arranged as indicated by the key of FIG. 11F.

Figures 11A, 11F:
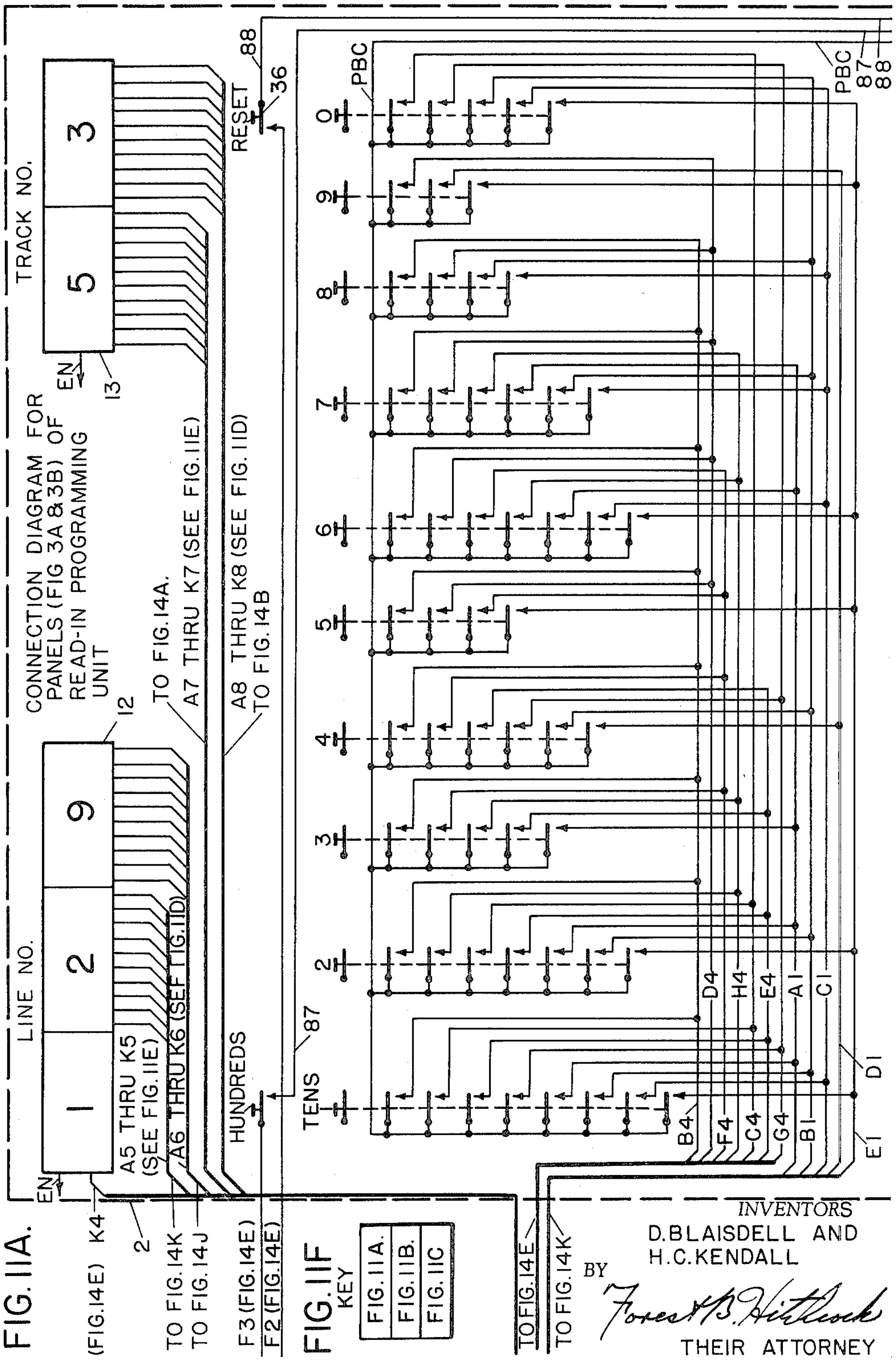
Figures 11B, 11D, 11E:
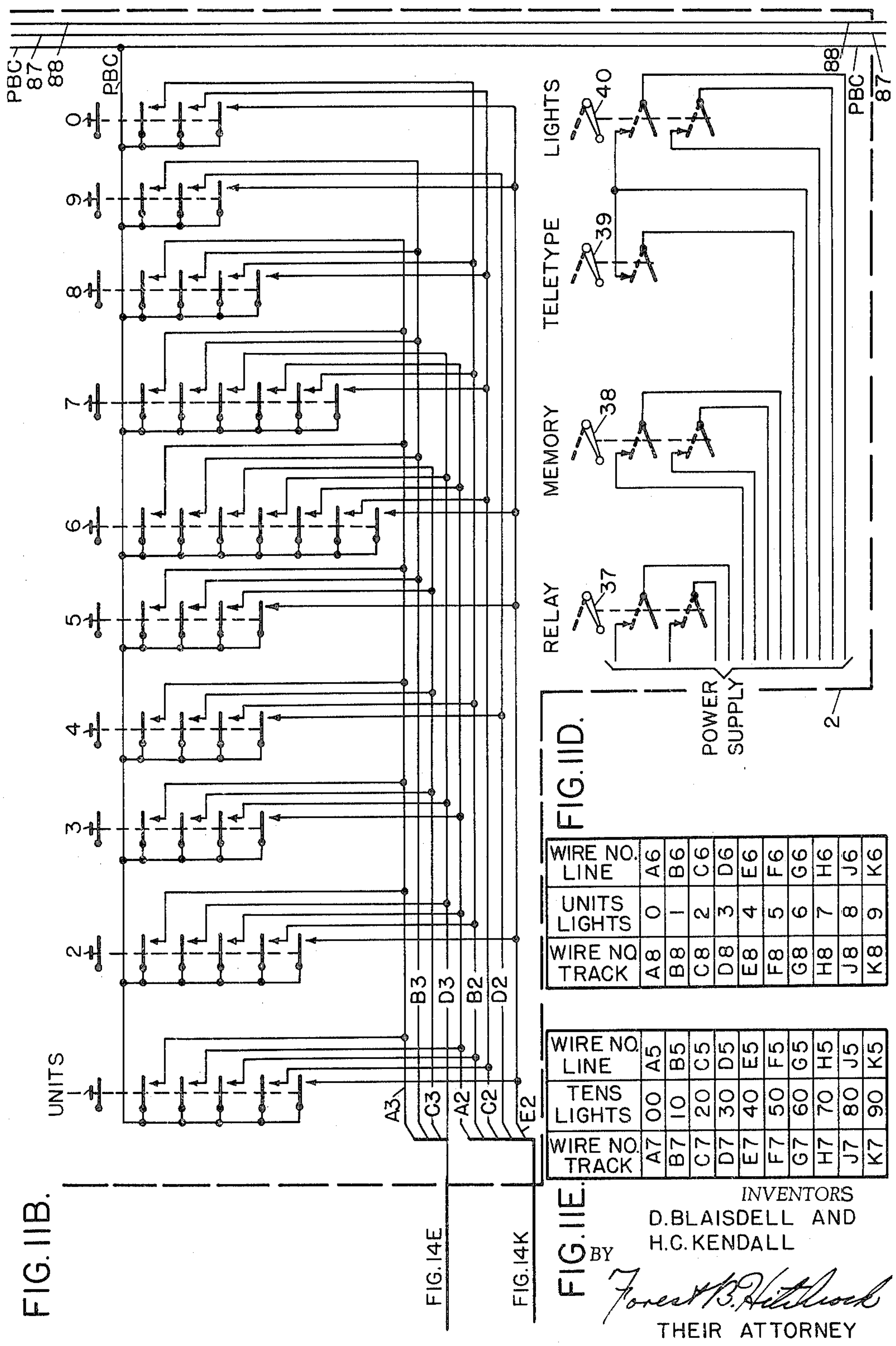
Figure 11C:
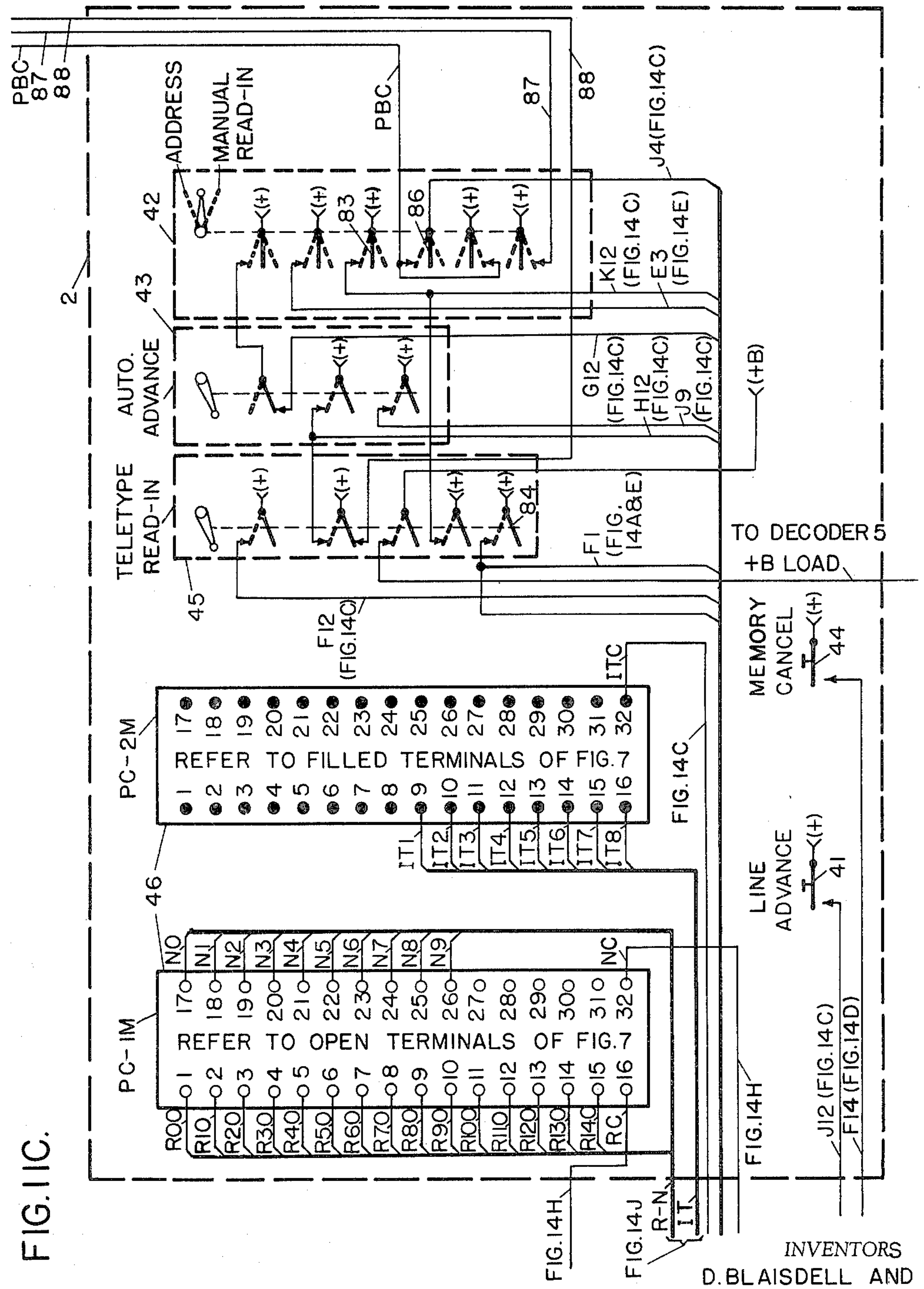

FIG. 11F—Shows arrangement of FIGS. 11A, 11B, 11C, 11D and 11 E.

FIG. 12—Code conversion chart—Teletype to binary decimal.

FIG. 13A—Sequence chart for address units relays. This figure shows a chart which applies to the read-out or switching system wherein a "W" suffixed to the relay symbols, e.g. UEW, UDRW.

FIG. 13B—Sequence chart for address tens relays. This figure shows a chart which applies also to the read-out or switching system wherein a "W" is suffixed to the relay symbols, e.g. T3W, TDRW.

FIGS. 14A, 14B, 14C, 14D, 14E, 14F, 14G, 14H, 14J, 14K—Schematic diagram for the read-in programming unit. These figures show a diagram which should be arranged as shown by the key of FIG. 14L.

Figure 14A:
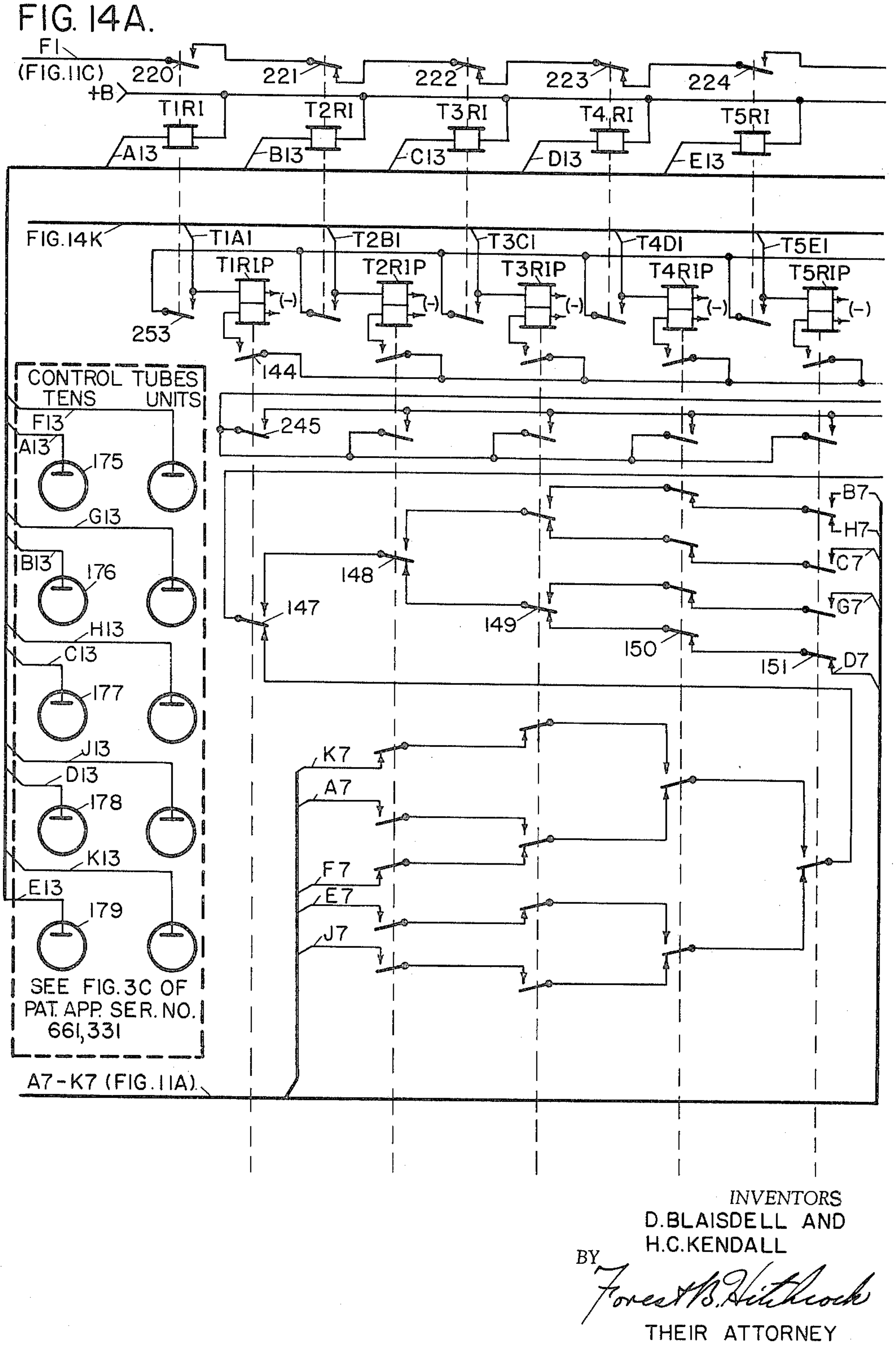
Figure 14B:
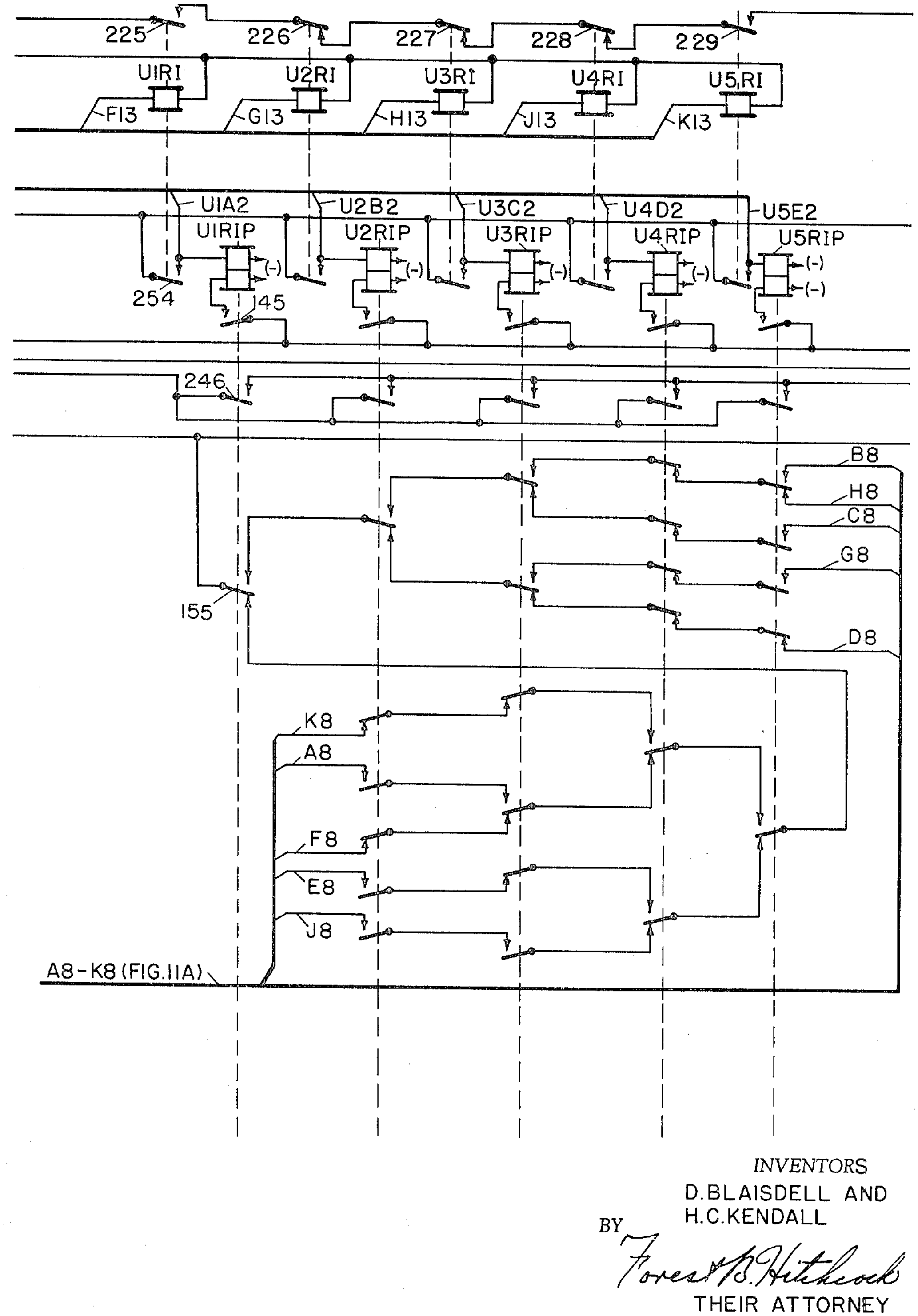
Figure 14C:
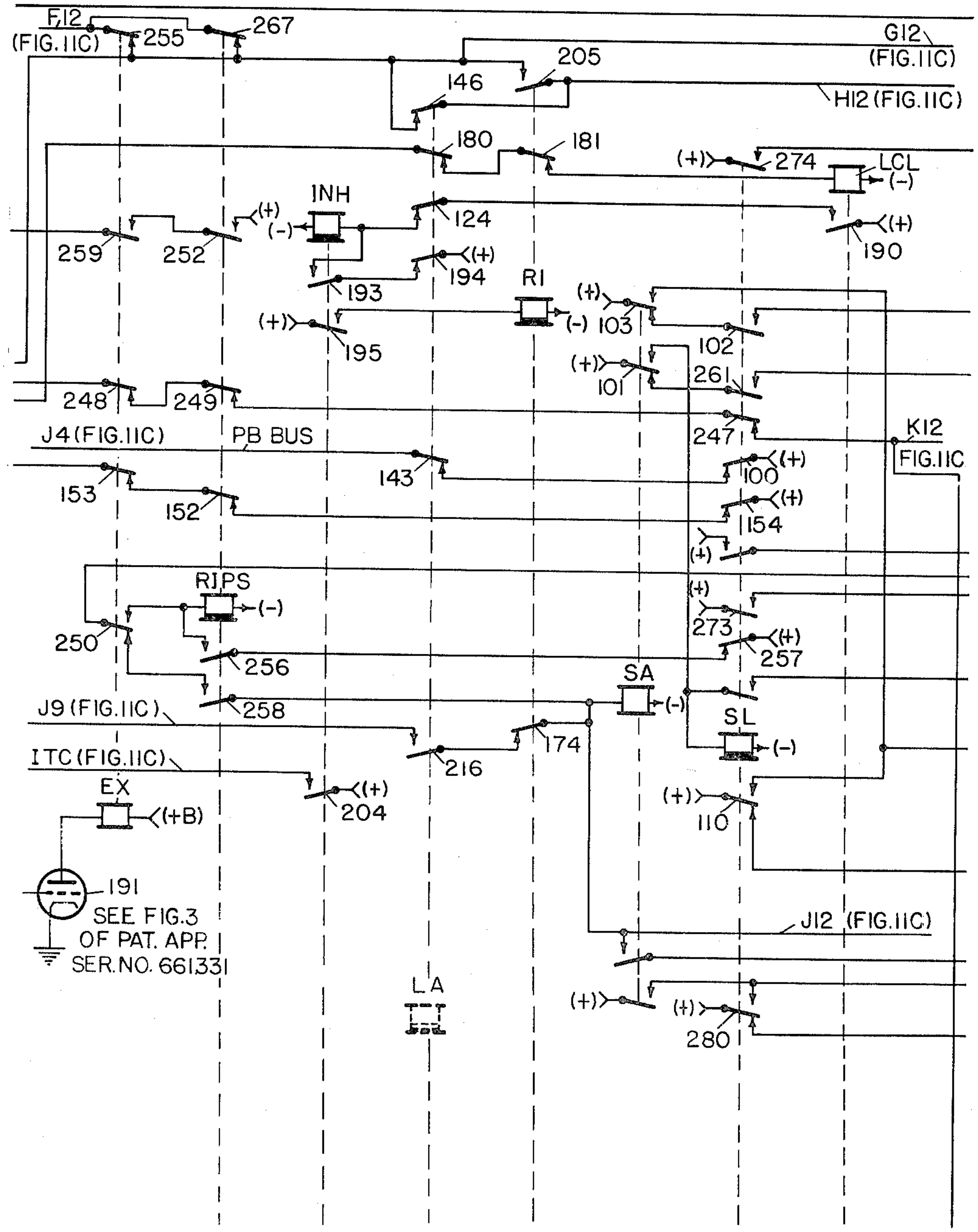
Figure 14D:
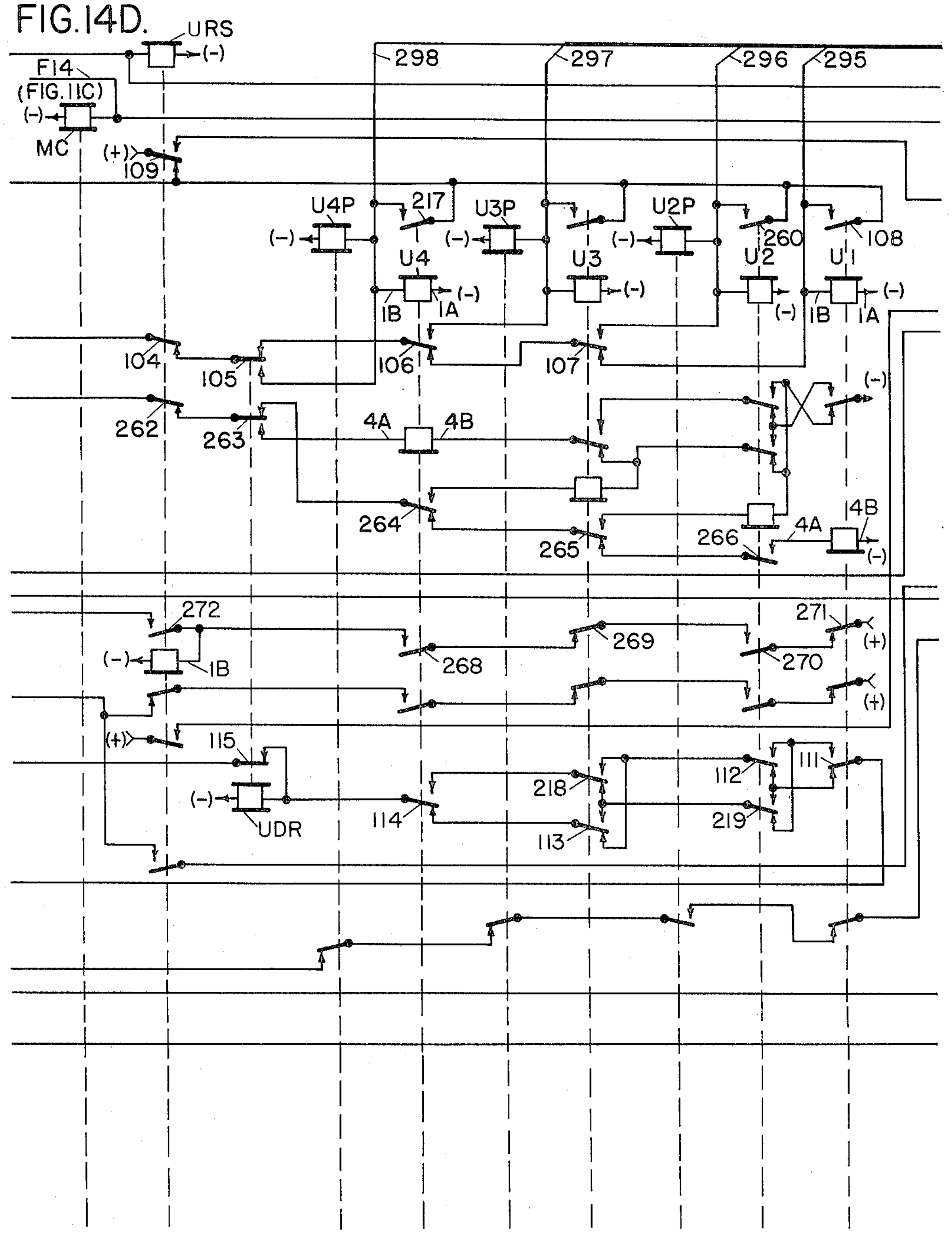
Figure 14E:
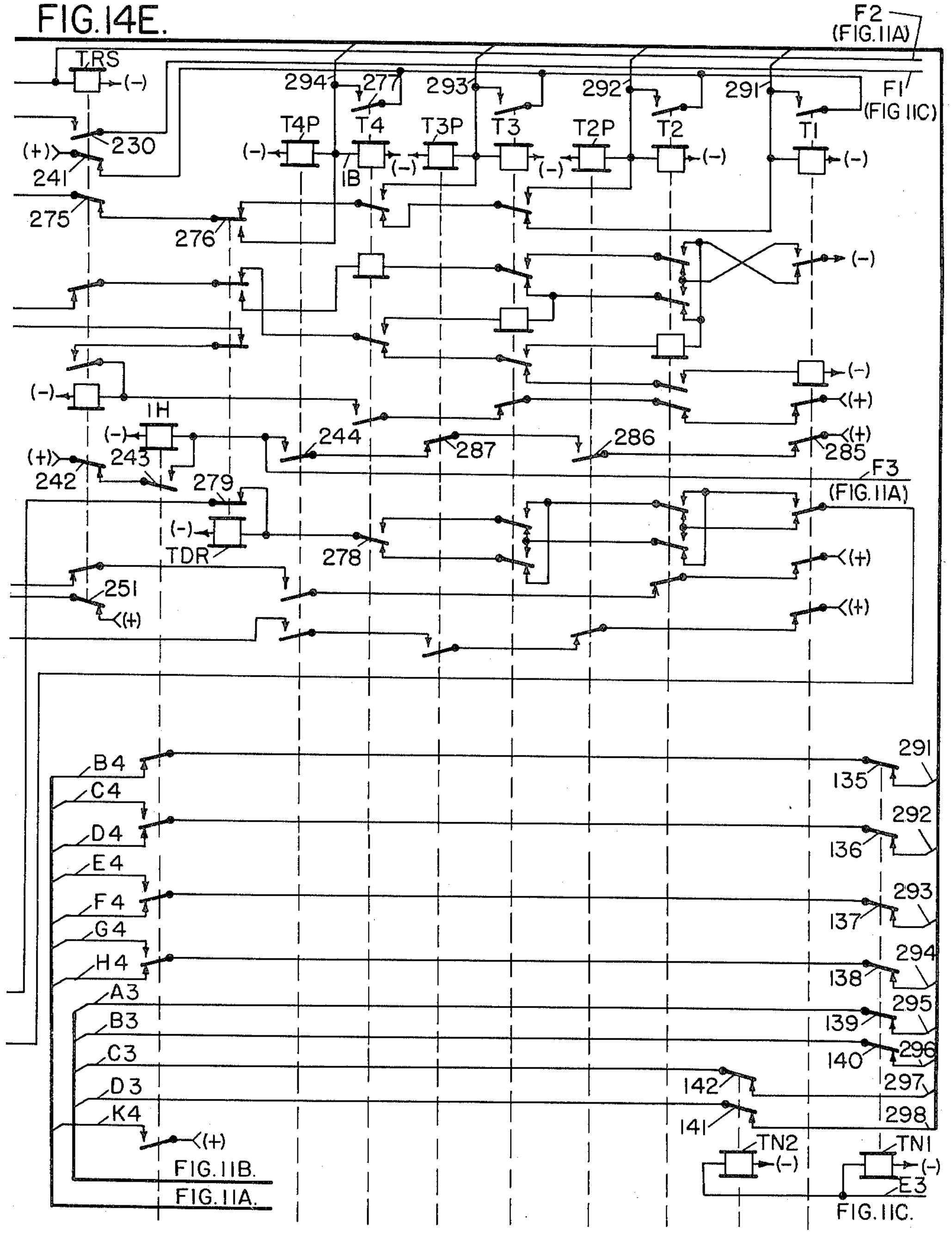
Figures 14F, 14L:
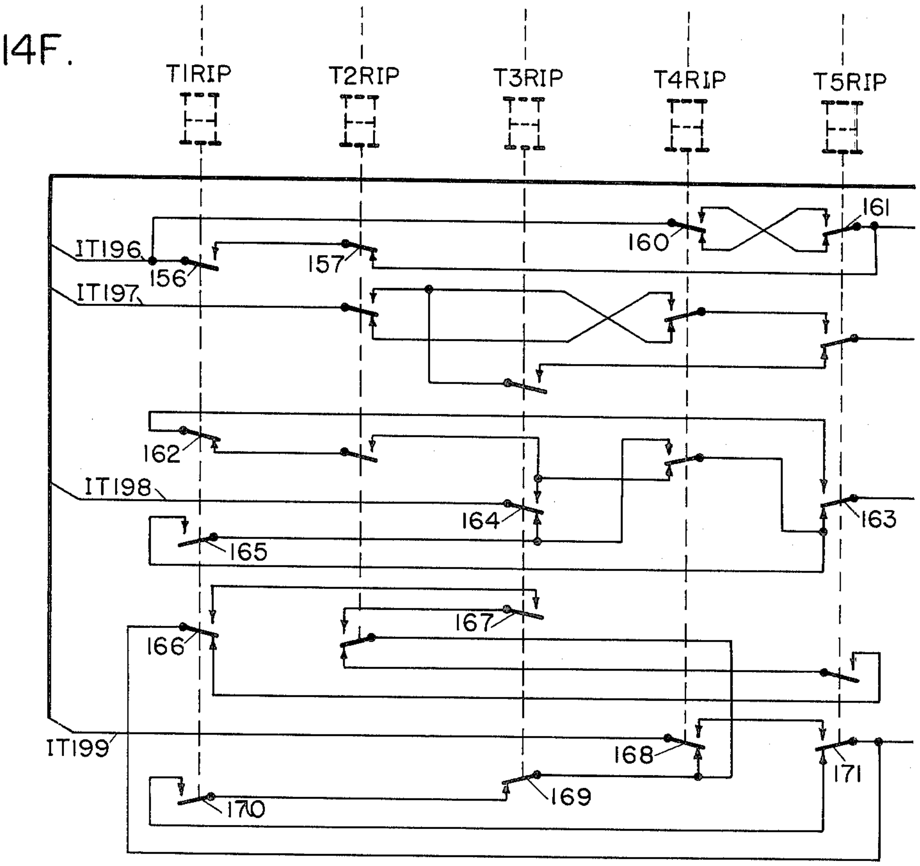
Figure 14G:
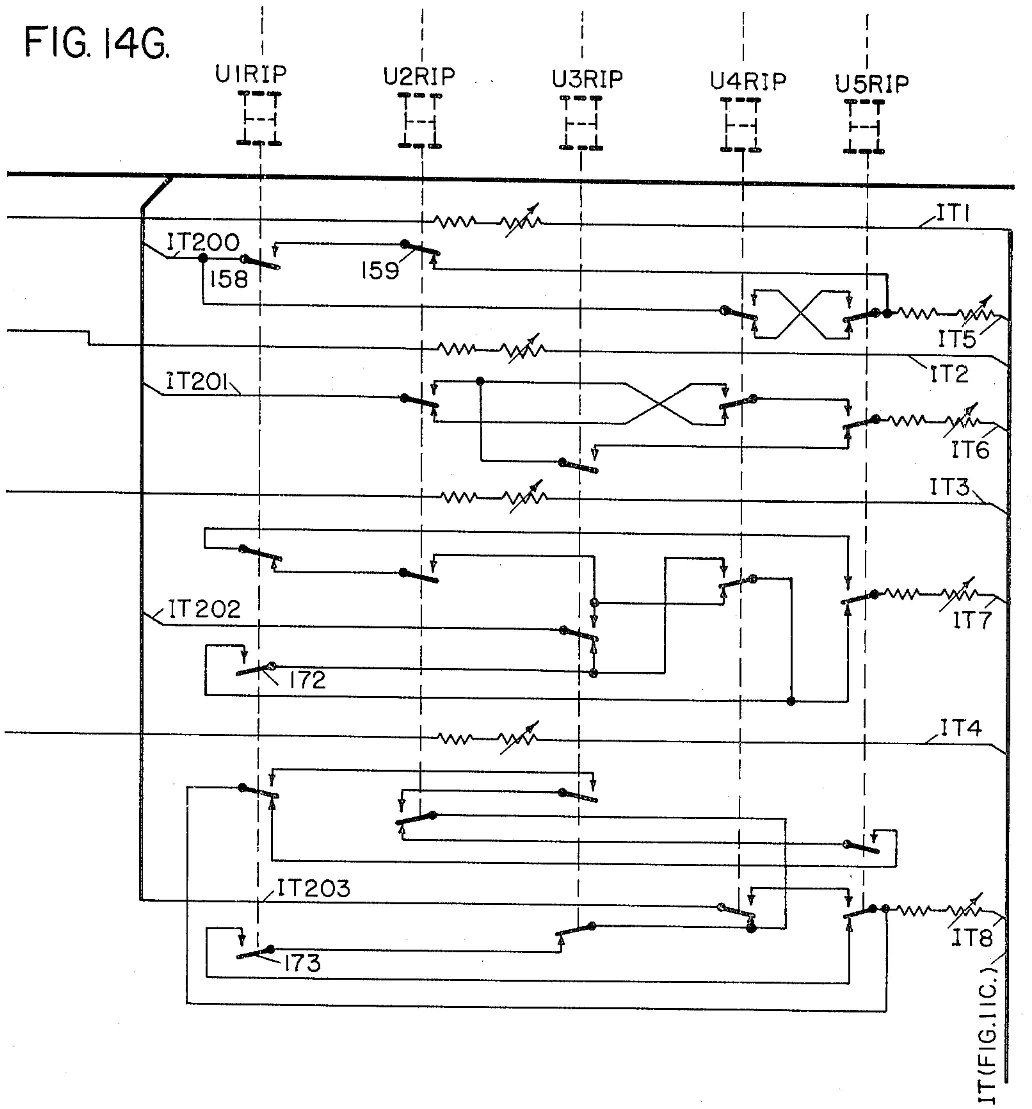
Figure 14H:
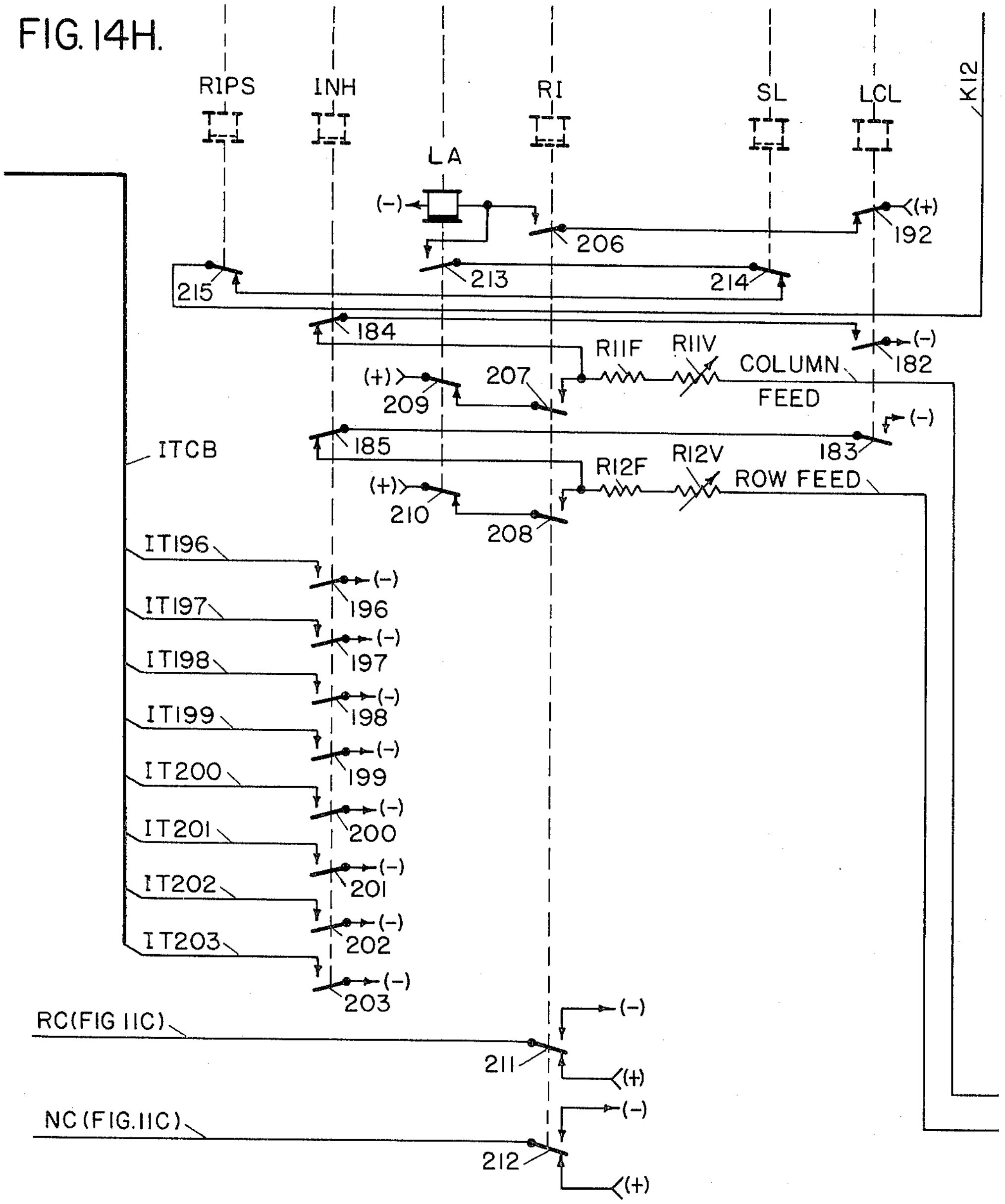
Figure 14J:
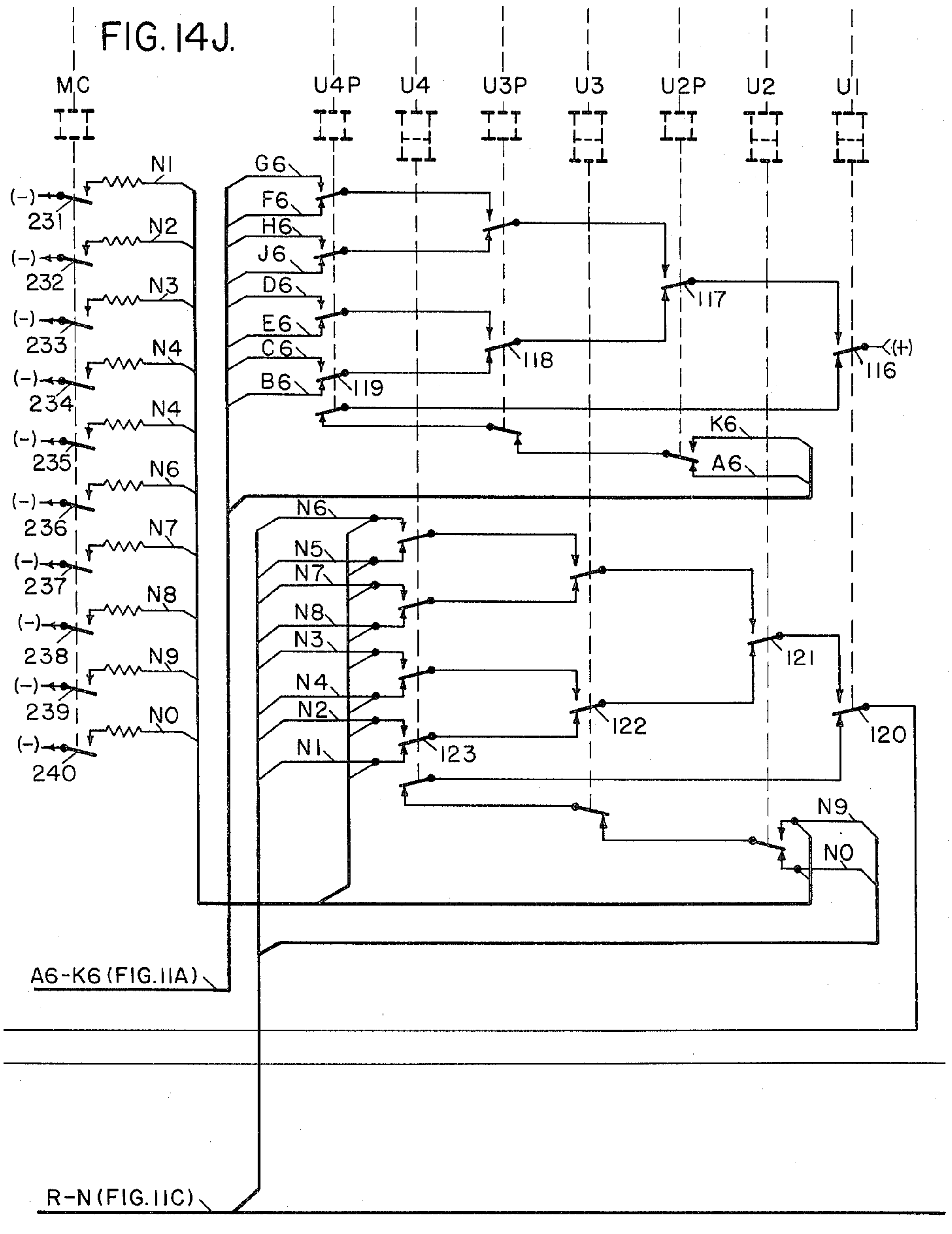
Figure 14K:
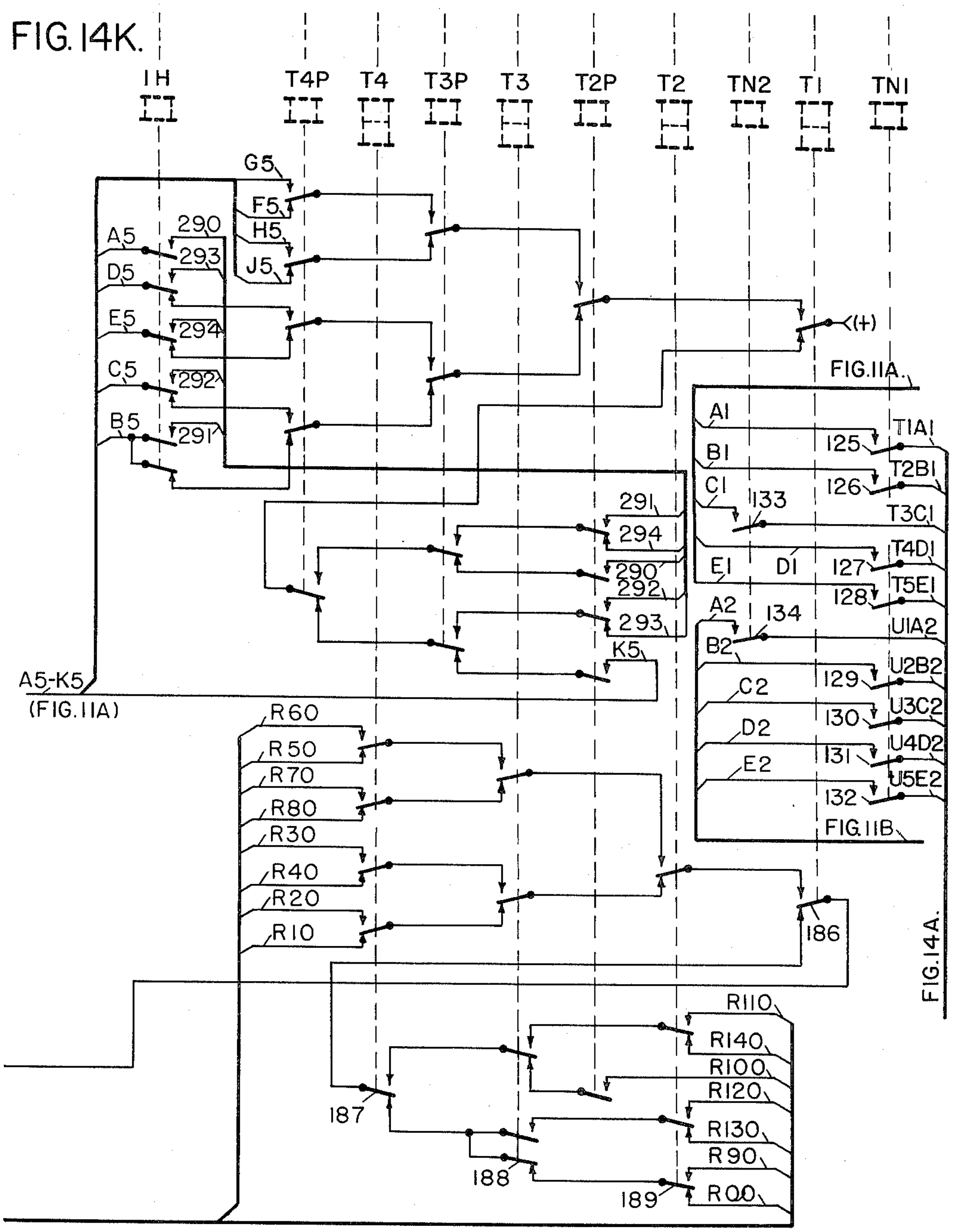

FIG. 14L—Shows arrangement of FIGS. 14A through 14K.

FIGS. 15A, 15B, 15C, 15D, 15E, 15F, 15G—Schematic diagram for the read-out programming unit. These figures show a diagram which should be arranged as shown by the keq og FIG. 15H.

Figure 15A:
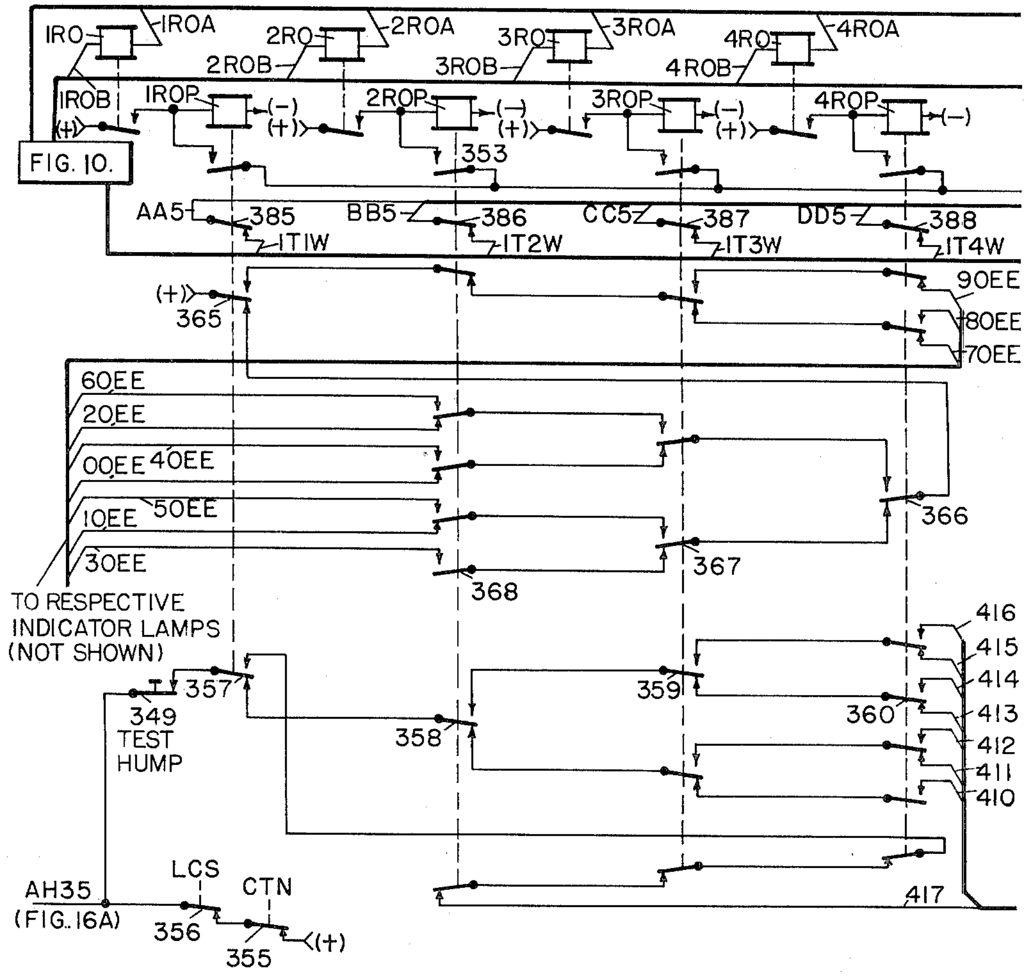
Figure 15B:
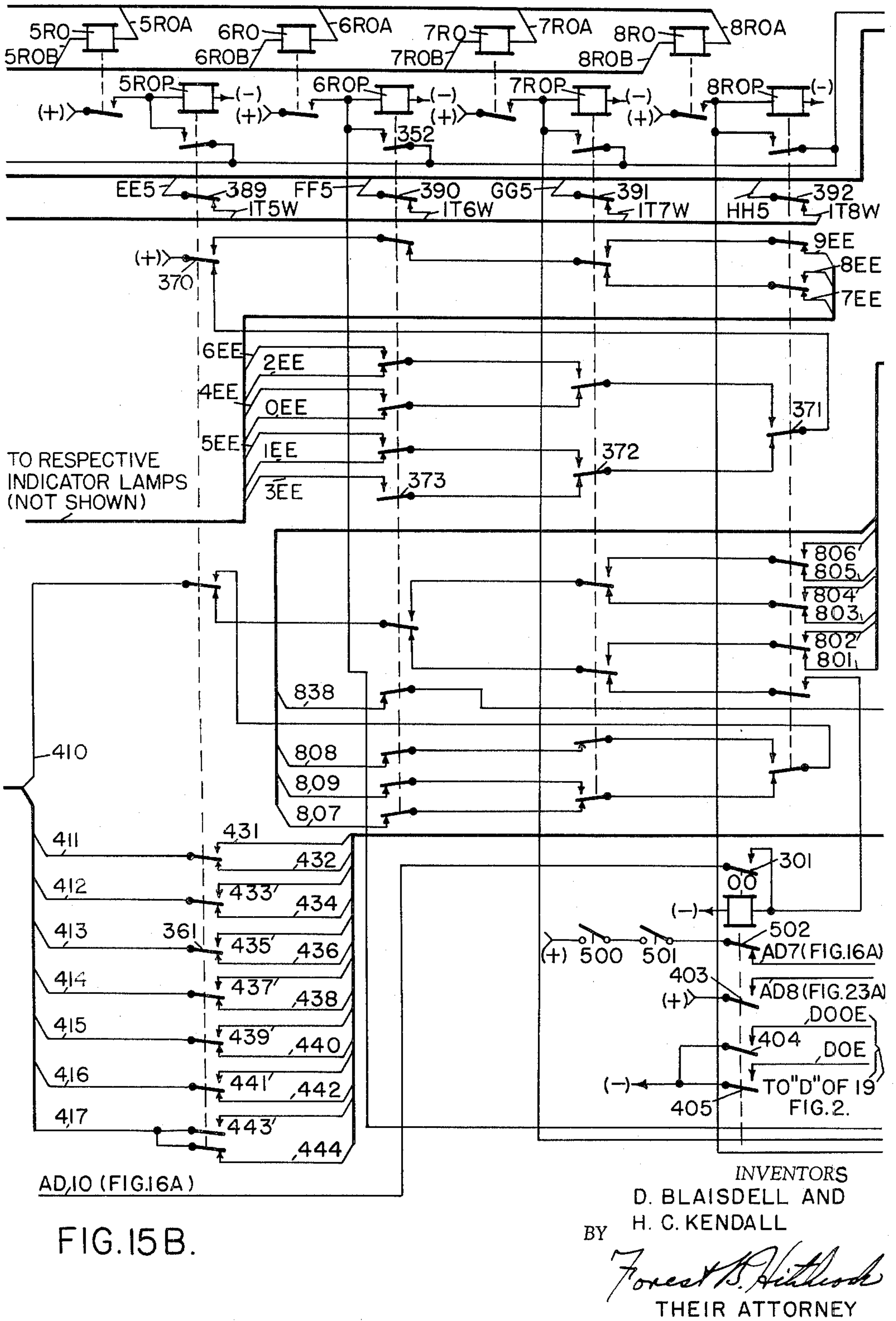
Figure 15C:
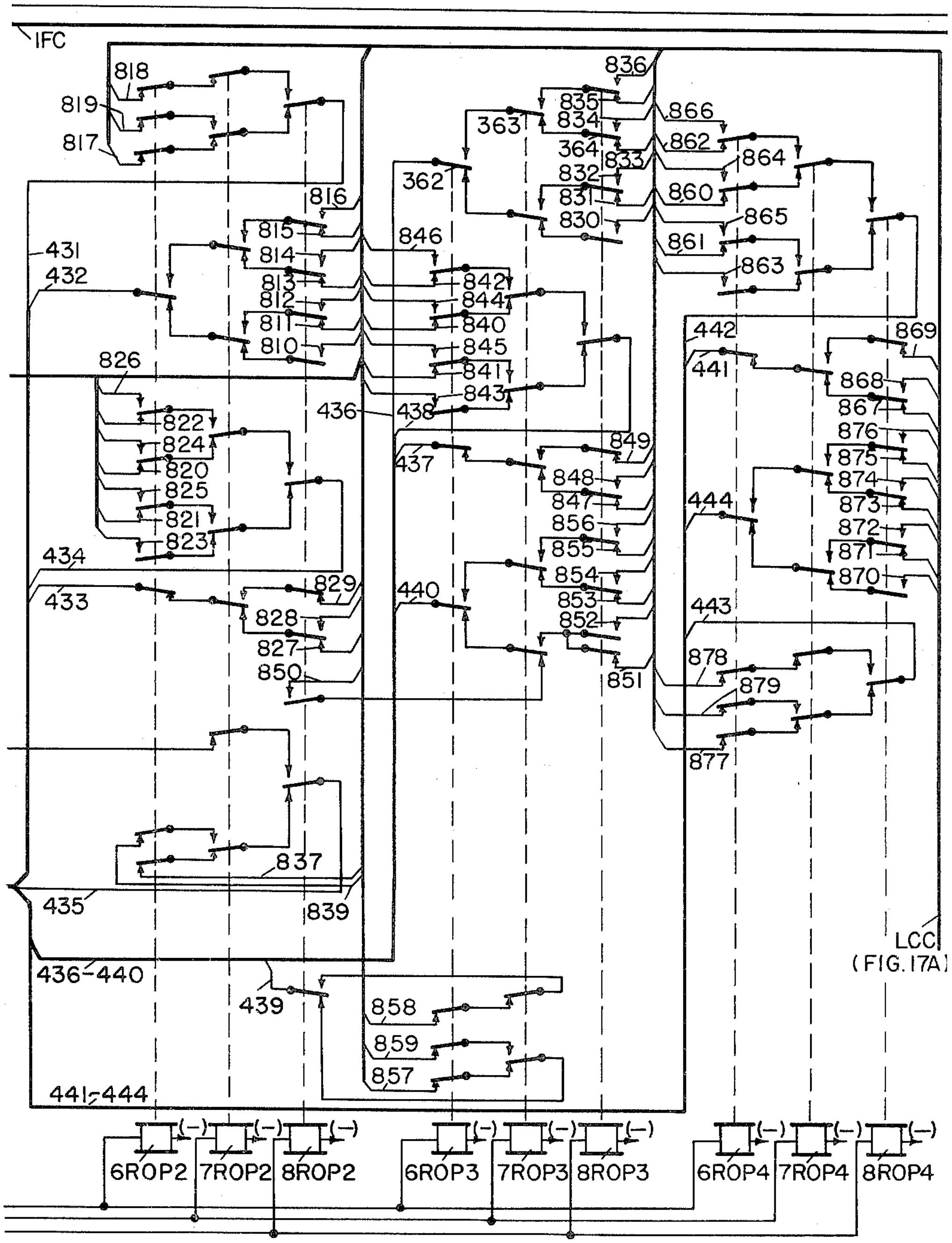
Figure 15D:
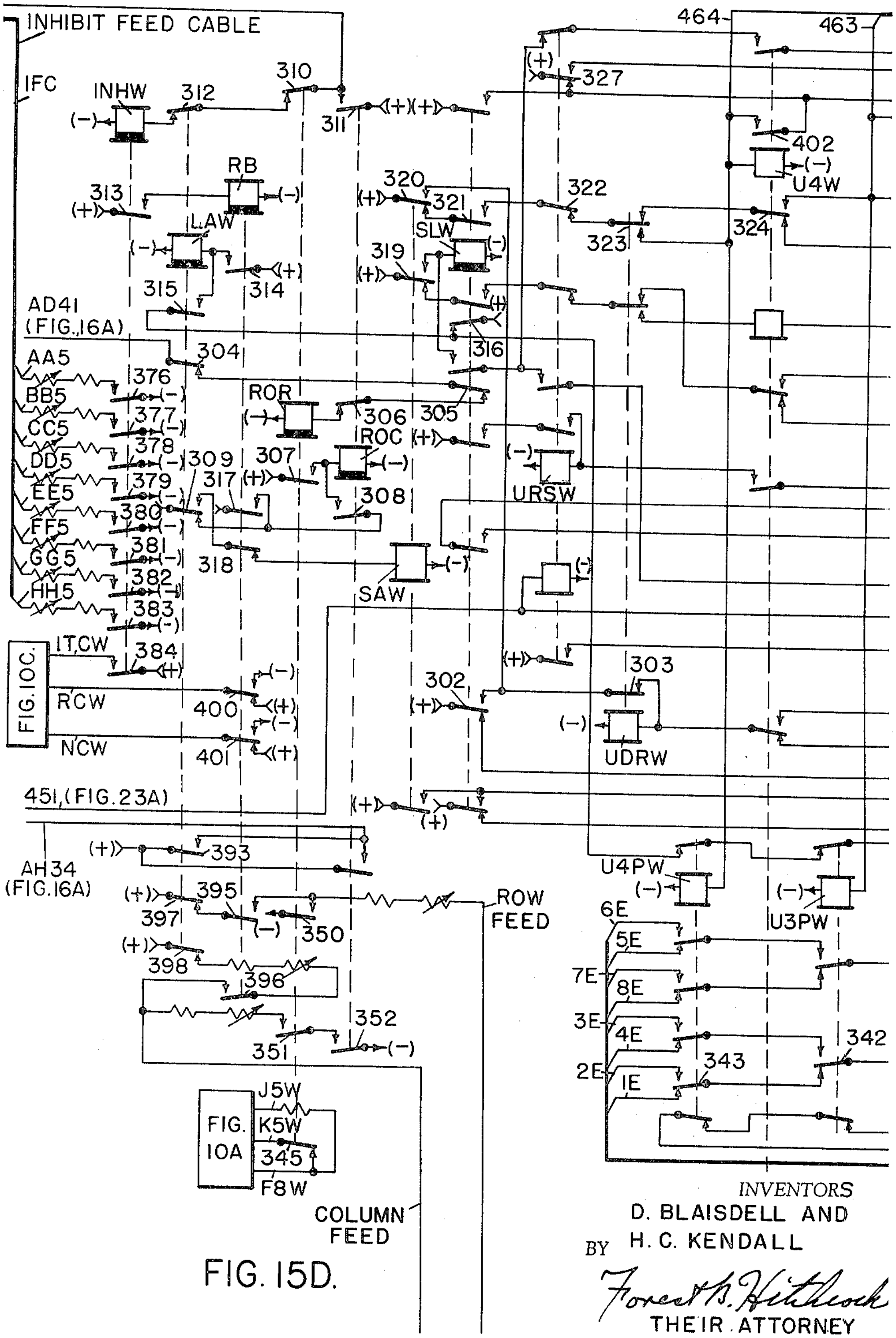
Figure 15E:
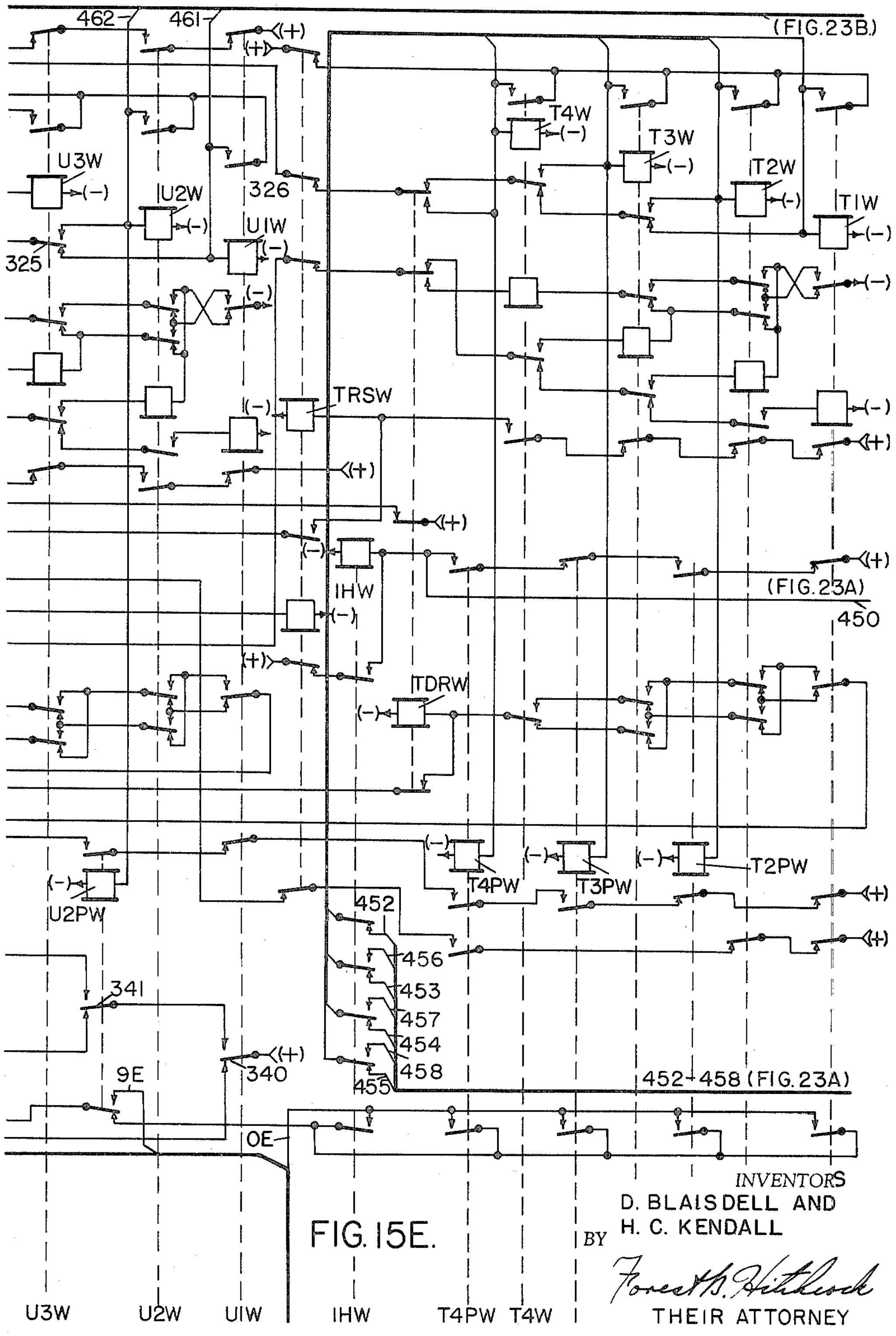
Figure 15F:
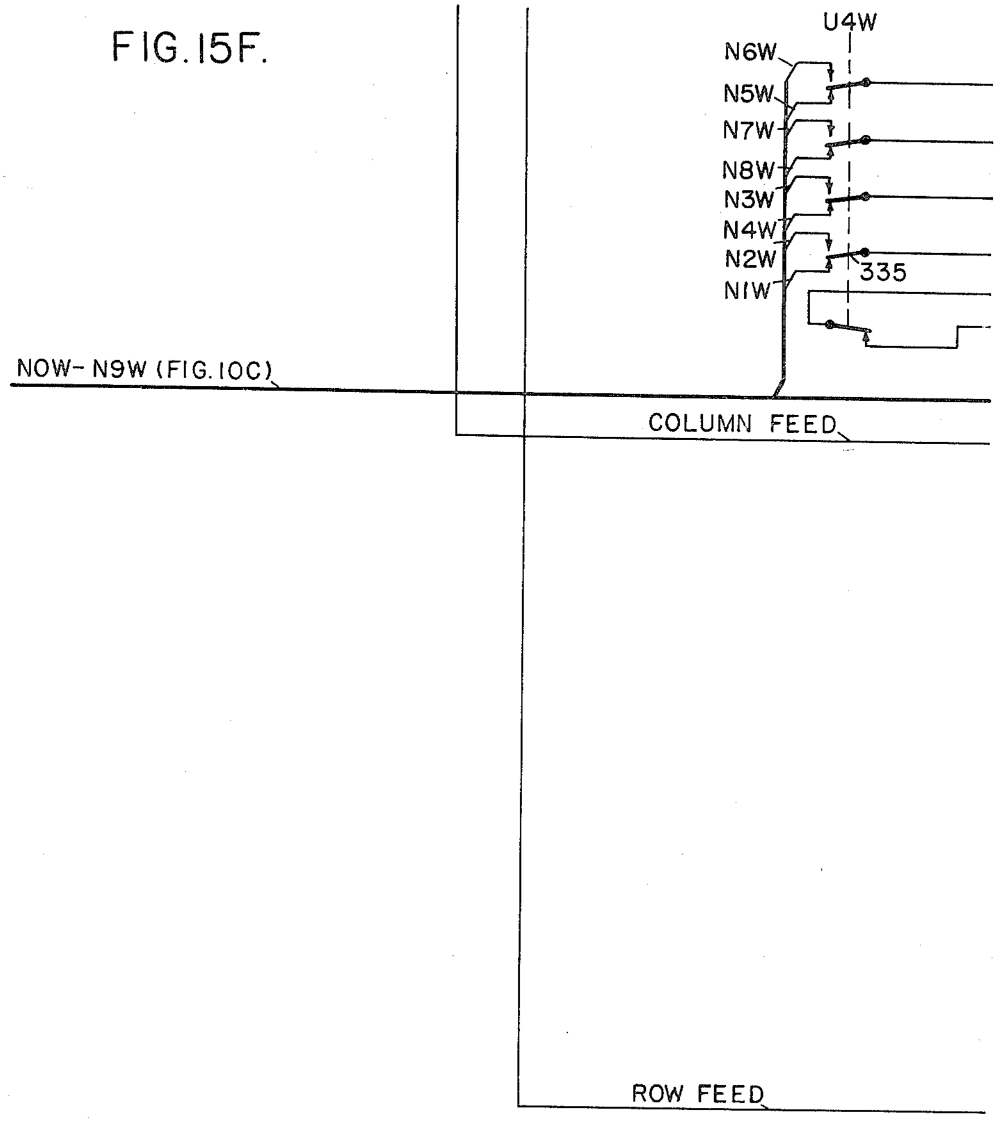
Figure 15G:
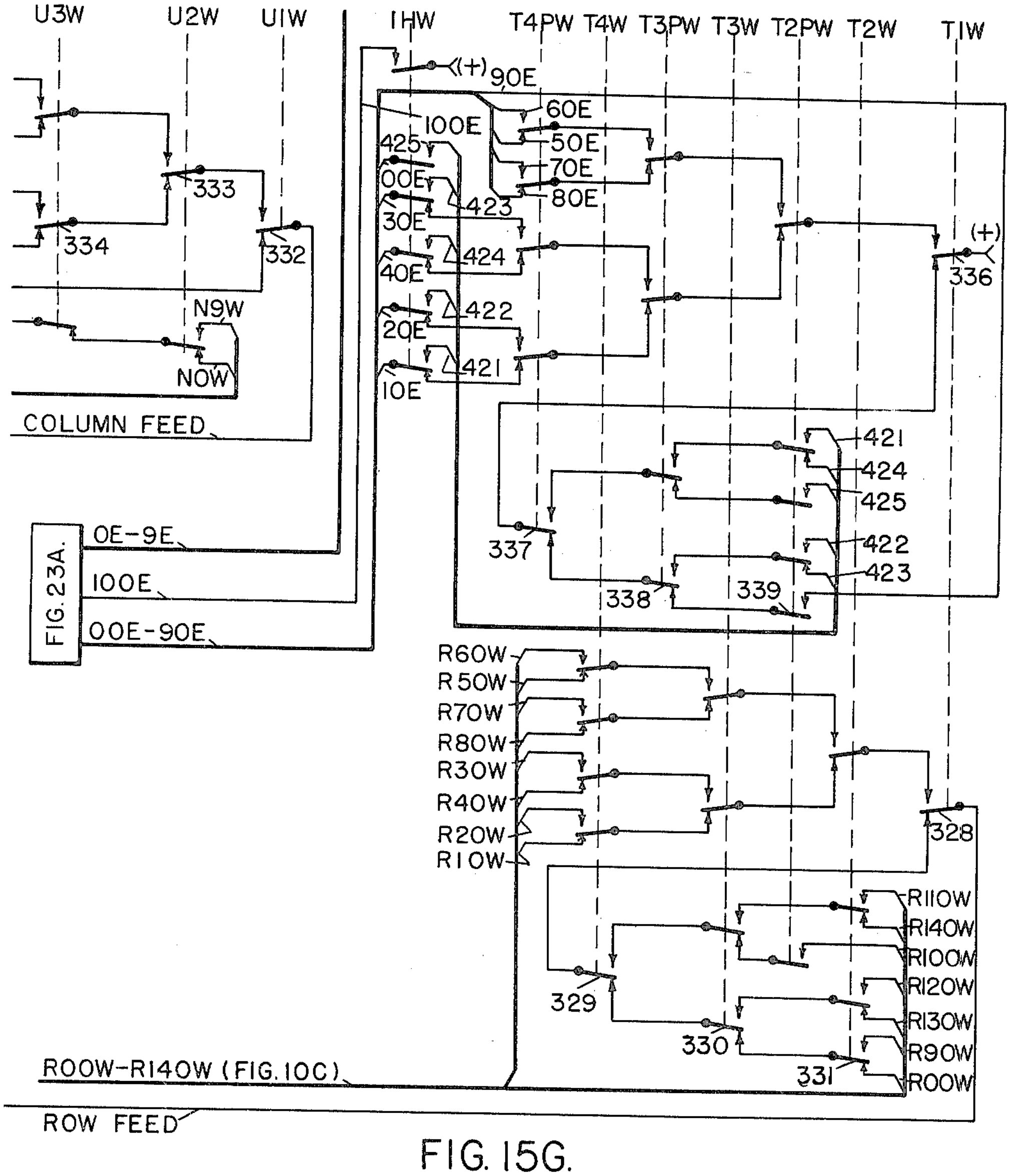
Figure 15H:
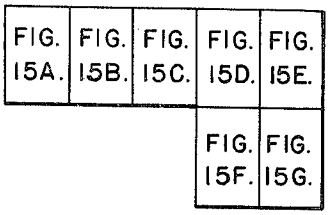

FIG. 15H—Shows arrangement of FIGS. 15A through 15G.

Figures 16A, 16B:
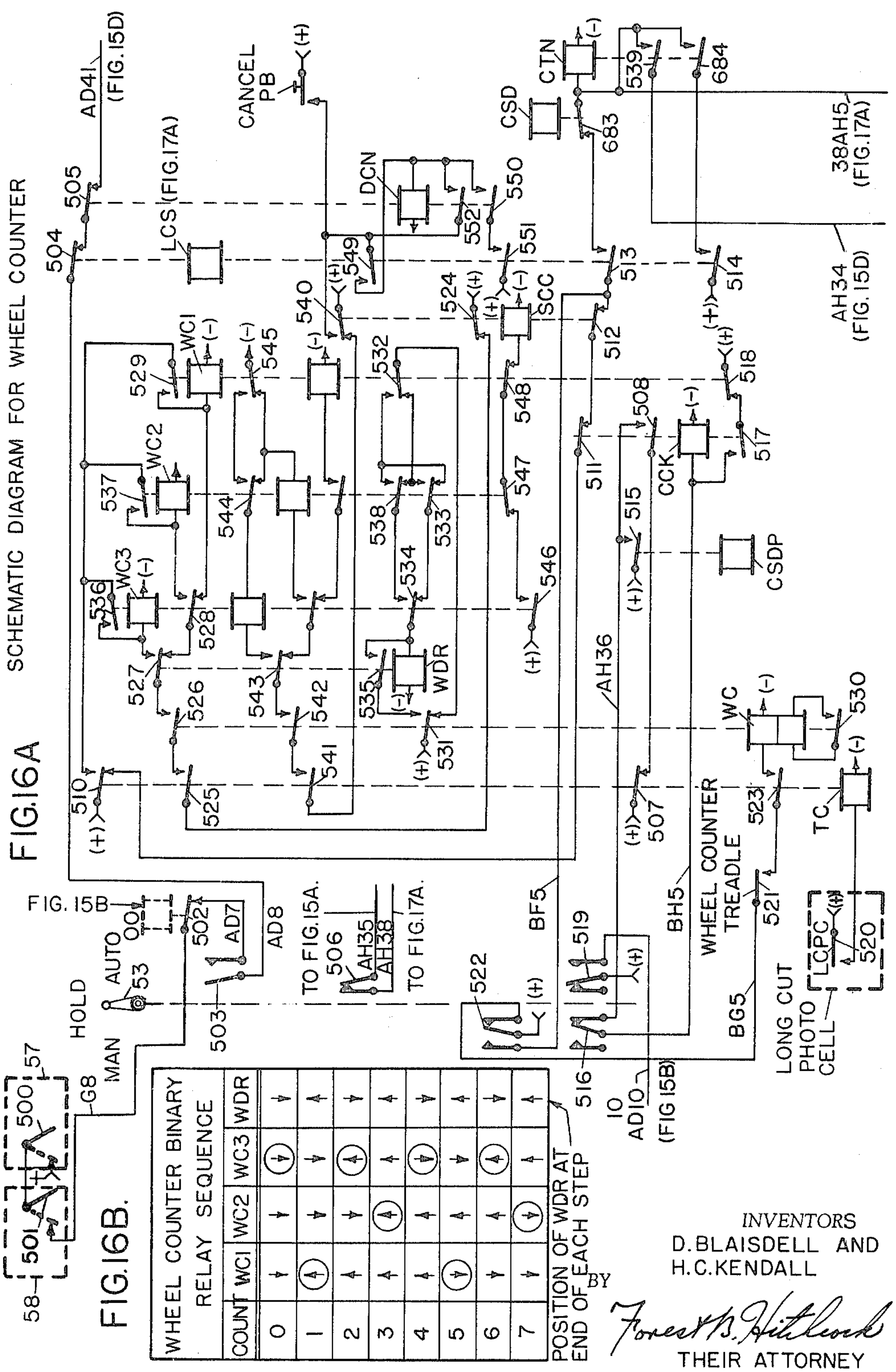

FIG. 16A—Schematic diagram for the wheel counter. This figure shows apparatus for the wheel counter which is considered as part of the read-out system inasmuch as its circuit as shown by this figure ties directly to that of FIG. 17.

FIG. 16B—Wheel counter binary relay sequence chart.

Figure 17A:
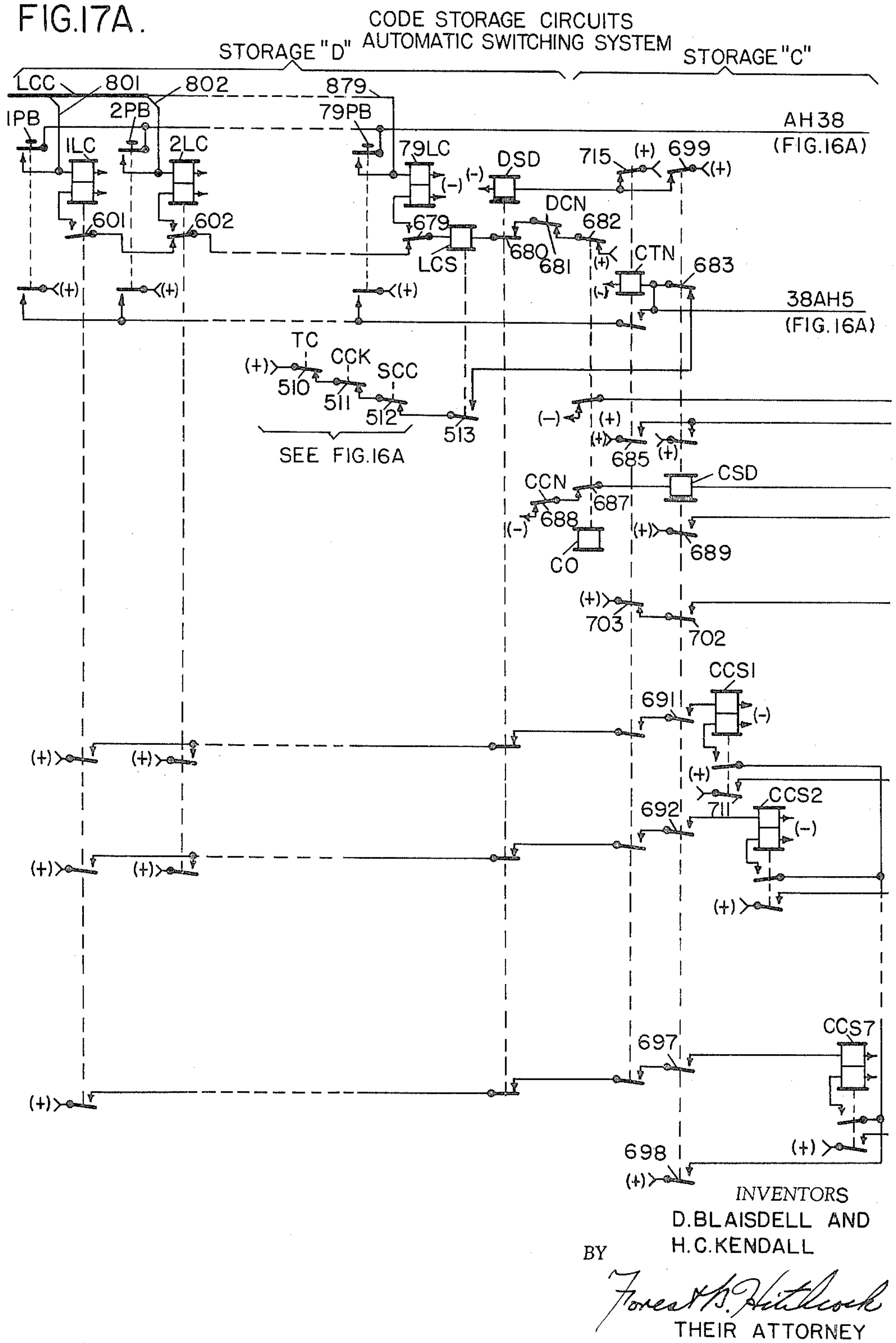
Figure 17B:
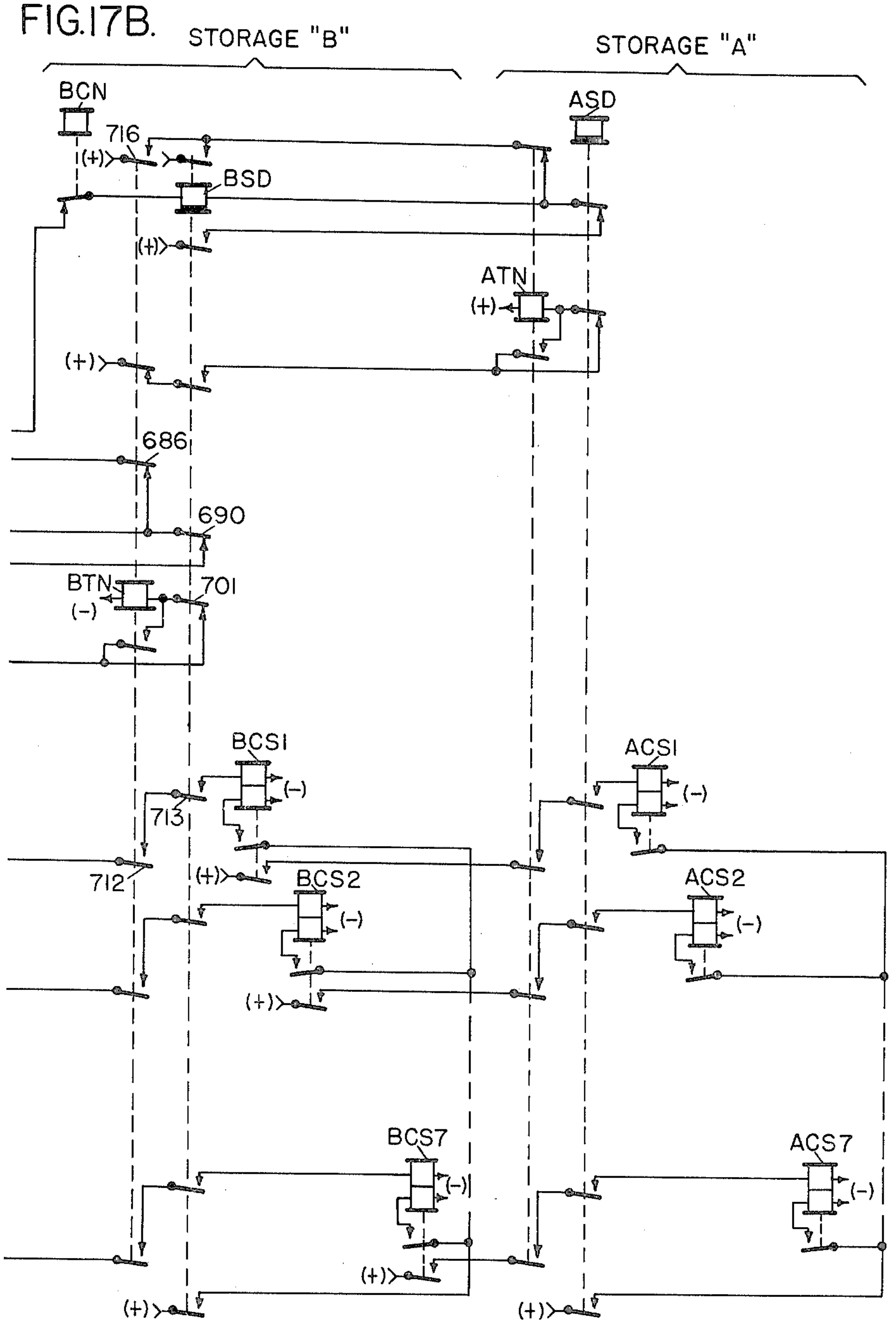

FIGS. 17A, 17B—Code storage circuits—automatic switching system. The circuits of these figures show the relationship between the automatic switching circuits and the receiving, storage and control circuits of this invention.

Figure 18:
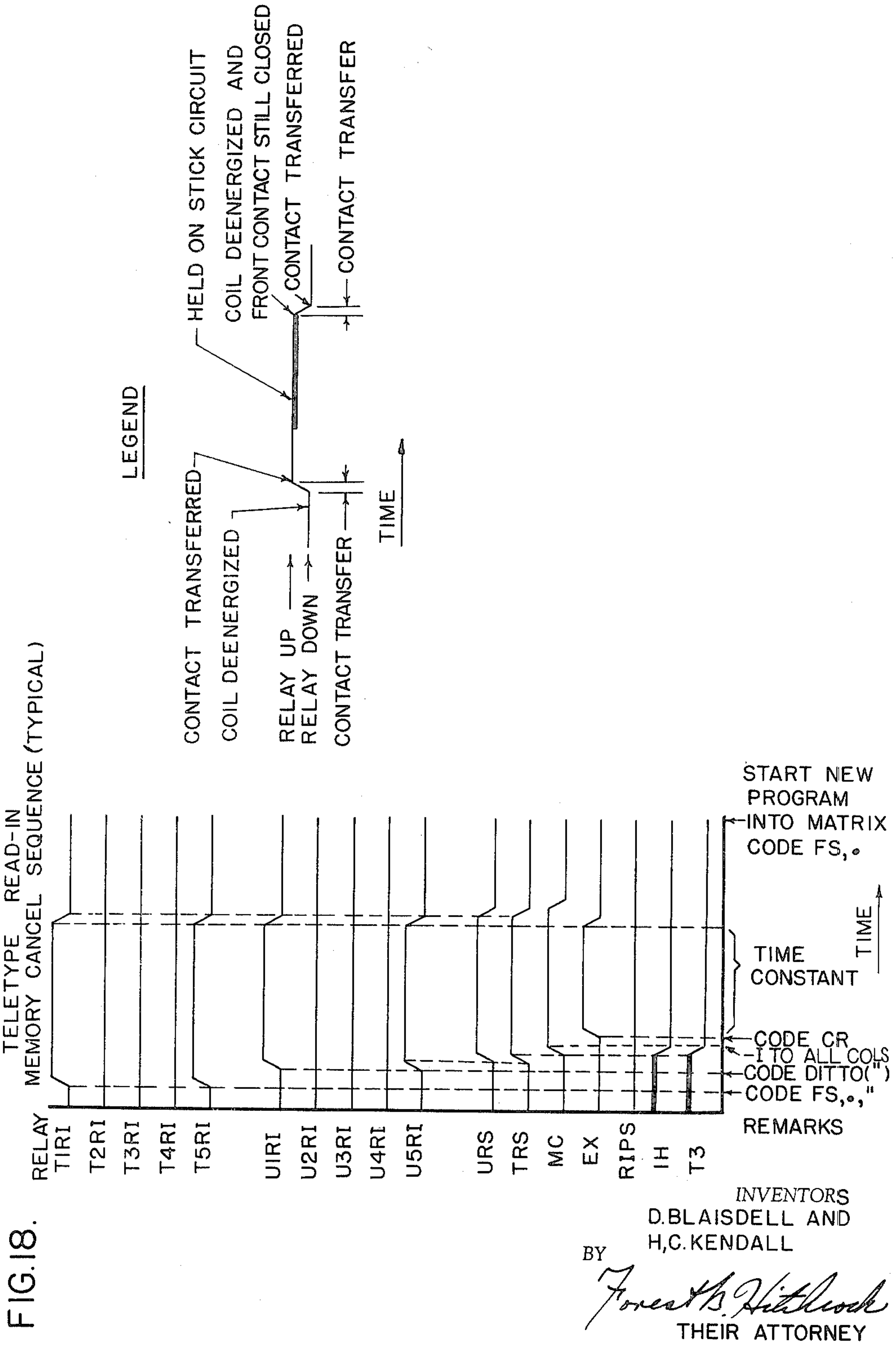

FIG. 18—Teletype read-in of memory cancel sequence (typical). This figure shows a chart which serves as an aid in determining the cause or effect of various functions pertaining to the memory cancellation process as accomplished by a Teletype code.

Figures 19A, 19C:
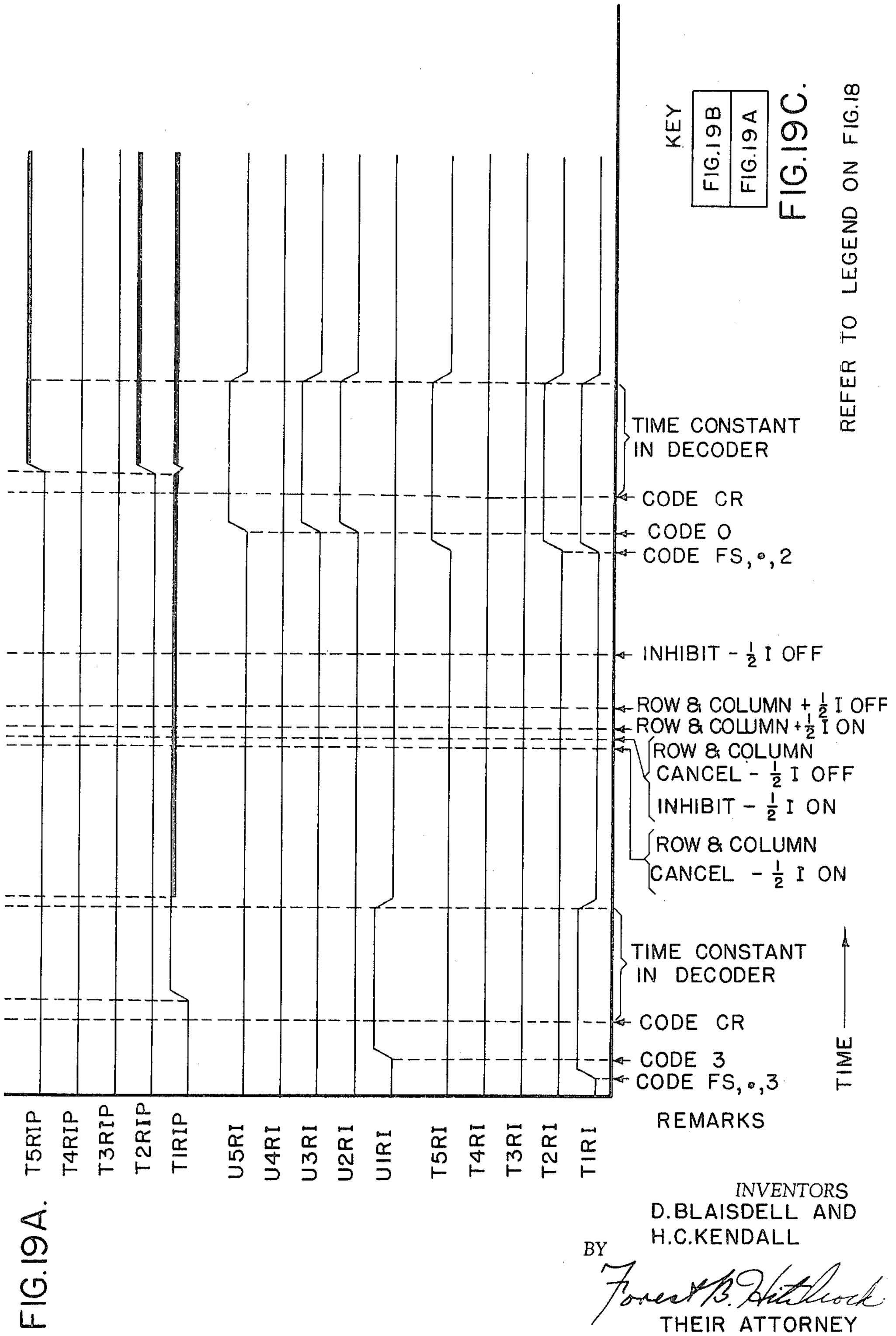
Figure 19B:
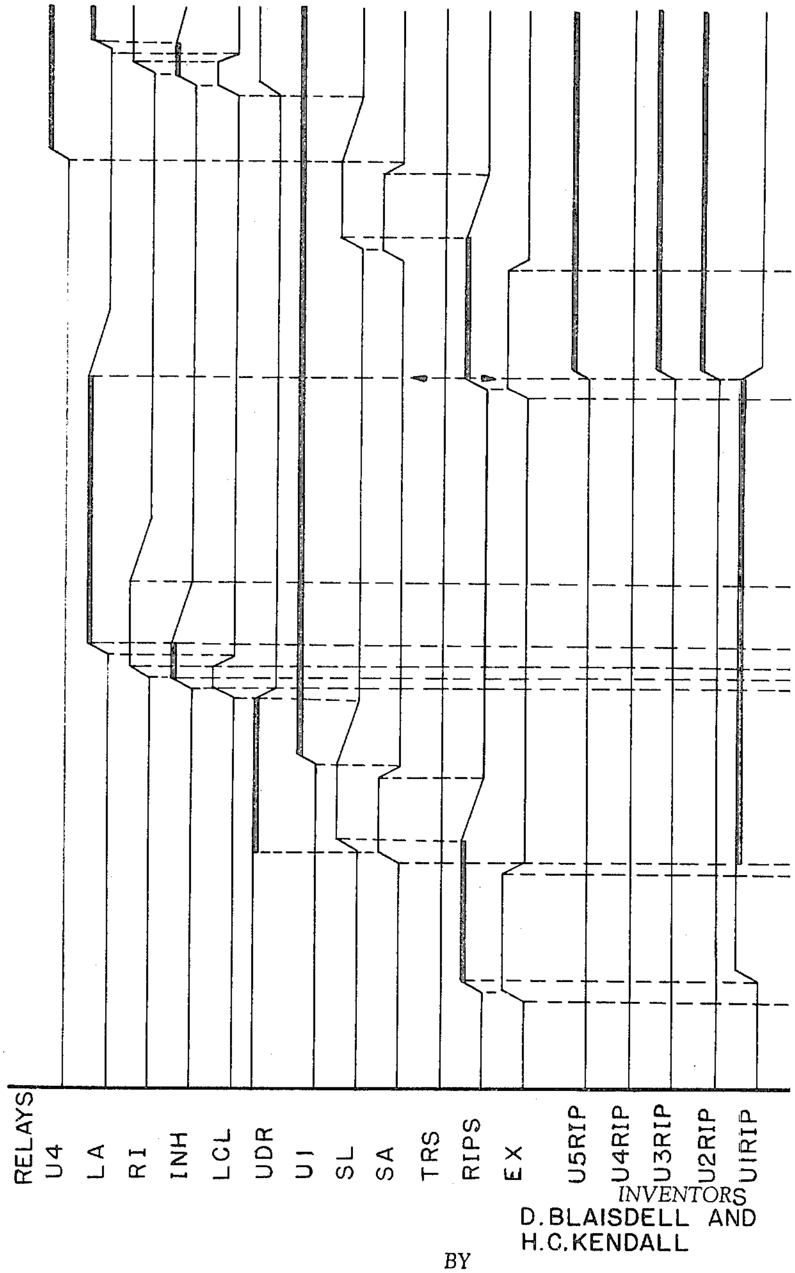

FIGS. 19A, 19B—Teletype read-in of typical first and second car sequence. These figures show a chart which, when arranged as shown by the key of FIG. 19C, serves as an aid in determining the cause or effect of various functions within the system and also indicates the status of various components at any desired time within the time zone specified.

FIG. 19C—shows the arrangement of FIGS. 19A and 19B.

Figures 20A, 20D:
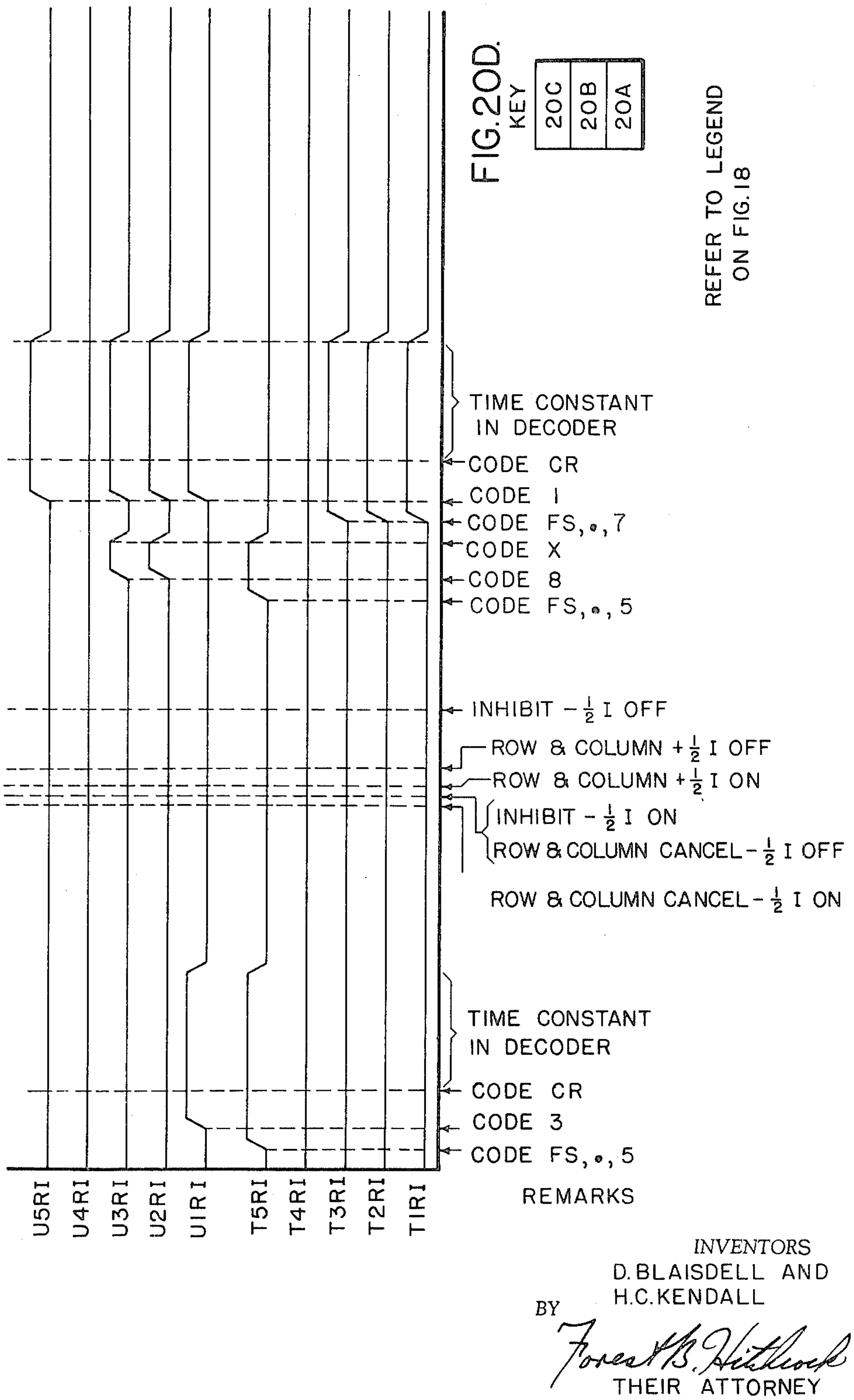
Figure 20B:
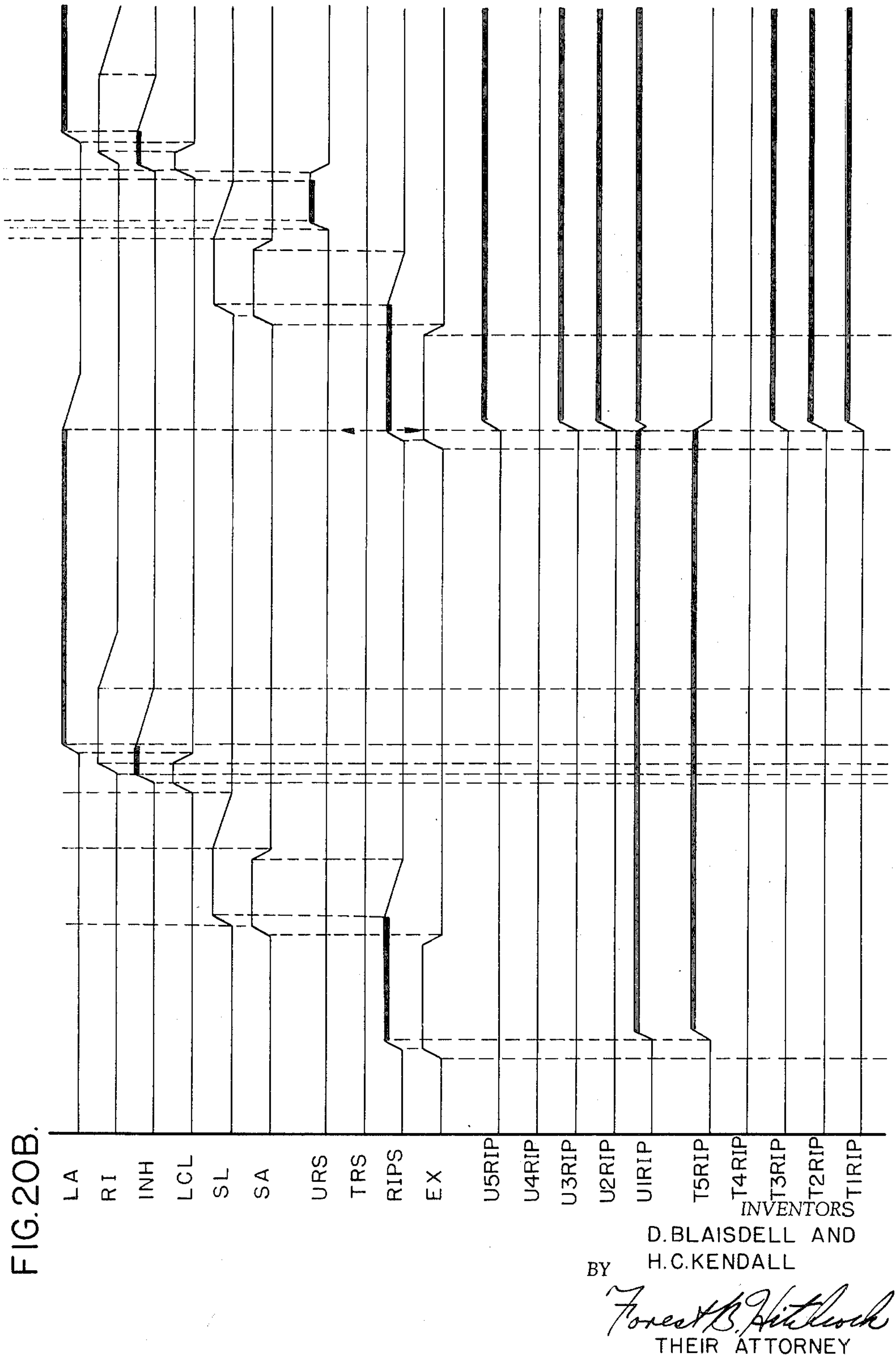
Figure 20C:
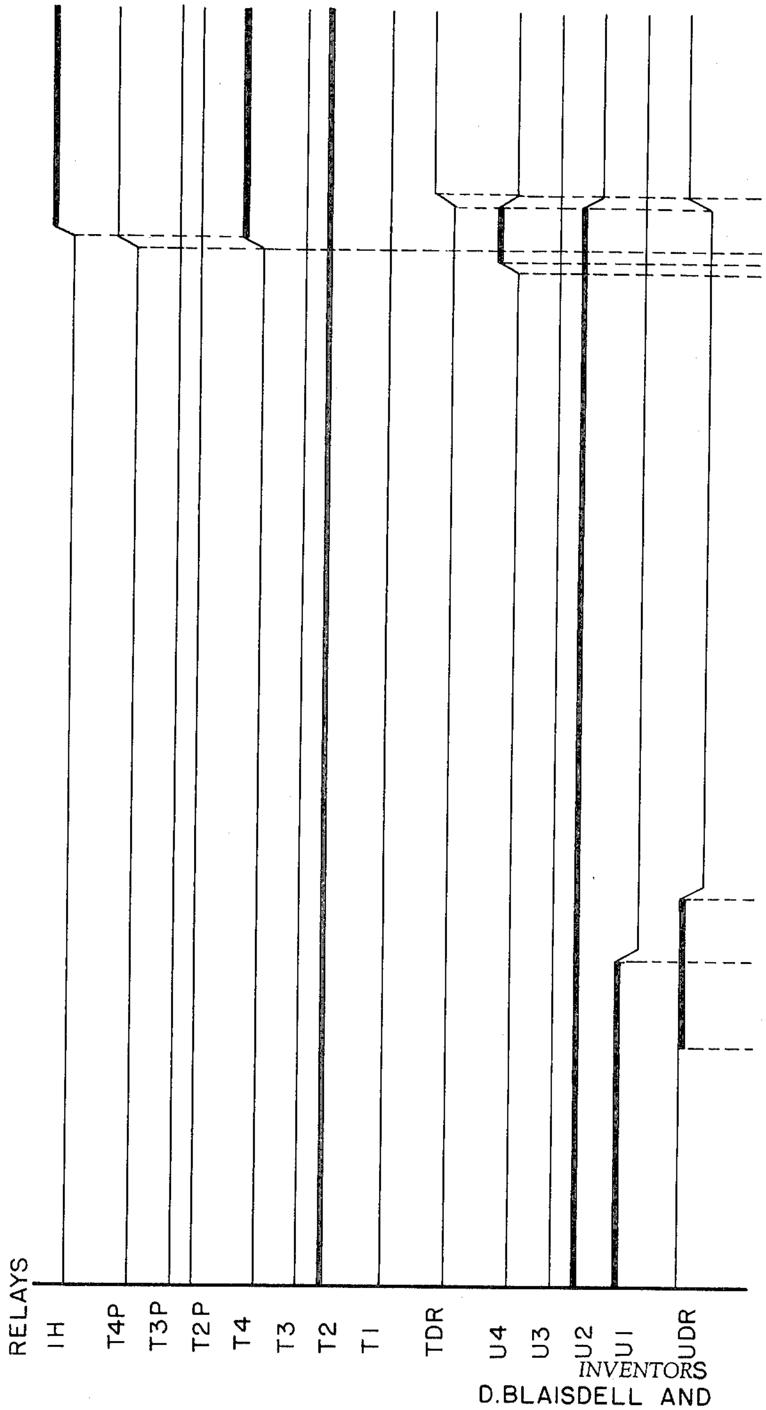

FIGS. 20A, 20B, 20C—Teletype read-in of typical 99th and 100th car sequence. These figures show a chart which, when arranged as indicated by the key of FIG. 20D, serves as an aid for determining the cause and effect of various operations during this automatic read-in process. Since time is plotted on one axis, the condition of the system at any moment within the time zone indicated can be ascertained at a glance.

FIG. 20D—Shows the arrangement of FIGS. 20A, 20B and 20C.

FIGS. 21A, 21B, 21C, 21D, 21E, 21F, 21G, 21H, 21J, 21K, 21L, 21M—Automatic read-out of typical 1st, 2nd, 3rd and 4th car sequence. These figures show a chart which, when arranged as shown in the key of FIG. 21N, serves as an aid in determining the cause or effect of various functions within the systems and also indicates the status of various components at any particular time within the time zone specified.

Figure 21A:
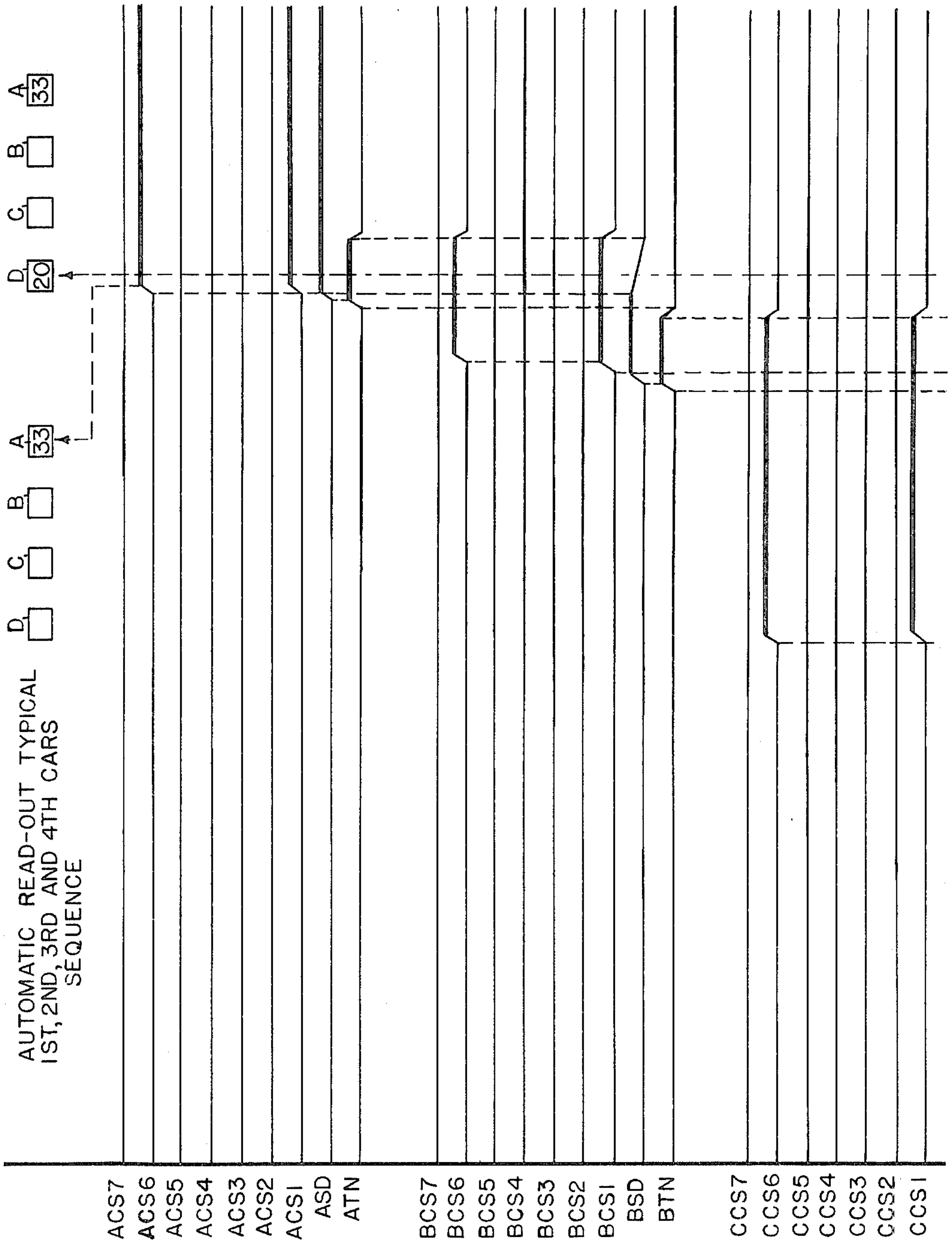
Figure 21B:
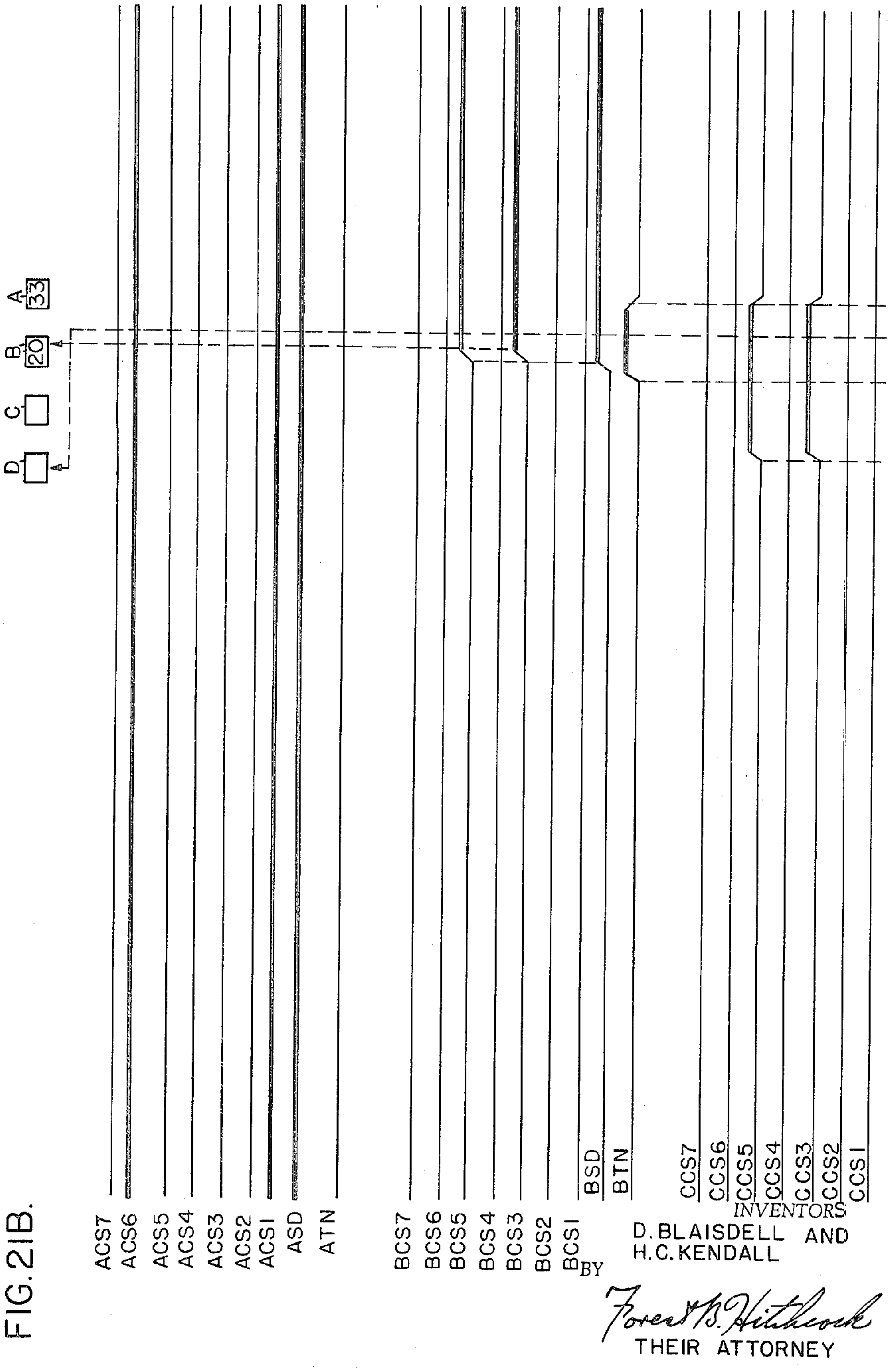
Figure 21C:
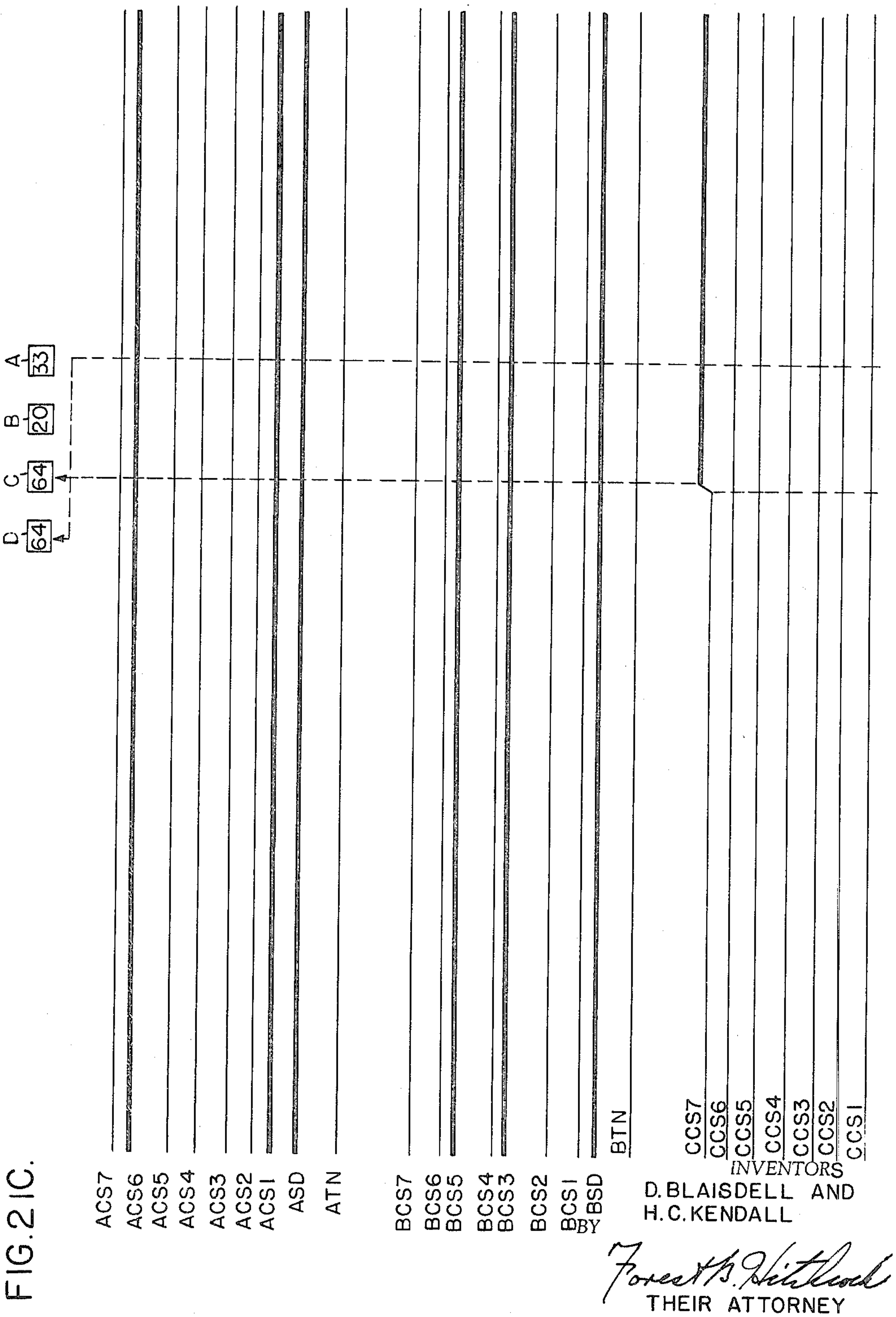
Figure 21D:
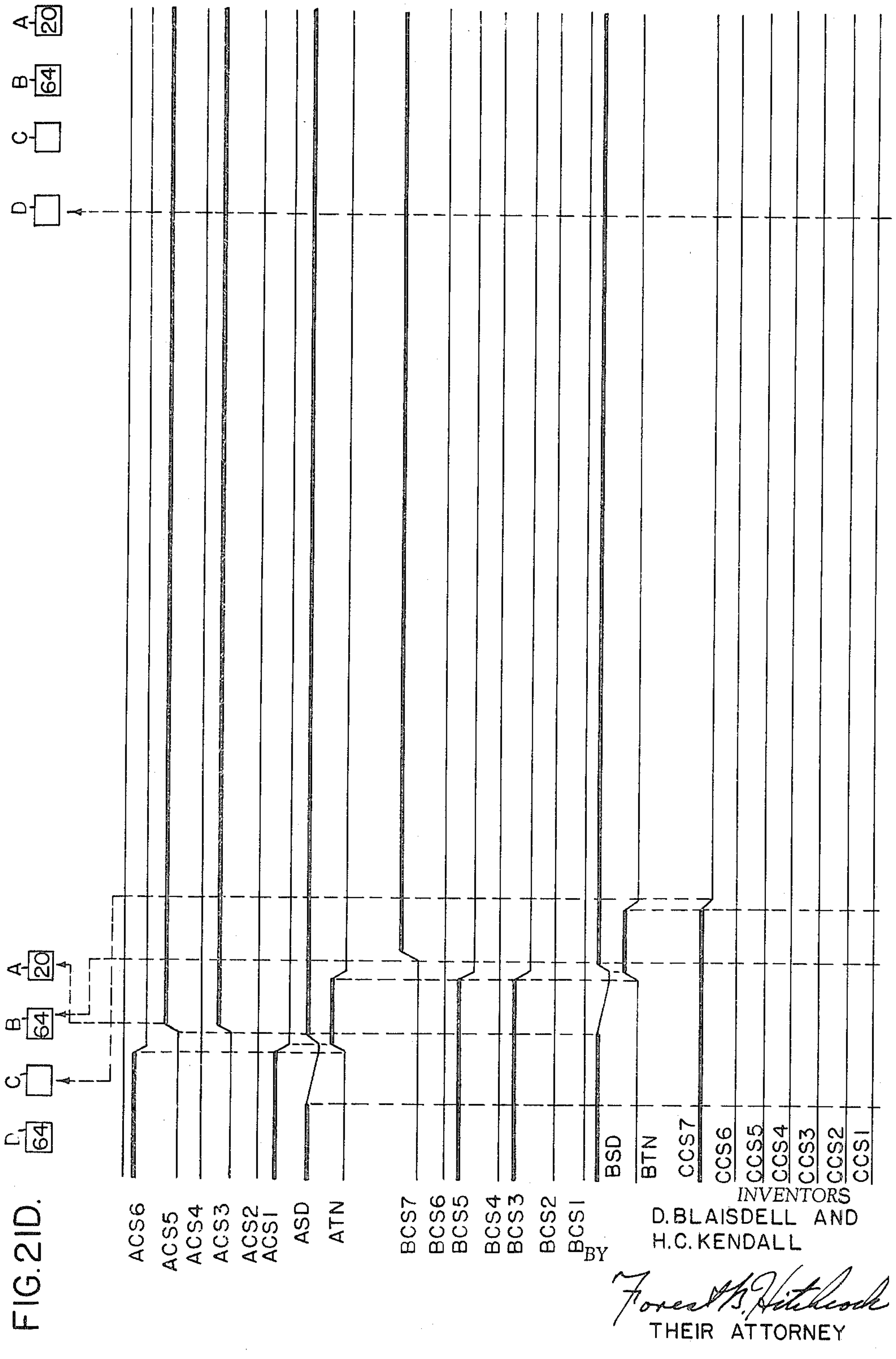
Figure 21E:
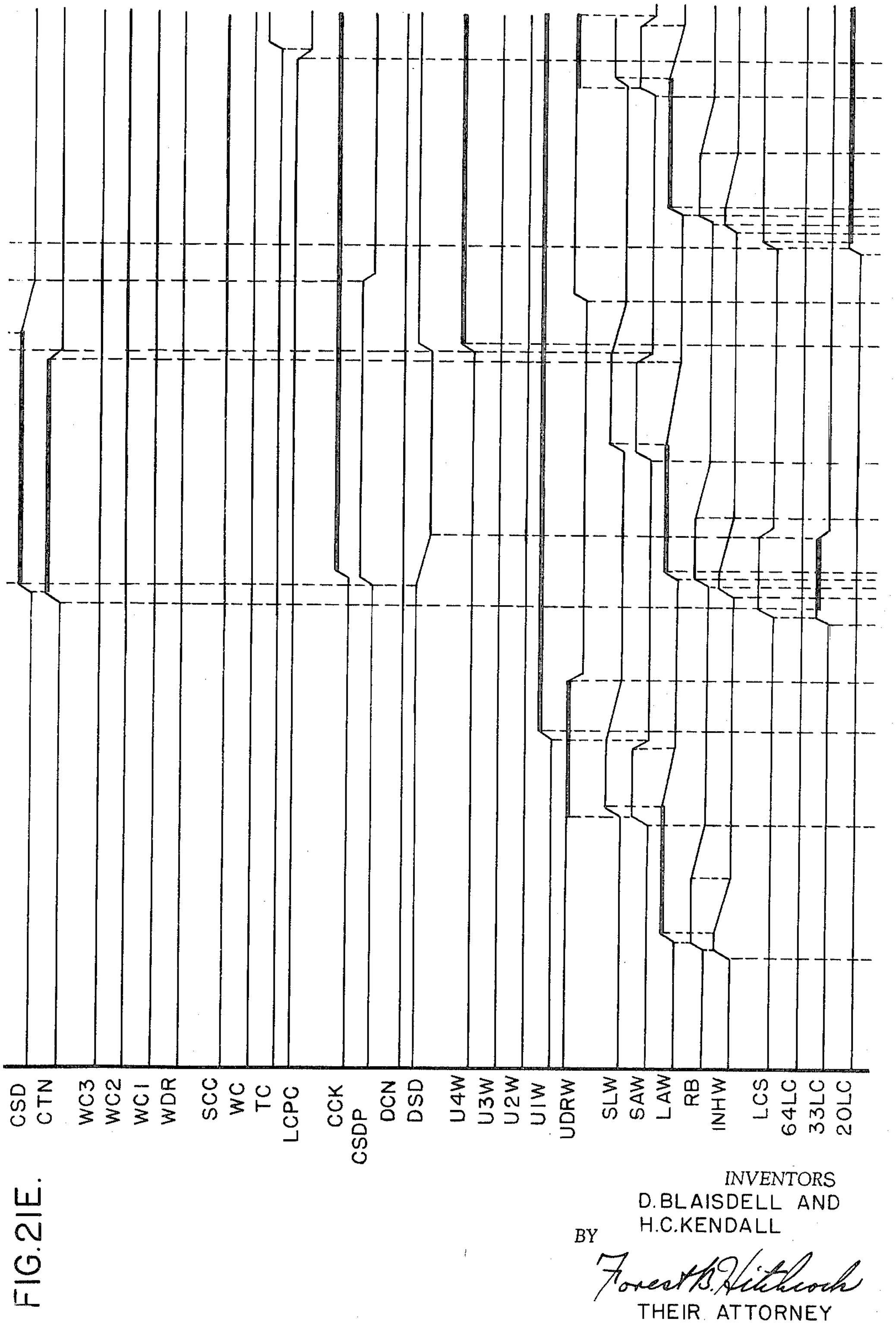
Figure 21F:
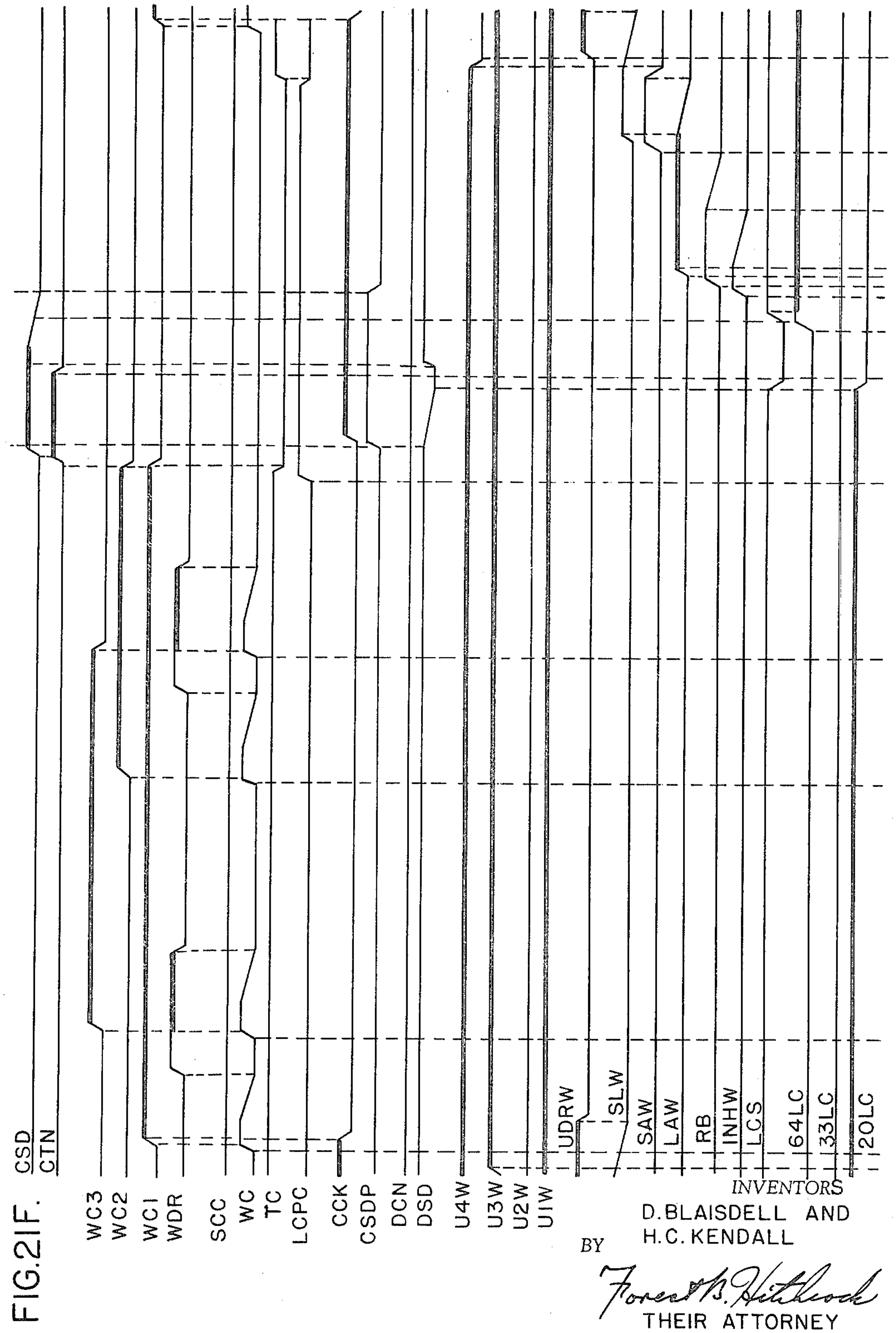
Figure 21G:
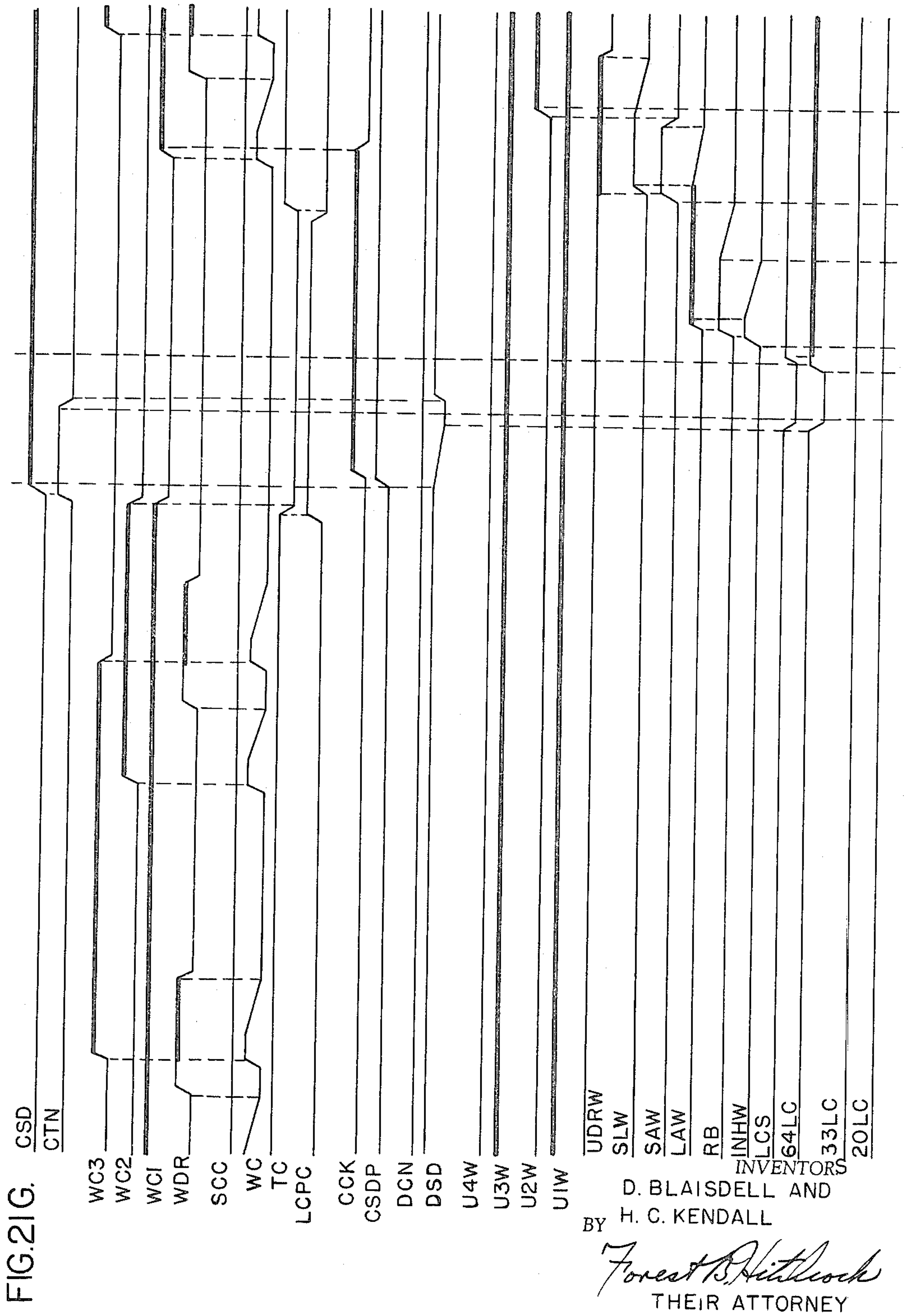
Figure 21H:
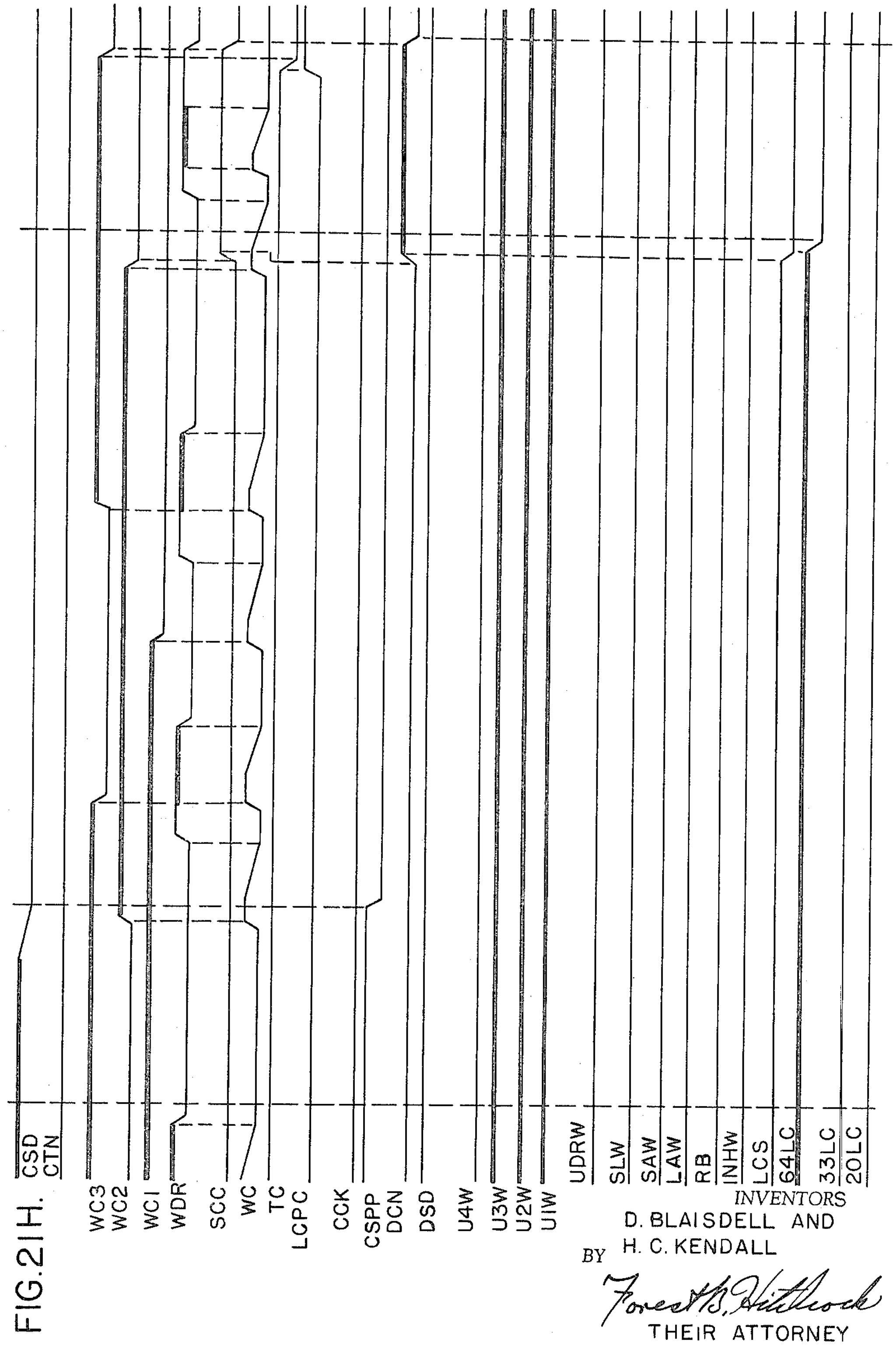
Figure 21J:
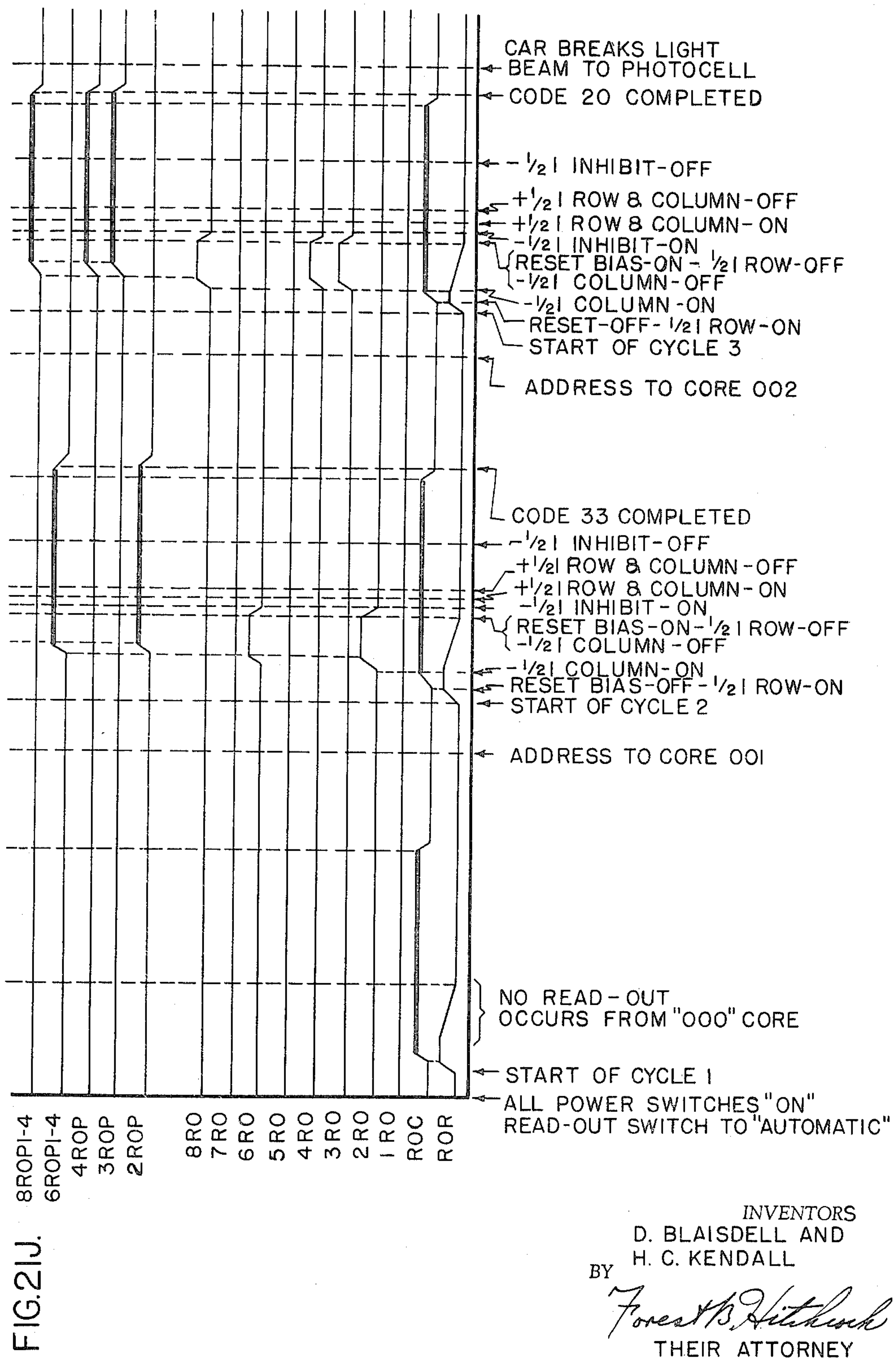
Figure 21K:
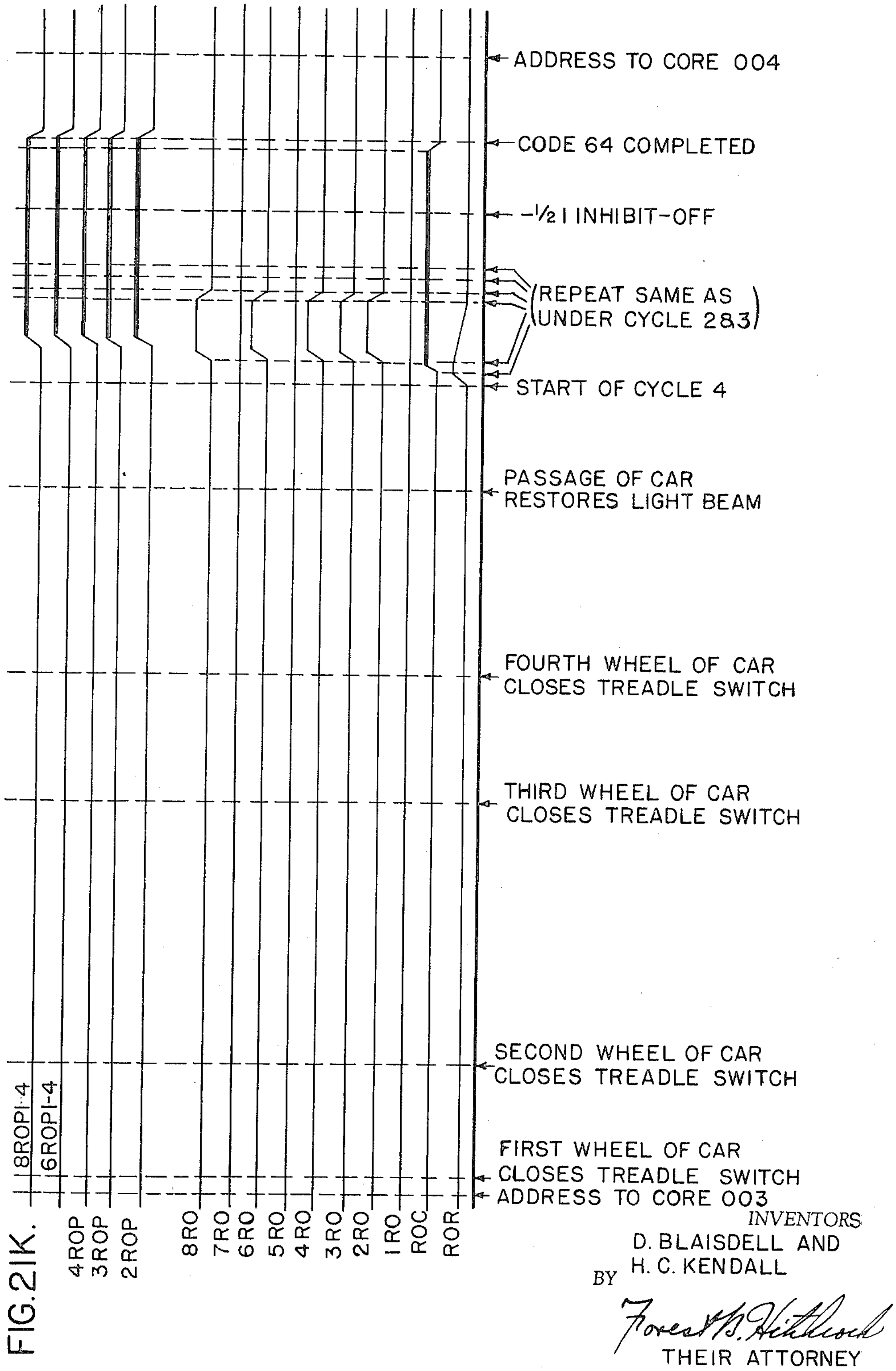
Figure 21L:
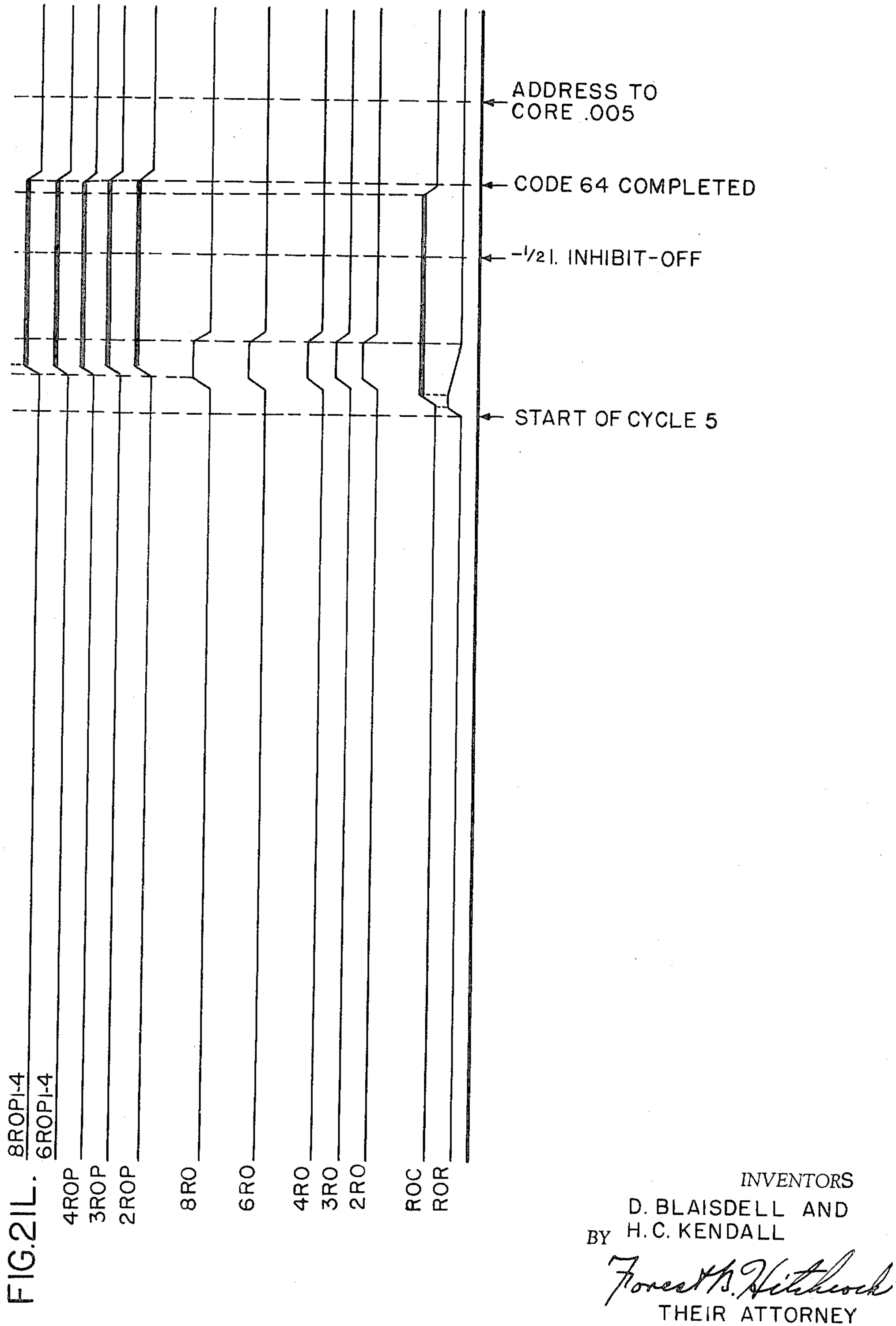
Figures 21M, 21N:
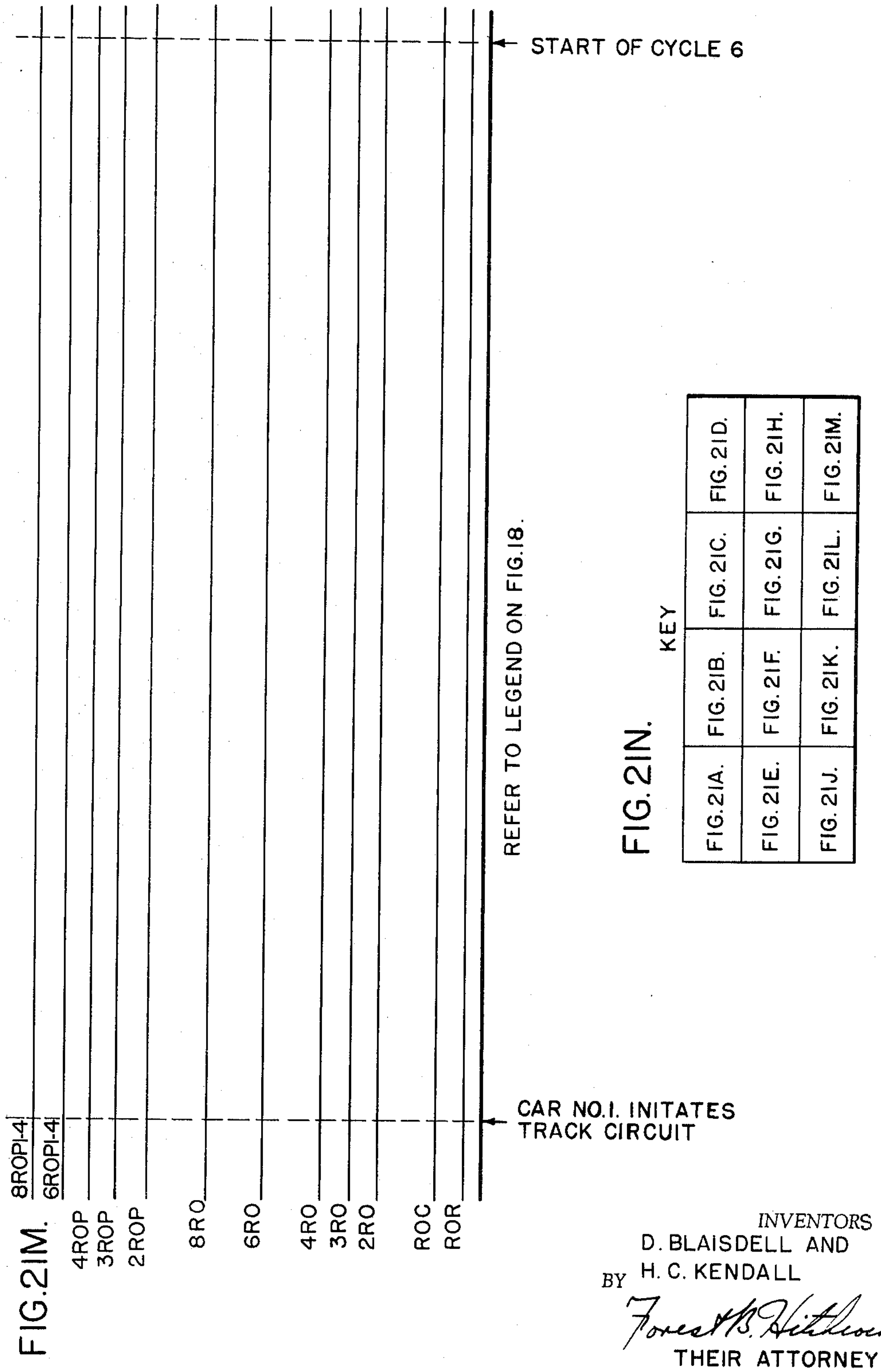

FIG. 21N—Shows the arrangement of FIGS. 21A through 21M.

FIG. 22—Binary code chart for code storage relays. This figure shows a chart which is helpful in determining the position of the code storage relays in FIG. 17 for any desired track destination.

Figure 23A:
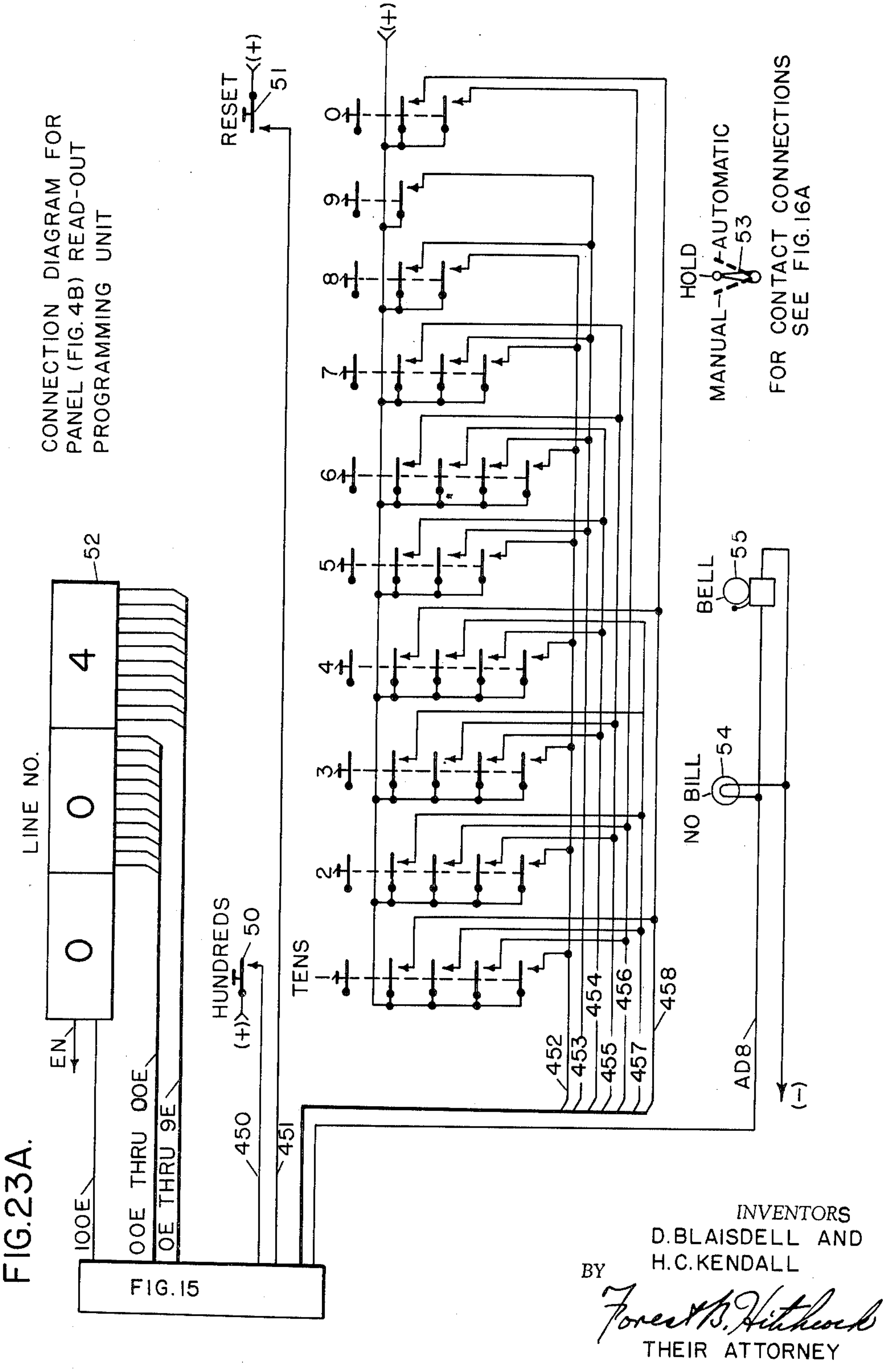
Figure 23B:
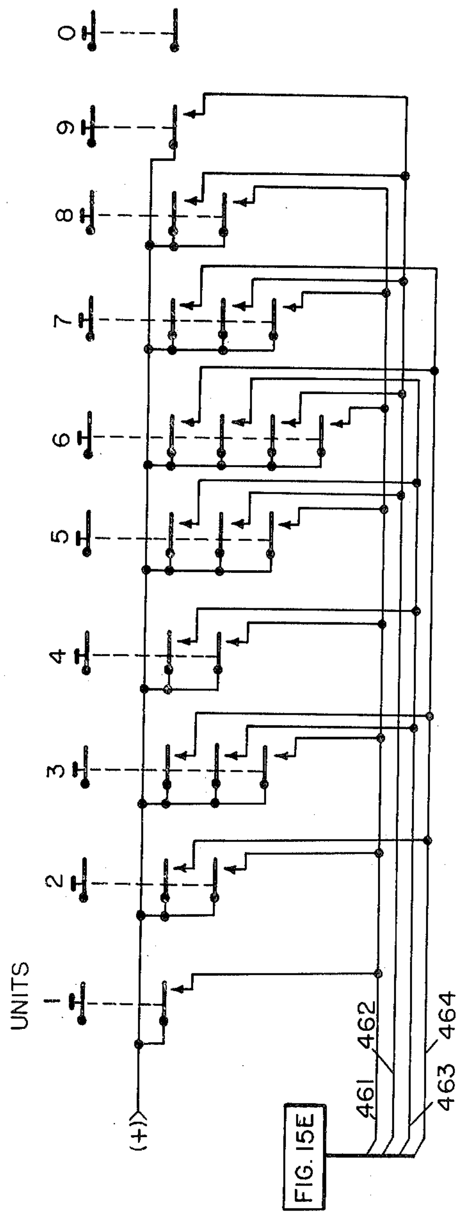

FIGS. 23A, 23B—Connection diagram for panel (FIG. 4) of read-out programming unit. These figures show a diagram which should be arranged as shown by the key of FIG. 23C.

Figure 23C:
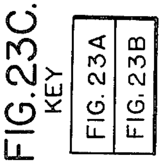

FIG. 23C—Shows the arrangement of FIGS. 23A and 23B.

For the purpose of simplifying the illustration and facilitating the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays and their contacts are illustrated in a conventional manner, and symbols are used to indicate connections to the terminals of batteries or other suitable source of electric current instead of showing all the wiring connections to these terminals.

The symbols (+) and (—) are employed to indicate the positive and negative terminals respectively of suitable batteries, or other source of direct current; and the circuits with which these symbols are used always have current flowing in the same direction. The symbols (B+) and (B—) indicate connections to the opposite terminals of a suitable battery or other direct current source which has a central or intermediate tap indicated either as a ground by a conventional symbol or designated (CN); and the circuits with which these symbols are used may have current flowing in one direction or the other depending upon the particular terminal used in conjunction with the intermediate tap.

In FIG. 1, the general layout for the complete organization of the present invention has been shown in block form. It is noted that the trains originate at a remote point from which the information with regard to the "consist" of each train is transmitted by Teletype extending to the classification yard or switching area at which the information is to be effective to cause automatic switching operations.

The information is transmitted in the form of the well known Teletype code, which must be decoded by suitable means such as shown in a U.S. patent bearing Number 2,982,818, dated May 2, 1961. In FIG. 1 the Teletype line 7 is connected to a code following relay 6 which provides control of the decoder 5. The outputs of the decoder 5 will be discussed later.

Generally speaking, the receiving and storage apparatus of the present invention as applied to hump yard operations of a railway consists in two basic organizations, i.e., (1) a read-in programming system as shown in block diagram form of FIG. 1, in which Teletype information is stored in a ferrite core memory unit, and (2) a read-out programming system as shown in block diagram form of FIG. 2 by which cars are automatically switched to their proper destination within the classification yard. Since these two systems are separate, the read-in programming system can be placed in operation in advance of humping operations, or else they can be operated in conjunction with one another, i.e., the read-in programming system can be receiving a programmed list of one train while another is in the process of humping. The memory unit 1 is the linkage between the two systems for it is a plug-in unit in both systems and is the means by which information is transferred from the read-in to the read-out system. The memory unit 1 is programmed by plugging it firmly into the couplers 46 on the console of the control panel 2 (see FIG. 3B) of the programming unit. The mechanism of the memory unit 1 is arranged in such a way that there is only one possible position of alignment for the unit to fit into the console. The memory unit 1 is programmed automatically through the read-in storage relays 3, the read-in relays 4, the decorder 5, the code following relay 6, and the Teletype line 7, while the switch list is being typed in the yard clerk's office at the leaving point for a train.

The Teletype decoder 5 is of the type as disclosed in a U.S. patent bearing No. 2,982,818, dated May 2, 1961. The execution relay 8 is also disclosed in such patent application. It is energized by the CR (carriage return) code from the decoder 5, and it, in turn, influences the read-in storage relays 3 and the step advance relay 10.

In the automatic mode of operation, or when the switch on the control panel 2 is placed in the Teletype read-in position, information in the form of a Teletype code enters the system via the decoder 5 through the read-in relays 4, and in turn is stored in the read-in storage relays 3. In advance of this storage function it is necessary to energize the execution relay 8 by means of the carriage return (CR) code from the decoder 5. The drop out of the execution relay 8 is dependent upon a time constant built into its associated control circuits. (See the above-mentioned Patent 2,982,818.) When the execution relay 8 drops out, its contacts energize the step advance relay 10 which in turn picks up the memory drive current relays 11 is proper sequence. The contacts of the latter group energize both a row and column feed cable on which energy is transmitted to the line number address relays 9 where row and column selection is determined in accordance with the car number or line number address 12 and applied to the memory unit 1, and an inhibit feed cable on which energy is transmitted to the read-in storage relays 3 and therein a properly selected track number 13 is obtained for feeding into the memory unit 1. These events occur in the sequence mentioned as will be explained in detail later when the sequence charts are discussed.

Changes in the programmed information can be accomplished manually prior to humping the train by inserting the memory into the programming unit, selecting the proper line number address by means of the line number address relays 9, which are controlled in turn by push buttons on the control panel 2, and inserting the new track destination by operating these same push buttons. The line number address or car number sequence in the "consist" list of the cars in a train is controlled and displayed by throwing a switch 42 on the control panel 2 to the line number address position and after the push buttons are actuated the associated line number address will appear in the line number address window 12 of the control panel 2. This same switch 42 is then thrown to the "MANUAL READ-IN" position and by actuating the same group of push buttons the track number will then appear in the double windowed opening 13 of the control panel 2.

Inasmuch as the read-out system of FIG. 2 operates in conjunction with the automatic switching system, it enables the hump conductor to assume the roll of monitor. As long as changes do not occur in the routing list during humping operations the ferrite memory 1 will indirectly feed the four bank storage destination indicator 19 of the automatic switching system automatically. However, if changes do occur during the humping period, the hump conductor has control over the system by operating a key switch 53 (see FIG. 4) to the "HOLD" position, thereby preventing the memory from feeding further stored information into the automatic switching system. Furthermore, he can cancel incorrect information and subsequently, by operating the proper manual push buttons on the control panel 14, he can insert the proper information into the automatic switching system.

The transmittal of the information from the memory unit 1 to the automatic switching system 18 is accomplished by first amplifying the read-out signal in the transistor digital read-out unit 15, which, in turn, selects the proper read-out relays 16 in accordance with the established binary decimal code of FIG. 12. These read-out relays 16, in turn, pick up the read-out repeater relays 17 whose contacts select the proper LC (location code) relay in the automatic switching system 18 where the car is destined. As stated before, this destination is then displayed by proper means on the destination indicator 19. The memory drive current relays 22 are initially enabled by the operator when the read-out switch is thrown to the "automatic" position. These relays also enable the feeder for the inhibit currents which are selected by the read-out repeater relays 17 and fed into the memory unit 1. These relays also enable the buses for the row and column feeders through the line number address relays 23 which, in turn, select the proper line or car sequence in the train and display it on the line number indicator 24. Note at this time that the line number address relays 23 can also be set manually from the control panel 21. Any manual setting of the automatic switching system which may be required is accomplished by operating the push buttons within the automatic switching apparatus itself, or in other words these are contained within block 18. See FIG. 17 for the circuit arrangement of these switches. A wheel counter 20 provides a means for determining whether a cut consists of one or more cars. In the embodiment of this invention the wheel counter 20 was designed to accommodate either single or double car cuts only, and also to accommodate either four (4) or six (6) wheeled trucks. If a count of 7 is obtained, therefore, the system will have ascertained that the cut consists of 2 cars, and this being the case, will automatically cancel the following route destination for the second car. A detailed explanation of the wheel counter 20 will be given later. In general, by referring to FIG. 2, if several single cars proceed down the track, their destinations would be displayed in the storage "A" and "B," tracks 33 and 20 respectively. The wheel counter 20 would have counted either 4 or 6, depending on the number of wheels, and consequently the routing information progresses toward window A. Until this count is determined, however, the car destination remains in window "D." If a third and fourth car come along which are coupled together their destination umber will be displayed in the next vacant storage "C." or example, when it was determined by the wheel coun- r 20 that car destination 64 was not part of destination ), the former was allowed to proceed from window "D" window "C." When the 2 car cut came along and was ounted by the wheel counter 20 it would hold the sec- ld 64 in window "D" and having counted more than 7 heels for this group of cars, the system automatically ancels the 64 in window "D" and proceeds to the next ir.

DESCRIPTION OF APPARATUS

*Decoder unit*

In order to comprehend the function of the read-in stem it will be helpful to review some of the appa- tus in the decoder unit 5. A convenient point of start- g would be the control tubes for the read-in relays 4. y referring to Kendall's Patent No. 2,982,818, dated [ay 2, 1961, one can see that there are two groups of is discharge tubes. One group of five controls a bank five relays which we will now designate as the tens ad-in group (T1RI through T5RI) and the other group five controls a bank of five relays now designated as e units read-in group (U1RI through U5RI). These bes become conductive and consequently the relays 4 e picked up in accordance with the code for a two- git track number being transmitted over the Teletype e 7. The EX (execution) relay 8 is also part of the coder 5. The general arrangement for these units is own in FIG. 1. By this diagram, one can see that the letype code of CR (carriage return) is required in or- r to pick up the EX relay 8. When this relay 8 be- mes energized, it allows energy to be applied to the orage bank of relays 3 or repeaters which are selected accordance with the read-in relays 4. For example, the T3RI and the U4RI relays 4 are energized, then e T3RIP and the U4RIP relays 3 will also become ener- zed. Another detail requirement must be met, how- er, which is the energization of the RIPS (read-in re- eater stick) relay. The function of these relays and eir circuitry will be dealt with later in more detail.

The contacts of the RIP bank of relays 3 select the oper digit or digits in the ferrite memory cores 1 to ply inhibit current thereto. The first four digits (1 to in the memory unit 1 are governed by the selection the tens bank of RIP relays and the latter four digits to 8) are governed by the units bank of RIP relays. his arrangement constitutes a conversion system from five-digit to a four-digit code for both the tens and the its portion of the track number. These same RIP lays 3 also select the proper lights for the display of e track number 13 on the control panel 2.

*Memory unit*

The memory unit 1 of this system consists of eight atrices of 150 cores each (see FIG. 6). The ferrite re 60 itself possesses by virtue of its composition and ocessing a rectangular hysteresis loop (see FIG. 5). ecause of this characteristic each core possesses the ility to remain indefinitely and reliably in either one two magnetic states—a "one" state or a "zero" state. e "one" state will be regarded as the positive flux nsity state whereby the core obtains the value of $(+B_r)$ shown in FIG. 5. The "zero" state will be defined that state whereby the core obtains a flux density of $-B_r)$ as shown in the same figure.

The theory of operation of ferrite cores is throughly plained in the existing literature, so we shall deal pri- arily with certain functions of these cores as they apply our system. By referring to the figure above, it can seen that if a core is in the "one" state it can be itched to the "zero" state by applying a field intensity $(-H_m)$ oersteds to the core. Likewise, the core can switched from the "zero" state to the "one" state by the application of $(+H_m)$ oersteds. The curve from "A" to $+B(+H_m)$ is known as the normal magnetization curve. This characteristic will be evident only when the core is completely demagnetized and subsequently subjected to a field of $(+H_m)$ oersteds in graduated steps. When the field strength of $(+H_m)$ is removed, the core will return to the $+B_r$ position or the "one" state. If a field strength of $(-\frac{1}{2}H_m)$ is now applied to the core, the flux density will follow the path of the rectangular hysteresis loop in the negative direction to a point of $+B(-\frac{1}{2}H_m)$ flux density, and then if the $(-\frac{1}{2}H_m)$ field strength is removed, the flux density will follow the line toward the normal magnetization curve, but the residual flux density will remain at the position $+B_r'$. On the other hand, if the core starts at the "zero" state and a field strength of $(+\frac{1}{2}H_m)$ is applied to the core it will follow the rectangular hysteresis loop in a positive or counterclockwise direction toward $-B(+\frac{1}{2}H_m)$ and return to a $-B_r'$ value of flux density when the field strength of $(+\frac{1}{2}H_m)$ is removed. These points of $+B_r$ and $-B_r$ of FIG. 5 are typical of the various remanence points of the core. From the above discussion it can be seen that a field strength of either $+\frac{1}{2}H_m$ or $-\frac{1}{2}H_m$ will be insufficient to switch the core from either the "zero" state to the "one" state or vice versa. The application of such field strengths will merely disturb or slightly change the flux density. On the other hand, it can be seen that the application of either a $(+H_m)$ or a $(-H_m)$ field strength will cause the core to change from the "zero" state to the "one" state or vice versa.

Each core 60 of this matrix (see FIG. 6) is linked by four wires, (1) a row wire 61, (2) a column wire 62, (3) an inhibit wire 63, and (4) a sensing wire 64. The row and column wires receive the drive for the switching currents (I). In an arrangement whereby a current $(+\frac{1}{2}I)$ sufficient to produce a $(+\frac{1}{2}H_m)$ field strength is applied to a row, and at the same time a current $(+\frac{1}{2}I)$ sufficient to produce $(+\frac{1}{2}H_m)$ field strength is applied to a column, it is readily apparent that all cores in this row and column (assuming they are at the "zero" state initially) will receive a field strength of $(+\frac{1}{2}H_m)$ except that one core which is at the intersection of that particular row and column. This particular core will be switched from the "zero" state to the "one" state because it has received two half pulses of $(+\frac{1}{2}H_m)$, or a full $(+H_m)$, which as we stated above will cause the switching to occur.

From FIG. 7 it can be seen that the rows and columns of all eight matrices are wired in series and the linking of the wires is such so that the proper polarity is impressed on each core. This must necessarily be true for every core which is being switched must receive two $(+\frac{1}{2}H_m)$ pulses of field strength to be switched from the "zero" state to the "one" state or two $(-\frac{1}{2}H_m)$ pulses to be switched from the "one" state to the "zero" state. For example, if line number 33 is under consideration, the core at the intersection of row 30 and column 3 is impressed with the proper current application. For the cores used in the embodiment of this invention, the switching current (I) requirement is 360 millamperes, consequently, the half current $(\frac{1}{2}I)$ requirement is 180 milliamperes. If, as stated above, core 33 is selected, then the remaining cores in the selected row and column can be designated as half selected cores. The remaining cores in the frame are non-selected cores since their wires received no current application whatsoever.

The inhibit wire 63, which is a separate winding for each digit or matrix, is linked through the core 60 in such a manner so as to observe the same polarity as the read-in wires 61 and 62. By the application of a negative current $(-\frac{1}{2}I)$ pulse it must provide a field strength of $(-\frac{1}{2}H_m)$ to any of the right chosen matrices in the memory unit so that this field is in opposition to that established in any core by the row and column currents. Just prior to the time when a particular core receives a $(+H_m)$ field strength, this $(-\frac{1}{2}H_m)$ field strength will prevent or inhibit it from switching, for its resultant field strength will be only ($+\frac{1}{2}H_m$).

By referring to FIG. 8A, line 6 (L6), in which the summation currents are represented, this action can readily be observed under digits 1, 4, 5, 7 and 8. In the example shown, track No. 53 is required to be read-in (stored), read-out and read-back for car No. 129. This overall typical functioning of the memory unit will be considered later.

The final and fourth wire to link each core 60 in the matrix is the sensing wire 64 which is a continuous wire for each frame or digit of the memory unit. It takes on the general appearance of a diagonal winding as shown in FIG. 6. This winding is used at read-out time, making it possible to extract the binary code stored in a particular storage bank in the memory unit. Since each frame has its own sensing winding 64 the switching of the core from one state to the other induces a voltage into this winding because of the time rate of change in flux density of the core 60. The extremity of this winding 64 is connected to a coupling transformer 70 of FIG. 9 contained in a plug-in type unit called a digital read-out unit 15 which will be discussed in a subsequent paragraph.

*Line number address relays*

The line number address relays 9 are used essentially to select the various rows and columns of the ferrite core matrix (1) in both the read-in programming and read-out switching system. The contacts of these relays also select the lights on the control panel which indicates to the operator the car number being programmed or switched. The programming is accomplished by a separate set of line number address relays 9 with respect to those 23 in the switching system so that it is possible to be reading-in the consist of a new train while another is being switched or humped. The relays 23 in this group of the switching system are suffixed by the letter "W" to designate they are part of the switching system. For example, the units reset relay URS in the programming system will be designated as such, but the URS relay in the switching system is designated as URSW. These relays 9 and 23 are divided into two groups; the tens relays, which are used to select the proper row wire to the core matrices, and the units relays, which are used to select the proper column wire. The tabulation of FIGURE 13 shows the sequence of operation of these relays. By showing the arrow in the downward direction indicates the deenergized position of the relay and the arrow in the upward direction indicates the energized position of the relay. In the zero position the tens and units relays are all deenergized. The circle around the arrow indicates the relay which has just moved to a new position by following an orderly numerical progression of column scan. There are three methods of progressing the address relays to the next position. One of these methods requires the simple operation of depressing the "Line Advance" push button 41 (FIG. 3B) which results in the pick-up of the SA (step advance) relay and subsequent pick-up of the SL (step limiting) relay. When push button 41 is released, the SA relay releases deenergizing the SL relay. This latter relay being a slow release type provides an energy circuit to be applied to the various address relays through a back contact of the SA relay and a front contact of the SL relay and either a front or back contact of the UDR (units drive relay), depending upon whether or not it is picked up or dropped out. One can see from FIGURE 13 that this UDR relay will be picked-up in even-numbered steps and dropped-away in odd numbered steps. For example, if the system is in the zero position (all relays down) the operation of the "LINE ADVANCE" push button 41 as described above will cause the U1 reay to pick up and thus connect the memory drive circuit of column 1 (N1) of FIG. 14J. Since at this time all of the tens relays are dropped out, row 00 will be selected. A second operation of the push button will cause the drive circuits to be connected to column 2 (N2) via the front contacts of U4. U3 will pick-up on a third operation causing the No. 3 to appear in the line number indicator window 12. The operation for the fourth depression of the push button is slightly different. In this instance, U4 is called upon to release by virtue of the reversed winding on the second section of its coil. This is accomplished by feeding energy through an SA back contact, an SL front contact, and a UDR back contact, to the 4A side of the coil on the U4 relay. Although at this time the other portion of the coil (1B–1A) has stick energy applied to it through its own contact, the current in the second winding (4A–4B) is sufficient to overcome the field strength established by the first winding thereby cancelling it and causing the relay to drop away. For each successive depression and release of the push button the operation continues as indicated in the table of FIGURE 13. Typical examples of the operation of the address system will be discussed later in more detail under the topic of the sequence charts.

A second method of address operation utilizes an automatic advance of the address system during MANUAL READ-IN to the memory unit. This implies that the "MANUAL READ-IN" switch 42 must be thrown to this position and the "AUTOMATIC ADVANCE" switch 43 must be thrown to the "ON" position to accomplish this second method. During this sequence, the operation is such that upon completion of the read-in cycle which will be described later, the SA and SL relays automatically advance the address system one column number. When the Teletype read-in operation is used rather than manual, it is not necessary to throw the "AUTOMATIC ADVANCE" switch 43 to the "ON" position. Under these conditions the address system is automatically advanced one step each time a Teletype line is read into the system.

The third method of address operation utilizes the random access capability of the ferrite memory. The key switch 42 on the control panel is thrown to the "ADDRESS" position. This operation results in the release of the TN1 and TN2 (transfer No. 1 and transfer No. 2) relays thereby making the units and tens push buttons on the vertical panel 2 (FIG. 3A) available for random positioning of the address system. For example, if the tens push button 32 is pushed, the T1 through T4 relays immediately assume the position of T1, T3 and T4 picked up which applies row feed energy to row 30, then if the units push button 35 is pushed, the U1 through U4 relays immediately assume the position of U2 picked up which will apply column feed energy to column 9. The line No. 39 will then be displayed in the line number indicator 12.

As can be seen from the above discussion, the address relays form a decade counter. The units relays (U1 through U4) operate from 0 through 9 and the next step will be the pick up of the tens relay group T1 through T4 at which time they will move ahead one step to increase the count to the next tens group.

The address relays are also used in the switching or read-out system. Here a "W" (switching) is suffixed to the relay symbol to designate that it is a component within the switching system. For example, the U1 relay in the read-in system would have a similar unit in the switching system designated as the U1W relay .

*Step advance relay*

This relay, designated as the SA relay in the read-in programming system, prepares the address relay system to advance to the next step in the car count just prior to reading in the information pertaining to that particular car. The precise manner in which this is accomplished will be dealt with later when the sequence charts are explained. The pick-up of the SA relay also picks up the SL (step limiting) relay, which will be discussed in a separate paragraph, to start a chain of events which eventually applies the read-in currents to the row and :olumn feed cable and the inhibit feed cable. The latter ;eed is applied to the read-in storage relays, where, as vas pointed out before, the inhibit currents (−½I) are ;elected for any of the eight digits in the memory matrix. The row and column feed currents (+½I) are applied o the address relay system where they are selectively ıpplied to a particular row and column of each digit ɔlane of the matrix There is also a step advance relay 25 in the switching ;ystem which is designated as the SAW relay. Its func-ion is essentially the same as that of the SA relay, and t also picks up a step-limiting relay (SLW) which will ɔe discussed in the following paragraph.

The step limiting relay is the slow release type to allow he address system of relays 9 or 23 to become properly ɔriented before reading-in or reading-out information to ɔr from the memory unit 1 respectively. This operation ɔccurs by having the SA relay 10 or SAW relay 25 lropped out with the SL (or SLW) relay still having its :ontacts maintained due to its inherent slow drop-out :haracteristics. Under this situation the address relays › or 23 advance one step. Now, after a time interval vhich is more than sufficient for the address relay con-acts to close, the read-in or read-out process may pro-eed. This function is initiated when back contacts on he SL (or SLW) relay are closed, consequently no read-n or read-out process can proceed until the address sys-em is firmly established.

*Aemory drive current relays for the read-in programming system*

The use of the memory drive current relays 11 in the ead-in programming system provides a means of read-ıg into the memory unit 1 by current application the arious binary codes representing the various destina-ions for cars of trains in the yard. These relays are so rganized that a complete read-in cycle is automatically tarted as soon as both the tens number and the units umber of the track is programmed into the system by ıe EX relay 8 and consequently registered on the track umber indicator 13. This group of relays consists of ıe INH (inhibit) relay, the LA (line advance) relay, ıe RI (read-in) relay, the LC (line cancel) relay, and ıe MC (memory cancel) relay. By referring to FIG. 4 one can see that through contacts on each of these ɔlays a current flows to the memory unit 1, thereby ausing it to establish its state.

*Aemory drive current relays for the read-out programming system*

This group of relays 22 consists of the INHW (inhibit-vitching) relay, the LAW (line advance-switching) re-ıy, the RB (read-back) relay, the ROR (read-out rows) ɔlay, and the ROC (read-out columns) relay. When ıe operator starts the read-out cycle the ROR relay is ıe first one to pick up. Contacts on all of these relays ansmit the drive currents to the memory unit 1. This ın be seen by referring to the circuit diagram of FIG. 15.

*Control panels for read-in programming unit*

This unit 2 (see FIG. 3A) consists of two groups of ten ıch push buttons, one called the units group and the ther called the tens group. These push buttons are the ıultiple circuit type so that a coded system can be used irectly from the push button control. Since these push ıttons accommodate the control and display of both ıe line number or address and the track number, a hun-reds push button 30 is also part of the panel in order › control the hundreds digit of the line number. Classi-:ation yards normally consist of less than 100 tracks, ɔnsequently only two digits are required. This line ımber is associated with the line being typed on the eletype receiver and corresponds to the order in which ıe cars of a train are scheduled for humping. This ınel also includes a reset push button 36, a window 12 wherein the line number is displayed, a window 13 where-in the track number is displayed and a group of switches 37, 38, 39 and 40 for controlling the power to the various units within the system. Respectively, these switches serve the relay bus, the memory unit, the teletype re-ceiver, and the lights for the display of the numerals within the windows 12 and 13. For the function this panel serves in the system refer to the paragraph on "Manual operation of the read-in programming unit."

*Transistor digital read-out unit*

This unit 15 of FIG. 2 shown in detail in FIG. 9 is com-posed of four (4) essential elements, an input transformer 70, gating diodes 71, an amplifier stage 72, and a flip-flop multivibrator stage 73. The terminal wires on this unit are numbered to correspond to those on the recep-tacle 80 of FIG. 10 into which this unit plugs. Note that there are eight such receptacles 80, therefore, to complete the interconnections the system requires eight (8) tran-sistor digital read-out units. Each of these in turn has an associated read-out relay connected across its termi-nals 8 and 16 of FIG. 10 when the unit is plugged into its receptacle. The read-out relay then acts as a load on the output stage 78 of the flip-flop multivibrator and when-ever it becomes conductive the associated read-out relay will be energized.

*Control panels for automatic read-out programming unit*

In the embodiment of this invention, the three panels used on the read-out unit are separate and distinct with respect to function but any suitable combination of the three or even a single panel might suffice under certain conditions. A single element or block 21 is shown in FIG. 2 to represent all three panels. Two of the three panels are shown in FIGS. 4A and 4B. The former is simply the panel whose switches supply energy to the various components of the system and is similar in layout and operation to that portion of FIG. 3A consisting of switches 37, 38, 39 and 40 on the read-in programming unit.

The panel of FIG. 4B is very similar to the central horizontal section of FIG. 3A wherein there are two groups of ten each push buttons, the units and tens group, a single hundred push button 50 and a reset push button 51. In addition to these push buttons there is a switch 53 which selects the mode of operation for the read-out system. When this switch is in the neutral or center poistion which is marked "HOLD" on the panel, it allows the operator to hold or prevent the automatic program-ming system from functioning by opening contact 501 of this switch (see FIG. 16A). At this point it should be known that all contacts on switch 53 are shown in the "HOLD" position. When the switch is thrown to the "MANUAL" position all contacts on the left side will be shifted but the contacts on the right side will remain as shown. Similarly, when the switch is thrown to the "AU-TOMATIC" position, all the contacts on the right side will be shifted, whereas those on the left side will remain as shown. The "AUTOMATIC" position of this switch will be considered in a paragraph later when the typical automatic read-out sequence is described.

At the present time, we will consider the functions which occur or are inhibited when this switch is in both the "HOLD" and "MANUAL" positions.

By referring to FIG. 16A, one will noted that in the "HOLD" position, the contact which leads to wires AD7 and AD8 is open. This contact will be in the same posi-tion when the switch is thrown to the "MANUAL" posi-tion and the only time it will be closed is in the automatic mode of operation. When this switch is open it will pre-vent the start of a new cycle for the read-out of the pro-gramming system, since it leads through back contact 504 of the LCS relay, back contact 505 of the DCN relay, to wire AD41 and following this to the same wire of FIG. 15D where it eventually leads to the ROR relay through back contact 304 of the LAW relay, back contact 305 of the SLW relay and back contact 306 of the ROC relay. Since this ROR relay is the starting point of the automatic cycle, no read-out cycle can start once this path is opened.

Going back to FIG. 16A, the next contact to be considered is one which is closed in the "HOLD" and "MANUAL" position. This contact 506 leads to wires AH35 and AH38 and the circuit can best be seen by referring to FIG. 17A. One wire the AH38 connects to the bus which supplies energy to all the push buttons (No. 1 through No. 79) in the automatic switching system. The specific number of push buttons is not essential to the system; however, one push button is assigned for each track in the classification yard. The oppoiste side of the switch contact 506 connects to wire AH35 which connects to a back contact 356 of the LCS relay, to a back contact 355 of the CTN relay and finally to the poistive potential. This contact is inserted in series with this circuits so that no LC relay will be energized in the event any push button is accidentally pushed when the system is in the automatic mode of operation for under this condition this contact 506 will be open. The last contact 519 on the automatic side of the "AUTOMATIC" position is as shown and under these conditions supplies poistive energy to wire AD10. This wire can be followed to FIG. 15B where it will be found to supply the stick voltage through a front contact 301 of the 00 relay to the positive side of the coil.

Referring again to FIG. 16A, the first group of contacts 522 on the left or "MANUAL" side of this switch supplies positive energy to one side of the wheel counter treadle switch in both the "HOLD" and "AUTOMATIC" positions. The opeartion of this circuit will be considered later when the automatic read-out sequence is discussed.

In the "MANUAL" position the contact 522 of this switch connects (+) energy to wire BF5, which leads to front contact 513 of the LCS relay. This essentially supplies an alternate path for positive energy in the "MANUAL" position to this point by bypassing back contact 512 of the SCC (successive car cancel) relay, back contact 511 of the CCK (cut check) relay and back contact 510 of the TC (through coupler) relay. The final contact group 516 on the "MANUAL" side of the switch is open circuited in the "MANUAL" position which signifies that the CCK relay is not operative in the "MANUAL" position. In the position shown or "HOLD" position, positive energy is supplied through it via back contact 507 of the TC relay and front contact 508 of the CCK relay, or alternately via front contact 515 of the CSDP ("C" storage description repeater) relay to the CCK relay.

Another feature of this panel is the inclusion of a "NO BILL" light 54 and an associated alarm bell 55 both of which are actuated by a "no bill" car. The operator of the Teletype has read into the memory unit a 00 track destination for this type of car which has no billing. Subsequently when the 00 code is read-out, it is accommodated by the 00 relay on FIG. 15B, which is energized by the 00 code, or in other words, by the pick-up of the 8RO and the 4RO relays. These in turn pick up their respective repeater relays 8ROP1 and 4ROP whose contacts 346 and 347 respectively complete a path to (+) potential when all other read-out relays are not picked up and when back contacts 355 and 356 of the CTN and LCS relays respectively are engaged, signifying that no "C" storage transfer is taking place and that no location code stick voltage is present holding any other track destination. This means that the "D" storage window on the track destination indicator 19 must be empty. As a result of the energization of the 00 relay its contacts will transfer thereby opening back contact 502 (FIGS. 15B and 16A) which will not allow the automatic read-out system to proceed since the circuit path to the ROR relay coil is now open.

By referring to the sequence chart FIG. 21J, it can be seen that the start of every cycle is initiated by this relay; consequently, since under the above situation it has become inoperative, the read-out operation must cease until the operator determines a track destination for this "no bill" car. One front contact 403 on this relay which closes when the 00 relay picks up is shown on FIG. 15B and it is instrumental in energizing the one-stroke alarm bell 55 and the "no bill" light 54 shown in circuit form on FIG. 23A.

Two other front contacts 404 and 405 are responsible for turning on the tens and units lights D00E and D0E respectively, in the "D" storage window of the track destination indicator 19 shown in FIG. 2. No wiring is shown beyond FIG. 15B for these lights since this apparatus in the destination indicator 19 is part of standard former switching systems. Since there is no 00 track in the system the LCS relay (FIG. 17A) cannot be selected, therefore the 00 light display is the only end result involved in the pick-up of the 00 relay insofar as the automatic switching system is concerned.

When the operator is confronted with a "no bill" situation he will throw switch 53 to the "MANUAL" position and choose a track destination suitable for that car. By this time the only circuit path holding the 00 relay is the stick voltage path through front contact 301. When switch 53 is thrown to the "MANUAL" position it will open this holding path via wire AD10 which transfers to FIG. 16A where contact 519 on the above switch will now be open to (+) potential, resulting in the drop-out of the 00 relay. When this occurs the operator will note that the 00 lights are extinguished in the "D" window of the destination indicator 19 and he can proceed to select any desirable track by pushing 1PB, 2PB through 79PB (FIG. 17A), which will in turn select any one of the relays 1LC, 2LC, through 79LC. The system having stored this information, then allows the operator to throw switch 53 to the "AUTOMATIC" position after which the read-out system will again start programming in a normal manner.

SYSTEM OPERATION

*Operation of the memory unit*

Inasmuch as each core possesses the ability to remain in either one of two states by virtue of its rectangular hysteresis loop, it lends itself conveniently to a binary coded system wherein the symbols for the code can be chosen as the "1" and "0" states of the core as heretofore defined. In the embodiment of this invention, a four-digit binary code is established for each of the tens and units digits as selected by the decoder mechanism. This system is generally known as a binary coded decimal system, since each decimal has its own group of four binary digits. Another characteristic of the system as arranged in this invention is the fact that the decimal 0 has the core of No. 4 frame in the "1" state and similarly that of No. 8, depending on whether or not reference is made to the tens or the units column of the number. This is done so that in the transmission of the 0 at least one core out of the four will be in the active or "1" state in order to distinguish it from a complete loss of signal. Since this condition (0001) is the normal binary code for the decimal No. 1 but it is now applied to the "0," this code is known as an "excess one code." Similarly, the normal binary code for the decimal No. 2 is 0010, but it is applied to No. 1 in this system. The true code is therefor in "excess by one" of the number represented.

*Read-in operation*

For example, suppose the track No. 53 is teletyped into the system then the T5RIP relay will be picked up dependent upon the mark (M) as decoded from the tens digit of 5 in the number 50. This can be seen by referring to FIG. 12. Likewise, for the units digit of 3, the I1RIP relay will be picked up. Now when the trans- er of this information takes place into the cores, note ıat the selected cores of the digits or frames Nos. 2 and are placed into the "1" state whereas the selected cores f digits 1 and 4 are in the "0" state. Likewise the I1RIP relay being picked up converts into the binary ode by having the cores of the No. 6 digit or frame being ı the "1" state and all others (5, 7 and 8) must remain ı the "0" state.

Let us now refer to FIG. 8A for the establishment of ıe proper states of the cores in the memory system for ıe decimal number of 53 which could be read into it; for xample, during the 129th sequence as represented by the 29th car. From the sequence chart, FIG. 19A, one can e that a cancellation current of $-\frac{1}{2}$I is applied to the ɔw and column in question in order to insure that the ɔre (129) at the intersection of the row 120 and column is clear of previous data. This is represented by lines and 2 (L1 and L2) of this figure. Later the inhibit urrent of $-\frac{1}{2}$I is applied to the cores of digits 1, 4, 5, 7 nd 8 just prior to the row and column currents $+\frac{1}{2}$I. his is necessary in order to prevent or inhibit certain ɔres in particular frames from becoming switched upon ıe application of the row and column currents. Since current of 180 milliamperes is considered sufficient cur- ent to generate a field strength of $\frac{1}{2}H_m$ for the cores sed in this system, it will be understood hereafter that ıis current value ($\frac{1}{2}$I) must be applied to the feed ire which links the core under consideration in order develop this amount of field strength. In the above ıd following instances whenever a current of $\frac{1}{2}$I is re- rred to it is to be considered as resulting in a field rength of $\frac{1}{2}H_m$ and similarly other values of current sulting in equivalent field strengths. If now we follow ong line 3 of FIG. 8A, we see that a field strength of $-\frac{1}{2}H_m$ is applied to digits 1, 4, 5, 7 and 8. In line 4 ter some small time interval but during the application the inhibit current, one will note that a field strength $+\frac{1}{2}H_m$ is applied to row 120. Since all the rows of l frames or digits are connected in series, this means at all eight digits receive this field strength. Line 5 like- ise shows that all eight digits receive a $+\frac{1}{2}H_m$ field rength on column 9. Let us now consider the cores at ıe intersections of row 120 and column 9 in each of e eight frames. The maximum positive value of field rength applied to digit 1 on this particular core (No. 29) is $+\frac{1}{2}H_m$. This is shown in line 6 and is the alge- aic sum of the field strengths applied to it from lines 2, 3, 4 and 5. For digit No. 2 the total field minimum ɔsitive field strength applied is $+H_m$ since no inhibit ɜld was applied to this core. It is necessary to turn off e currents through the row and column windings be- re switching off the currents to the inhibit winding; herwise, if the opposite were done, all the cores at the 29th intersection would switch to the "1" state, since for me time interval there would be no inhibit current of $-\frac{1}{2}$I. This can be seen by noting that time is plotted ɔrizontally starting with zero for *each* digit in FIGS. A or 8B. In line 7 (L7) we can see the results of line which was applied to each of the eight No. 129 cores the memory system. Digits 1, 4, 5, 7 and 8 remain in e "0" state inasmuch as they were merely disturbed by e application of a $+\frac{1}{2}H_m$ field strength, and there- re remain with a remanence of $-B_r''$ flux density after e magnetic field strength is removed. The curve of ıe 7 in FIG. 8A can be followed in detail by applying e sum currents and resulting field strengths of line 6 the typical flux density curve of FIG. 5. The other res in digits 2, 3 and 6 become switched to the "1" ıte and therefore their remanence is $+B_r$ after the ld strength is removed. The decimal number 53 is ɔw stored in the memory unit in the form of a binary ded decimal, the code of 0110 in the first four frames 2, 3 and 4 representing the decimal 5 in the tens column and the code of 0100 in the last four frames 5, 6, 7 and 8 representing the decimal 3 in the units column.

Let us now consider all cores other than No. 129. When the row and column currents are applied, all the cores in row 120 will receive a $+\frac{1}{2}H_m$ field strength, thereby returning them to $-B_r$ on the BH curve of FIG. 5. This is also true for the cores in column 9 of these particular frames. When both the inhibit and row or column fields are applied simultaneously as in digits 1, 4, 5, 7 and 8 to this group of cores, the resultant field strength is "0," consequently these cores are not switched. When the row and column fields are removed, the core flux density will return to the $-B(-\frac{1}{2}H_m)$ point for the inhibit field still remains. When this field is finally dropped, the core returns to a flux density of $-B_r$. All other cores in these frames receive no row and column currents, consequently they are merely disturbed from $-B_r$ to point $-B(-\frac{1}{2}H_m)$ when the field is applied and disturbed from point $-B(-\frac{1}{2}H_m)$ to $-B_r$ when the field is removed. The only other cores yet to be considered are those in digits 2, 3 and 6. Since core No. 129 was heretofore considered, we will now examine the cores in the remainder of these matrices. All the cores in row 120 and column 9 other than 129 itself will become half-switched cores inasmuch as they receive no inhibit current field but only a field of $+\frac{1}{2}H_m$. These cores at the outset being in the "0" state are therefore merely disturbed from $-B_r$ to $-B(+\frac{1}{2}H_m)$ (see FIG. 5) when the field strength is applied, and returned to $-B_r'$ when the field is collapsed. All other cores in these three matrices receive neither an inhibit current field nor a read-in current field; consequently, they remain in the "0" state.

*Read-out operation*

This function will start with the removal of the reset bias voltage as shown in line 8 remembering that the condition of the cores are as established in line 7 of FIG. 8A. In order to condition the transistor digital read-out unit for picking up its associated read-out relay, it is first necessary to open the reset bias voltage which is established on the base of transistor 77 by application to terminal 5 of FIG. 9. This will allow the multivibrator in each of the eight (8) transistor units to be switched according to the voltage fed into it. This bias voltage is removed at the time the back contact 345 of the ROR relay is opened (see FIG. 15D). Having thus prepared this unit for acceptance of a voltage, a current equivalent to a field strength of $-\frac{1}{2}H_m$ is successively applied to row 120 and column 9 as shown in lines 9 and 10 of FIG. 8B. Let us now examine the results that take place in the cores for each digit on core 129 when this occurs. In digit 1 let us assume the core starts with a flux density of $-B_r$. Actually the final flux density of this core was $-B_r''$, but for the sake of simplification it is preferable to start at the "0" state of the core. By referring to FIG. 5 which is the hysteresis loop of the core one can see that the application of two $-\frac{1}{2}H_m$ field strengths or a total of $-H_m$ applied to the core will disturb it from $-B_r$ to $-B(-H_m)$. Upon the removal of the field strength, the core will return to the "0" state or a flux density of $-B_r$. At this time the reset bias is again established. Let us now proceed along the time axis in digit 1 and it will be noted that an inhibit current ($-\frac{1}{2}$I) is applied shortly after the row and column drive currents are removed. This is the beginning of the read-back process which must be accomplished while the relays are still held in a position to be effective for reading back into the memory the code 53. The effect in line 13 (L13) of the application of $-\frac{1}{2}H_m$ is to return the core to the $$-B(-\tfrac{1}{2}H_m)$$

level of flux density. Shortly thereafter row and column drive currents equivalent to produce a field strength of $+\frac{1}{2}H_m$ are each applied simultaneously. This causes the summation current to jump to $+\frac{1}{2}I$ and the resulting field strength to change to the $+\frac{1}{2}H_m$ level which in turn produces a flux density change from $-B(-\frac{1}{2}H_m)$ to $-B(+\frac{1}{2}H_m)$. When the drive currents are turned off the summation current level drops to $-\frac{1}{2}I$ and the field strength to $-\frac{1}{2}H_m$, since at this time only the inhibit current remains. At this time the flux density is reduced to $-B_r'(-\frac{1}{2}H_m)$ and finally when this last current is removed the flux density settles at $-B_r''$. The core 129 in digit 2 on the other hand is originally in the "1" state since its flux density is at the $+B_r$ point. The application of a field strength of $-H_m$ to this core will cause it to switch to the "0" state following a path to $+B(-\frac{1}{2}H_m)$ to $-B(-H_m)$ and to $-B_r$ when the application of the field is removed. As in digit 1 the reset is now reestablished. Any voltage output from the core after this time will not be effective in operating the digital read-out unit 15 since this reset bias prevents the multivibrator from switching. Since there is no inhibit current in this digit during the read-back process, the core will again switch to the "1" state by virtue of the application of an $H_m$ field strength. When these drive currents are finally removed the core will settle at the $+B_r$ flux density level. Digits 3 and 6 are operated on in a similar manner whereas all other digits in the memory unit are operated on similarly to that of digit 1. This entire switching or non-switching of the cores is shown in line 13 of FIG. 8B. According to the fundamental laws of electricity, whenever there is a change in flux density with respect to time a voltage is established. The voltage output of these cores is picked up by the sensing winding and connected to the input of the transistor digital read-out unit whose operation was previously herein described separately. The voltage output wave shapes for each of the digits will be somewhat similar to that shown in line 14. It should be noted that only digits 2, 3 and 6 will be effective in picking up relays 2RO, 3RO and 6RO respectively, only during the time when the reset bias has been removed.

It was considered an advantage from the aspect of maintaining a record of the consist of trains to reestablish the memory unit to the original data contained therein after the read-in process; therefore a read-back operation was included in the system to attain this end. This function starts after the reset bias (−) is turned on in L8.

*Manual operation of the read-in programming unit*

The operation of the system requires that the power must be enabled to the various buses which supply the components of the system. This is accomplished by throwing switches 37, 38, 39 and 40 of FIG. 3A to the "ON" position. Under these conditions windows 12 and 13 of the panel in FIG. 3A will read 000 and 00 respectively. Now let us assume that the operator wishes to read-in to the memory unit (1) the first car of a train. He will then push the "LINE ADVANCE" push button 41 on the panel in FIG. 3B which will advance the address relays to the first line No. 001, which will then appear in window 12 of FIG. 3A. When this "LINE ADVANCE" push button 41 is depressed positive (+) energy will be applied to wire J12 of FIG. 11C and transferred to wire J12 of FIG. 14C where it will energize relay SA (step advance) directly. The front contact 101 of this relay will then energize the SL (step limiting) relay whose front contacts will then close, particularly front contact 102. At the same time back contact 100 will open thereby removing positive voltage from the push button bus 14. When push button 41 is now released the SA relay will drop out causing back contact 103 to become engaged. Some slight instant before this the positive energy was removed from the SL relay, but this being a slow release type it does not break its contacts immediately. The slow release type of relay is designated by a heavy solid line at its coil base which is representative of its slug. This slug tends to maintain the field strength above the drop away point by means of the high current established in its shorted turn by the back E.M.F. until the energy is dissipated in the form of heat. Having thus established a current path from positive potential through the back contact 103, the front contact 102 (while SL is still held-up), back contact 104 of the URS (units reset) relay, front contact 105 of the UDR (units drive) relay, back contact 106 of the U4 (units No. 4) relay, and back contact 107 of the U3 (units No. 3) relay to the coil of the U1 (units No. 1) relay, through the coil, and finally to the negative potential, then this U1 relay will become energized. Moreover, it will be held in this energized position by its own front contact 108, through back contact 109 of the URS relay to the positive potential. When this condition prevails, it is known as having "stick voltage" applied to the coil of the relay. Before proceeding with other functions which occur due to this "stuck up" condition of the U1 relay, let us digress for a moment and examine the UDR relay. One will note that this relay is shown in an energized position which is considered its normal position. This picked-up condition is caused by a circuit path from positive potential through back contact 110 of the SL relay, back contact 111 of the U1 relay, back contact 112 of the U2 relay, back contact 113 of the U3 relay and back contact 114 of the U4 relay thence to the coil, through the coil of UDR to negative potential. Front contact 115 of this relay thus being normally closed is available for the application of stick voltage from either front contact 103 of the SA relay or front contact 110 of the SL relay. Since the SA relay is first to pick up, the stick voltage will be first applied to front contact 103 of this relay. As stated before, when the push button 41 is released this relay will drop out, but the stick voltage will still be present to maintain the UDR relay in its energized state by front contact 110. Now when the back contact 111 opens it removes one source of positive voltage from the UDR coil, the only other source being the stick voltage which maintains it. When the SL relay finally drops out, front contact 110 will open which will remove the final source of positive voltage from the UDR relay causing it to become deenergized. This occurrence causes the back contact 105 to close thus preparing a path to the U4 relay which will be next to pick up when other conditions are established. Inasmuch as the U1 relay was maintained in an energized state by its own stick voltage let us retrace our steps to its front contact 116 which became closed. When this occurs positive potential is transferred through back contact 117, back contact 118, back contact 119, to wire B6. By referring to FIG. 11A one can see that light 1E will then become illuminated. After the 11*b* contact transfers it can also be seen that the 0E light will become extinguished. These lights are arranged in a bank one behind the other so that the illuminated one will show forth through window 12 of FIG. 3A. The number that will then be evident to the operator will be the 001 number in window 12 which signifies that the read-in system is ready to accept information for the first car. At the same time the transformation in lights occurs, front contact 120 closes creating a potential path for the column fed currents through back contact 121, back contact 122, and back contact 123 to wire N1. By referring to FIG. 11C this same wire N1 connects to terminal 18 on plug coupler PC–M1 and follows through to the memory unit in FIG. 7. Here one can see that the *open* terminal 18 connects to column 1. The entire procedure so far is merely preliminary but essential in relating the read-in information which follows to the core of row 00 and column 1. For clarity in relating this core to the number in the 12 window of FIG. 3A it will be termed the 001 core. If the above procedure is not followed in the manual mode of operation, the 000 core would be the one to receive the read-in information for car No. 1, consequently the whole operation would lag by one number insofar as the cores are concerned. Now we are prepared to start the read-in cycle.

Before the first car's information can be read into the system, the "ADDRESS MANUAL READ-IN" switch 42 (FIG. 3B) must be placed in the "MANUAL READ-IN" position and the "AUTOMATIC LINE ADVANCE" switch 43 (FIG. 3B) should preferably be placed in the "ON" position. This is desirable in order that the operator will not be required to depress the "LINE ADVANCE" push button 41 each time a line or car is read into the system. With the "ADDRESS MANUAL READ-IN" switch 42 in the position indicated, the TN1 and TN2 (transfer Nos. 1 and 2) relays will become energized by the application of positive voltage to wire E3 (see FIGS. 11C and 14E). The front contacts 125 through 132 of the TN1 relay and 133 and 134 of the TN2 relay then close, preparing the read-in circuit for the operation of selection of the track number by depressing the push buttons on the panel of FIG. 3A. Simultaneously, back contacts 135 through 140 on the TN1 relay and 141 and 142 on the TN2 relay open, thereby disabling the push button control to the address relays. Let us now assume that the first car is to be routed to track No. 33. The operator would push the "three" tens button 32 and the "three" units button 34 on the control panel of FIG. 3A. Positive voltage is then applied to the back contact 100 of the SL relay, through the back contact 143 of the LA (line advance) relay to wire J4 in FIG. 14, thence through switch contact 86 on the "ADDRESS MANUAL READ-IN" switch 42 on FIG. 11C which is now closed, thereby applying this positive voltage to the push button common wire (PBC). Upon depression of the aforesaid push buttons, this positive voltage will be transferred to all the multiple contacts on each of these switches. The only circuit paths completed at this time are via wires A1 and A2 which can be traced to FIG 14K, through front contacts 125 on the TN1 relay and 134 on the TN2 relay, to wires T1A1 and U1A2, and finally to the T1RIP and the U1RIP relays respectively. By referring to FIG. 12, one can readily see that these are the proper coded relays for selection of track No. 33. The other contacts on the push button switches serve to energize the proper address relays when the TN1 and TN2 relays are deenergized, but since this is not the present condition of these relays, this path is open-circuited. Upon release of the respective push buttons, the relays T1RIP and U1RIP will not drop out for they are maintained through front contacts 144 and 145 respectively on their own relays. Energy to maintain these relays is supplied on wire H12, through back contact 146 of the LA (line advance) relay, since this wire H12 has positive voltage applied to it when the "AUTOMATIC LINE ADVANCE" switch 43 in the "ON" position (see FIG. 11C). When front contact 147 of the T1RIP relay is closed the 30E lamp will be illuminated, likewise the 3E lamp receives energy through front contact 155 of the U1RIP relay. The complete circuit for the selection of the 30E lamp starts from positive potential on FIG. 14C through back contact 154 of the SL relay, back contact 152 of the RIPS (read-in repeater stick) relay, back contact 153 of the EX (execution) relay, through front contact 147, through back contact 148, back contact 149, back contact 150, and back contact 151, to wire D7 which then transfers to FIG. 11A, thereby lighting lamp 30E. Lamp 3E is illuminated in a somewhat similar manner through the first three back contacts aforementioned, through front contact 155 then through a series of back contacts in a fan arrangement to wire D8 on FIG. 14B which transfers to FIG. 11A where the lamp is located. Consequently, track No. 33 is displayed on the operator's panel FIG. 3A in window 13.

At the same time that the above lamps become energized, front contact 156 of the T1RIP relay closes (FIG. 14F), thereby providing a circuit path through the back contact 157 of the T2RIP relay to wire IT1 which transfers to FIG. 11C and to FIG. 7 via filled terminal 9 of plug coupler PC-2M and finally connecting to the memory unit in preparation to inhibiting digit No. 1. Similarly, digit 5 is prepared for inhibition through front contact 158 of the U1RIP relay (FIG. 14G) and back contact 159 of the U2RIP relay, thence to wire IT5 and finally to digit 5 by way of the two aforementioned figures. By referring to FIG. 14F from wire IT196 other than through front contact 156 again one can see that there is a parallel path to wire IT1 from the inhibit feed cable ITCB, through back contact 160 of the T4RIP relay and front contact 161 of the T5RIP relay. However, at this time this latter front contact is open-circuited. At the same time another back contact 162 on the T1RIP relay is opened, however, this contact is associated with front contact 163 which at this time is also open; consequently, it has no effect in inhibiting digit 3. There is also a parallel path to inhibit digit 3 through back contact 164 of the T3RIP relay, front contact 165 of the T1RIP relay, which is now closed, and back contact 163 of the T5RIP relay, thence to wire IT3. At the same time, front contact 166 of the T1RIP relay will be closed. However, this provides no circuit path inasmuch as front contact 167 is now open. A circuit path is formed in preparation to inhibitiing digit 4 through back contact 168 of the T4RIP relay, back contact 169 of the T3RIP relay, front contact 170 of the T1RIP relay, back contact 171 of the T5RIP relay, thence to wire IT4. All of the above wires mentioned transfer to FIGS. 11 and 7 in a similar manner as wire IT1 mentioned for the inhibition of digit 1. The pattern for the inhibition of digits 5, 7 and 8 is similar to that for digits 1, 3 and 4. The closure of front contacts 158, 172 and 173 respectively will prepare digits 5, 7 and 8 for inhibition. By referring to the code conversion chart FIG. 12, one can ascertain that digits 1, 3, 4, 5, 7 and 8 should be inhibited for the No. 33, therefore the above circuit checks with this tabulation. Having thus prepared the address system to select the proper row and column of the core memory and more recently having selected the proper digits for inhibition we are now ready to apply the currents to the windings 61, 62 and 63 of the memory unit in order to change the state of the cores in accordance with the coded information we desire to store.

Again referring to FIG. 14 one will note that the closure of any one or more contacts in the tens RIP group and in the units RIP group of relays will form a circuit path to the LCL (line cancel) relay. Specifically, when T1RIP and U1RIP were picked up, front contacts 245 and 246, respectively, were closed, thereby completing the circuit path to the LCL relay. This circuit can be followed completely by starting with (+) potential at the "ADDRESS MANUAL READ-IN" switch 42 in FIG. 11C one of whose contacts (83) is closed to wire K12, transferring to FIG. 14C on the same wire, through back contact 247 of the SL relay, back contact 249 of the RIPS relay, back contact 248 of the EX relay, front contact 245 of the T1RIP relay, front contact 246 of the U1RIP relay, back contact 180 of the LA relay, back contact 181 of the RI relay and finally to the coil of the LCL relay.

The energization of the LCL relay closes front contact 182 which results in feeding negative voltage through back contact 184 of the INH (inhibit) relay, through resistors R11F and R11V, to the column feed wire. At the same time front contact 183 closes which results in feeding negative voltage through back contact 185 of the INH relay, through resistors R12F and R12V to the row feed wire. This negative voltage then is applied to column 1 through front contact 120 of the U1 relay, back contact 121 of the U2 relay, back contact 122 of the U3 relay, back contact 123 of the U4 relay to wire N1, transferring to FIG. 11C on the same wire, and finally to FIG. 7 where column 1 is chosen. Similarly, the negative voltage on the row feed wire is applied through back contact 186 of the T1 relay, back contact 187 of the T4 relay, back contact 188 of the T3 relay, and back contact 189 of the T2 relay to wire R00, and following this to the same wire in FIG. 11C thence to FIG. 7 where row 00 is selected in the memory unit. The application of these negative voltages will reset the core at the intersection of row 00 and column 1 to the "zero" state, since the resistors R11V and R12V in the respective feed lines have been adjusted so that a current of 180 milliamperes will flow when the circuit is completed.

By referring to the former paragraph on the operation of the memory unit one will note that this current value of 180 milliamperes is the half current requirement designed to establish one-half the field strength of that required to change a core from the "one" state to the "zero" state. This operation is initially necessary in order to insure that this core 001 will be in the "zero" state prior to reading-in coded information. At the same time, when the LCL relay picks up, front contact 190 will close, completing a circuit path from positive potential through back contact 124 of the LA relay, thereby selecting the INH (inhibit) relay. At the same time, back contact 192 of the LCL relay opens in order to qualify the future operation of the LA relay which as a result of this operation will not become energized by the pick-up of the RI relay and the consequent closing of front contact 206 alone, but will now only be possible when this latter occurs as well as the drop-out of the LCL relay. The energization of the INH relay causes many things to happen. First of all, front contact 193 closes, thereby applying stick voltage through back contact 194 of the LA relay. Also, front contact 195 on the inhibit relay closes to energize the RI relay. A group of front contacts 196 through 203 on the inhibit relay apply negative voltage to the inhibit feed cable ITCB. For example, the circuit path for the negative voltage through front contact 196 via the inhibit feed cable ITCB, through front contact 156 of the T1RIP relay, back contact 157 of the T2RIP relay to wire IT1, through the memory unit digit 1 (see FIG. 7), to the inhibit common wire ITC, through front contact 204 to positive potential is now complete. At this same time, back contacts 184 and 185 will open on the inhibit relay, thus removing the negative cancelling voltage from core 001.

The next relay to be taken under consideration is the RI (read-in) relay which was energized as stated above. Front contact 205 on the RI relay closes, thereby applying stick voltage by an alternate path to the RIP relay group to permit the LA relay to pick-up without losing the RIP relays by the opening of back contact 146. Back contact 181 of the RI relay also opens at this time dropping out the LCL relay. Back contact 174 also opens at this time to prevent the SA relay from becoming energized until other proper conditions have been established. Front contact 206 closes which prepares a circuit path for the pick-up of the LA relay. Front contact 207 closes, thereby applying half current positive potential to the column feed wire through back contact 209, from positive potential. Similarly the closure of front contact 208 applies half current positive potential to the row feed wire through back contact 210 from the (+) potential source. The circuit path for the application of positive voltage to N1 wire and R00 wire can be traced through the fan arrangement of contacts in the units and tens group of relays respectively of the address system in a similar manner to the application of the negative cancelling voltage decribed above. These positive half currents of 180 milliamperes in each feed wire will then be applied to the cores of row 00 and column 1 throughout all eight digits of the memory unit. However, since digits 1, 3, 4, 5, 7 and 8 have been inhibited at this time by negative half current applications, only cores 001 in the digits 2 and 6 will be changed from the "zero" to the "one" state. Verification of this code can be checked by referring to FIG. 12 where it can be seen in the "Code Conversion Chart" that only digits 2 and 6 are transformed into the "one" state for a track number of 33. The chart of FIG. 8A may be helpful in understanding the above operation, except it must be borne in mind that this chart is drawn for core 129 and code 53, otherwise the demonstrated operation is typical. The positive half current path is completed to the row common wire RC and column common wire NC through front contacts 211 and 212, which are now closed, returning to the negative potential side of the battery. After a short time interval beyond the pick-up of the RI relay the LCL relay releases causing back contact 192 to close resulting in the pick-up of the LA relay. When this occurs, front contact 213 closes, thereby providing stick voltage to hold up the LA relay through back contact 214 of the SL relay and back contact 215 of the RIPS relay to wire K12, which can be followed to FIG. 11C, where positive potential is applied to this wire via contact 83 on the "ADDRESS-MANUAL READ-IN" switch 42 when it is in the "MANUAL READ-IN" position. The pick-up of this LA relay does a number of things. Back contact 146 opens but this produces no immediate result except to open one parallel path for the application of stick voltage to the RIP relays. It will be noted at this time that the other path for maintaining the stick voltage is being applied through the front contact 205 of the RI relay as previously described. Likewise, the opening of back contact 180 produces no effect inasmuch as back contact 181 of the RI relay had previously been opened which dropped out the LCL relay. Back contact 124 opens but this also has no effect on the INH relay since this circuit path has already been opened by front contact 190 of the LCL relay. Back contact 194 opens, removing the stick voltage from the INH relay, and since this relay is not energized by any other circuit path at this time it will become deenergized. Back contact 143 will open which will remove positive energy from the push button bus wire J4, so that if any push button had been depressed for this length of time, it will now automatically lose its positive potential. Front contact 216 will become closed preparing a circuit path to the SA relay which will be dealt within in detail later.

Back contacts 209 and 210 will open, thereby removing the positive currents from the column and row feed wires respectively. As stated before, the INH relay has become deenergized, but since this is a slow release type of unit its contacts will not follow the electrical response immediately, but after some relative long time interval compared to the other relays, its contacts will become transferred. When this occurs, front contact 195 will open the positive potential path to the RI relay causing it to become deenergized. Also, the group of front contacts 196 through 204 will open removing the negative inhibit currents from the ferrite core matrix units. Note at this time that back contacts 184 and 185 will again close in preparation for the next read-in cycle. Now returning to the RI relay which has become deenergized its back contact 174 will again close completing a circuit path to the SA (step advance) relay. Under these conditions front contact 205 will be open, thereby removing the stick voltage from the RIP group of relays. This will cause the T1RIP relay and the U1RIP relays to become deenergized. When this occurs the 33 light on panel 3A which had been turned on by their contacts will now become extinguished. Front contact 206 will open the pick-up circuit to the LA relay, however, this relay is still maintained by its stick voltage through front contact 213. Front contacts 207, 208, 211 and 212 will also open preparing the row and column feed circuits to return to their original condition. At this point when the RI relay contacts have returned to the position in which the coil is deenergized the read-in cycle is essentially complete. All that remains to be accomplished is the return of other relays in the system to their normal position and the advance of the address system to the next step, which will now be considered.

The address advance is started by the pick up of the SA (step advance) relay through back contact 174 of the RI relay, front contact 216 of the LA relay, to wire 9, transferring to FIG. 11C on the same wire, through the "AUTOMATIC LINE ADVANCE" switch 43 to positive potential. Front contact 103 of the SA relay will close providing a stick voltage circuit path to the UDR relay, however, since this relay is deenergized at this time the closing of this contact will have no effect. Front contact 101 will also close energizing the SL (step limiting) relay. When this relay is picked-up, back contact 214 will open, thereby removing the stick voltage from the LA relay which will slowly drop out since this is a slow release type. At the same time, front contact 110 closes supplying an alternate path for stick voltage to the UDR relay, but as before this has no effect at the present time. Now when the LA relay contacts finally arrive in their deenergized position, front contact 216 will open removing positive energy from the SA relay and causing it to drop out. Shortly thereafter, back contact 103 of the SA relay will be engaged providing a circuit path through front contact 102 of the SL relay, back contact 104 of the URS relay, back contact 105 of the UDR relay, to the 1B side of the coil of the U4 relay causing it to become energized. It will be "stuck up" through front contact 217 to the stick voltage bus which is energized through back contact 109 of the URS relay. At this time, front contact 114 will close providing a new circuit path for the pick-up of the UDR relay through back contact 218 of the U3 relay, back contact 219 of the U2 relay, and front contact 111 of the U1 relay to back contact 110 of the SL relay, thence to positive voltage. This latter contact has not yet been closed, however, a short time hereafter when the magnetic field within the SL relay becomes dissipated, it will return to its deenergized position completing this energy path to the UDR relay and thereby energizing it. By referring to the sequence chart, FIG. 13A, one can see that when both the U1 and U4 relays are energized, the address system is in a position to accept the information for car No. 2, consequently, we have completed the entire read-in cycle for car No. 1 in the manual mode of operation. A similar operation will be discussed later under the topic of "read-in sequence for typical first and second car destinations" except in this instance the automatic operation from Teletype data will be considered. The sequence chart of FIG. 19, although it applies to the automatic mode of operation, may be helpful for a better understanding of the above manual operation since many of the sequences in relay operation as discussed above are inherent within the system once the manual operation is initiated.

*Read-in memory cancel sequence*

Whenever the operator of this system desires to program a new train of cars into a memory unit, it is desirable to cancel all the existing information which is stored therein. Each core in the ferrite matrix would then be in the "zero" state at the outset. This cancellation can be accomplished either manually by operation of the memory cancel switch 44, or automatically by receipt of the proper Teletype code.

When cancellation is to be effected manually, operation of the memory cancel switch 44, causes (+) energy to be applied to wire F14 on FIG. 11C. By referring to FIG. 14D and following the same wire, one will note that this energizes the MC (memory cancel) relay. In the embodiment of this invention this operation was designed to be deliberate by adding a lock to the switch so as to prevent accidental cancellation of useful information. It is, of course, presumed that a memory unit had been inserted into connectors 46 on the console of the programming unit FIG. 3B before any attempt is made in carrying out a cancellation process. When this relay MC picks up, it closes front contacts 231 through 240 each of which apply a negative 360 milliampere current to all the column wires A10 through K10 of the memory unit, thereby applying $-H_m$ to all cores and returning then to the "zero" state. These column wires A10 through K10 are carried over to FIG. 7. It should be noted that this procedure does not effect the address relays in any manner, which may be advantageous under certain situations. However, if it is desirous to reset the address system, the actuation of the reset push button 36 will apply (+) voltage to the TRS (tens reset) and the URS (units reset) relays simultaneously thereby energizing them through wire F2 which transfers to FIG. 14E.

The automatic sequence can best be followed by referring to FIGURE 18. For this mode of operation the "TELETYPE READ-IN" switch 45 must be placed in the "ON" position. The Teletype operator at some remote point sends forth an "FS" (figure shift), "PERIOD" code which conditions the decoder to accept the next code. These codes are shown in FIG. 12. Normally a tens digit and a units digit will follow this code, but for cancellation purposes a code of "DITTO" "DITTO" (known as the double ditto code) has been established. From FIGURE 18 it can be seen that the first "DITTO" will pick up the T1RI (the tens No. 1 read-in), and the T5RI (tens No. 5 read-in) relays and the second "DITTO" will pick up the U1RI (units No. 1 read-in) and the U5RI (units No. 5 read-in) relays. The circuitry for accomplishing this is shown in FIGURES 11 and 14 where it can be seen that a circuit is completed from (+) voltage, through the "TELETYPE READ-IN" switch contact 84 to wire F1 (See FIG. 11C and 14E), through the front contact 220 of T1RI relay, the back contacts 221, 222 and 223 of T2RI, T3RI and T4RI relays respectively, the front contact 224 and 225 of the T5RI and the U1RI relays respectively, the back contacts 226, 227 and 228 of the U2RI, U3RI and U4RI relays respectively, and the front contacts 229 of the U5RI relay, thence to the TRS and URS coils, through each of these coils, and finally to the negative polarity of the energy source. The front contact 230 of the TRS relay closes a circuit to the MC (memory cancel) relay via wire to the (+) potential source through contact 84 of the "TELETYPE READ-IN" switch 45 on FIG. 11C. When the MC relay is picked up, (−) energy is applied to each column of the ferrite core matrix via front contacts 231 through 240, thereby returning all of the cores to the "zero" state. One other event takes place at the same time. This can be seen by following in the vertical direction the dotted line in FIGURE 18 from the point where the TRS relay is picked up. Let us now make the assumption that a former train which was programmed into the matrix consisted of 130 cars. Under these conditions the 1H (one hundreds) relay and the T3 (tens No. 3) relay will be picked up, and all the units relays will be down or deenergized. The position of these relays for car No. 130 can be verified by referring to the sequence chart for the address relays in FIGURES 13A and 13B. When the TRS and URS relays are picked up, the opening of back contacts 241 and 109 (FIG. 14E) on these respective relays opens the positive potential source which supplied the stick voltage to the tens group (T1 through T4) and the units group (U1 through U4) coils via their own front contacts (e.g. 108 of the U1 relay), thereby allowing them to drop away. At the same time, the back contact 242 of the TRS relay opens, thereby releasing the stick voltage from the 1H relay via front contact 243 and dropping it out. There is another path of the 1H relay to become energized but not under the present conditions for it has just been ascertained that the T1 through T4 group of relays will all be deenergized, therefore the path through T4P (tens No. 4 repeater) relay front contact 244 will be open, since the coil of T4P is tied in parallel to the energy source for the coil of T4 relay. The only other source of energy for the 1H relay is by manual operation, but under the present conditions this is not being considered. The next event which occurs is that of the teletype operator sending the CR (carriage return) code over line 7 of FIG. 1. The decoder 5 in this system is arranged in such a manner that the receipt of the CR code picks up the EX (execution) relay 8. The pick up of this relay performs a number of functions which will be described later but at present only the drop out of the EX relay 8 is of any consequence. This drop-out occurs after a time period which is dependent upon a time constant built into the decoder 5. For a detailed description of this operation and circuitry, see Kendall's patent, No. 2,982,818, dated May 2, 1961. In coincidence with the drop-out of the EX relay 8, any other relays in the T1RI through T5RI and the U1RI through U5RI groups, which were formerly picked up, will also become deenergized. The drop away of the T1RI, T5RI, U1RI and U5RI relays in this instance will cause the URS and TRS relays to also drop away which in turn will cause the MC relay to drop away via the front contact 230 on the TRS relay. This then places all the relays in their initial condition (deenergized) whereupon a new car list can be properly read into the system. It might be well to point out at this time that all the relays in the programming system are not necessarily deenergized, for the normal position of the TDR (tens drive) and the UDR (units drive) relays is the energized position since they are picked up by virtue of the T1 through T4 group and the U1 through U4 group both being deenergized. These groups of relays are known as the address relays and more will be said concerning their function in a subsequent paragraph. Back contacts of each of these relays and a back contact of the SL (step limiting) relay, which is also deenergized, form a path to energize the TDR and UDR relays. For example, a typical circuit through the units group of relays can be traced as follows: the (+) voltage is applied to back contact 110 of the SL relay which being dropped away connects through a back contact 111 of the U1 relay, to back contact 112 of U2, which in turn connects to back contact 113 of U3, and another back contact 114 of U4, all in series, finally arriving at the coil terminal of UDR, through the coil winding, and thence to the negative polarity of the source.

*Read-in memory sequence for typical first and second car destinations*

The proper operation of this memory system and the circuits can best be understood by following a time sequence chart as shown in FIG. 19. When information is fed into the memory system from the Teletype machine, it is necessary to throw the 'TELETYPE READ-IN" switch 45 (on the control panel of FIG. 3B) to the "ON" position. The successful operation of the system also suggests that the cores be preset to the "0" state, which operation has formerly been described under the topic of "Read-in memory cancel sequence." If this cancellation is not accomplished automatic cancellation on each core will be effective as the system progresses, however if the present train has fewer cars than the former, some additional obsolete data will be present in the memory unit.

Let us take the example of requiring the first car in a train to go to classification track No. 33 and the second car to classification track No. 20. In a Teletype system the first characters which are received by the decoder will be an FS (Figure Shift), period, and a 3 code, the latter for the tens digit. This will cause relay T1RI to pick up and only this relay in the tens group. The next character which would be received is another 3 code which will cause the U1RI relay to pick up and only this relay in the units group.

Upon the receipt of the next character CR (carriage return) the EX (execution) relay 8 will be picked up, and because of a front contact 250 closing, the RIPS relay will be picked up and "stuck up" through its own front contact 256 and back contact 257 on the SL relay. The EX relay will pick-up the RIPS relay in this manner when the TRS relay is deenergized, which can be seen from the circuit diagram FIG. 14C and E since back contact 251 on the TRS relay is closed. When the RIPS relay picks up, a front contact 252 will complete a circuit to the tens and units repeater relays. In particular, under these conditions, the T1RIP and the U1RIP relays will be picked up. This selection has occurred because the T1RI and the U1RI relays has, formerly been selected causing front contacts 253 and 254, respectively, to close. Also the pick-up of the EX relay caused all its front contacts to close, including 259.

Shortly after the CR character is received, it will be fed into the system, after which a time constant in the decoder will take effect and control the length of time until the drop-out of the EX (execution) relay. When this occurs, the T1RI and the U1RI relays will also drop out, however, the T1RIP and U1RIP relays will still be energized through front contacts 144 and 145 of these respective relays since the bus supplying (+) voltage to them is energized through back contact 255 of the EX relay from wire F12 (refer to FIG. 11C), and this wire in turn is supplied with (+) potential under the present conditions. The drop-out of the EX relay will cause the SA relay to be picked up by a back contact 250 of the EX relay, since a circuit path is completed from (+) potential, through back contact 251 on the TRS relay, this aforesaid contact 250, and front contact 258 on the RIPS relay. This in turn causes the SL relay to be picked up through a front contact 101 of the SA relay. At the same time, stick voltage is applied to the UDR relay through front contact 103 of the SA relay. When the back contact 257 of the SL relay opens, it will remove stick voltage from the RIPS relay, thereby dropping it out. Since this relay is a slow release type, it will take some time before the contacts reach their deenergized position. At this time, when front contact 258 of RIPS opens, it will remove energy from the SA relay dropping it out.

Since the SL relay is still picked up when the back contact 103 of the SA relay closes, a path will be formed to energize the U1 relay through back contact 107 of the U3 relay, back contact 106 of the U4 relay, front contact 105 of the UDR relay, back contact 104 of the URS relay, front contact 102 of the SL relay, and back contact 103 of the SA relay. When this relay is energized, it is stuck up through its own front contact 108, and back contact 109 of the URS (units reset relay). Now after a relatively long time interval, the SL relay contacts will transfer. When the back contact 247 of the SL relay closes, it will energize the LCL (line cancel) relay through RIPS relay back contact 249, EX relay back contact 248, T1RIP relay front contact 245, U1RIP relay front contact 246, LA relay back contact 180, and RI relay back contact 181. The pick up of this relay (LCL) causes row and column feed currents equivalent to supply a field strength of ($-\frac{1}{2}H_m$) to the memory unit via front contacts 183 and 182 on the LCL relay and back contacts 185 and 184 respectively, of the INH (inhibit) relay. The prior pick-up of the U1 relay in the address system will automatically feed the column cancelling current to column No. 1 of the memory unit via front contact 120 of the U1 relay, back contact 121 of the U2 relay, back contact 122 of the U3 relay, and back contact 123 of the U4 relay to wire N1 which can be traced to FIG. 7. Similarly, cancelling current will be fed to row 00 through back contact 186 of T1 relay, back contact 187 of T4 relay, back contact 188 of T3 relay and back contact 189 of T2 relay to wire R00, which can be traced to FIG. 7, because at this point none of the tens group of address relays have been picked up. When front contact 190 of the LCL relay closes it energized the INH (inhibit) relay. Stick energy is applied to this relay through its front contact 193 and back contact 194 of the LA (line advance) relay. The pick up of the INH relay opens the negative cancelling feed circuit through contacts 184 and 185 and at the same time applies equivalent $-\frac{1}{2}H_m$ currents to the inhibit feed cable through front contacts 196, 197, 198, 199, 200, 201, 202 and 203. This negative inhibit current is applied only to those frames or digits in the memory unit which must be inhibited. By consulting FIG. 12 one can see that digits 1, 3, 4, 5, 7 and 8 must be inhibited for the No. 33. This is accomplished by the contacts of the tens and units read-in repeater relays. For example, to inhibit digit 1, if one starts with the inhibit feed cable ITCB, which has now become energized, entering FIG. 14F at IT196 through front contact 156 of the T1RIP relay, through back contact 157 of the T2RIP relay, thence to the digit No. 1 wire IT1 of the memory unit, the circuit path can be followed. The closing of front contact 195 on the INH (inhibit) relay also picks up the RI (read-in) relay which, in turn, applies equivalent $+\frac{1}{2}H_m$ currents to the row and column feed line through contacts 208 and 207 respectively. At the same time the RI relay is picked up, the opening of its back contact 181 will drop out the LCL relay, and when this occurs the LA (line advance) relay will be picked up through back contact 192 and front contact 206 on the RI relay. This relay will be "stuck up" through its own front contact 213 and back contact 214 of the SL relay and back contact 215 of the RIPS relay, since wire K12 has (+) potential applied to it. By virtue of the LA relay now being picked up, the stick path for the INH relay will be broken through back contact 194 of the LA relay causing it to drop out in a relatively long period of time since this is a slow release type relay. At this same time, when the LA relay is picked up, the row and column feed currents will be turned off through back contacts 210 and 209 respectively, of the LA relay. When the inhibit relay finally drops out the equivalent $(-\frac{1}{2}H_m)$ inhibit currents will be turned off through the group of contacts 196–203 feeding the inhibit cable. At the same time, the RI relay will become deenergized since front contact 195 on the inhibit relay will now be open. Eventually this slow release type of relay will transfer its contacts, so that it will be returned to its original condition.

Let us assume now that a new code is coming in over the Teletype line 7 for the next car. Since we have established that this car shall go to track No. 20, the usual FS "period" code will be followed by a "2," at which time the T1RI, T2RI and T5RI relays will be picked up. This can be determined by again referring to FIG. 12. The next number following shortly thereafter will be the "0" which will pick up the U2RI, U3RI, and the U5RI relays. Now when the CR code comes along, it energizes the EX relay and the RIPS relay in turn as before. When the RIPS relay is picked-up, the stick voltage on the T1RIP and the U1RIP will be opened by back contact 267 causing these relays to drop out. These relays were held up due to conditioning the read-in circuit for the first car, and only now at this time in preparation for incoming information for the second car are they released. However, conditions are now slightly different than they were at the start. One will note that the LA relay is still "stuck up." The pick-up of the RIPS relay the second time opens back contact 215 and breaks the circuit for the stick voltage to the LA relay, thereby dropping it out. At the same time, all of the corresponding tens and units relays (RIP) are picked up in accordance with the code for No. 20 track since the pick-up circuit through front contact 252 on the RIPS relay and front contact 259 on the EX relay is closed. Also at this time all the corresponding tens and units relays (RIP) which were formely selected for track No. 33 will now be reelased since their stick voltage circuit was opened by back contact 255 on the EX relay and back contact 267 on the RIPS relay. All operations of cancelling, inhibit, and read-in currents reoccur as they did for the first car, therefore we will consider only those functions in the address system which will change for the second car.

Under the conditions when the SA relay is deenergized and the SL front contact 102 is still closed, the U4 relay will become energized and "stuck up," similarly to the manner in which U1 was energized, except in this case the energy is being applied through back contact 105 of the UDR relay because at this time it is deenergized. The pick-up of U4 in turn prepares to close a circuit path through its contact 114 to reenergize the UDR relay. This relay will actually become reenergized when the SL relay drops out closing the circuit path from (+) potential, through back contact 110 of the SL relay, front contact 111 of the U1 relay, back contact 219 of the U2 relay, back contact 218 of the U3 relay, front contact 114 of the U4 relay and finally to the coil of UDR. This is then the final condition of the relays as shown in FIG. 19. The UDR (and TDR) relay may be thought of as a commutating relay which is positioned each time the address relays (U1–U4 or T1–T4) are positioned anew, for the purpose of making ready for the next address step. It essentially considers circuit-wise the number of address relays energized, if even numbered UDR (or TDR) will pickup when SL releases, or if odd numbered UDR (or TDR) will release when SL releases.

To summarize this operation, one can see by following the vertical dashed line in FIG. 19 during the time in which the RI (read-in) relay and the INH (inhibit) relay are first picked up, that information is read into the memory unit for car No. 1, since the U1 relay is "stuck up," and at the same time the T1RIP and U1RIP are picked up, consequently track No. 33 will be read into the memory unit for this car at this storage point. For a clearer understanding of the actual functioning of the cores during this read-in process, refer to FIG. 8 wherein a typical example is given for reading-in a destination track No. 53 for car No. 129.

*Read-in memory sequence for typical 99th and 100 car destinations*

FIG. 20 shows a typical sequence chart in which the 99th car of a train has been destined to be routed to track No. 53 and the 100th car to track No. 71. The sequence for reading in information to the memory unit will not be discussed in detail, since it is the same as shown in FIG. 19 for the first car, the only difference being that different tens and units relays are picked-up in accordance with the established codes for track Nos. 53 and 71 and different address relays are initially picked-up, which in this figure would be representative of the 98th car's destination. When the SA relay drops out and the SL relay is still maintained in an energized condition, the U1 relay will be deenergized. This particular operation was not discussed heretofore so by referring to the circuit FIGURE 14D one can trace the circuitry which causes this to happen. At this time it will be noted that the UDR relay is "stuck up" through its own front contact 115 and the SL front contact 110. It will also be noted at this time that the U2 relay is "stuck up" through its front contact 260 through back contact 109 of the URS relay. Under these conditions a path is established from (+) voltage, through back contact 101 of the SA relay, front contact 261 of the SL relay, back contact 262 of the URS relay, front contact 263 of the UDR relay, back contact 264 of the U4 relay, back contact 265 of the U3 relay, and front contact 266 of the U2 relay to the winding finish terminal 4A of U1, through the coil, thence to negative voltage. Since this relay is a combination of two coils each having the same number of turns and resistance in its windings and their direction is the same with respect to each other, and since the positive voltage in this coil is being applied to the finish terminal 4A rather thana the start terminal 4B, this results in neutralizing the magnetic field since it is opposite to the field as established in its mate coil having start terminal 1B and finsh terminal 1A, respectively. Although during the discussion of the pick-up of the U1 relay, this was not discussed, one can note at this time that the positive voltage application to the pick-up coil was to the start terminal 1B rather than the finish terminal 1A, consequently this results in a neutralization of the magnetic fields since we have two windings with the same number of turns but with the current flowing in opposite directions. The application of (+) voltage to the 4A coil terminal will neutralize the magnetic field produced by the other coil even though the voltage is maintained on the other coil through its own stick contact, consequently it will release its armature.

Another situation that shows up in FIG. 20 is that in the event the operator makes an error in the Teletype code, it can be cancelled prior to the sending of the CR code. This is shown after the 99th car information has been read-into the system, where one will note the code FS, "PERIOD," 5 has been started. A short time thereafter code "8" is sent over the wire and at this point the operator, realizing the error, sends code "X." The codes 5 and 8 each establish the pick-up of certain relays in the decoder. "Five," for example, picks up the T5RI relay and the 8 code picks up the U2RI and U3RI relays. When code "X" comes along, these are automatically dropped and a new code is ready to be inserted. The correct code of FS, "PERIOD," 7 then begins, followed by a "1" code. Code 7 picks up T1RI, T2RI and T3RI in accordance with the code as shown in FIG. 12. Code 1 picks up the U1RI, U2RI, U3RI and the U5RI relays. When the EX relay picks up and shortly thereafter when the RIPS relay is resultingly energized both back contacts 255 and 267 on these respective relays will open, thereby removing the (+) stick voltage from the T5RIP relay and the U1RIP relay which had formerly been energized for the 99th car. Since these contacts are in parallel with the voltage source only the latter 267 will actually be directly responsible for clearing the board for the establishment of a new group of RIP relays which will be picked up in accordance with a new code a moment later when the RIPS relay contacts close. The remainder of the operation is standard so we will continue our discussion with the establishment of the address relays.

By referring to FIG. 13 one can see that in order to transfer from the 99th car to the 100th car the U4 and T4 relays will require picking up which will eventually pick up the 1H (one hundreds relay). This can be followed in detail through the circuits of FIGS. 14C and D. When the SA relay drops out and the SL relay is still establishied and since the UDR relay at this time is dropped out, a path will be formed to the U4 relay pick-up coil via back contact 103 of the SA relay, front contact 102 of the SL relay, back contact 104 of the URS relay, back contact 105 of the UDR relay to the 1B terminal of the coil, through the coil to the negative side of the battery. This relay is "stuck up" through its own front contact 217 through back contact 109 of the URS relay. The pick-up of U4 at this time prepares the UDR relay to be picked up through front contact 114 of the U4 relay. At the same time the URS relay (terminal 1B) will be picked up through front contact 268 of the U4 relay, back contact 269 of the U3 relay, front contact 270 of the U2 relay and back contact 271 of the U1 relay thence to positive potential. This relay will also be "stuck up" through its own front contact 272 and a front contact 273 of the SL relay. At this time the stick voltage for the U1 through U4 group of relays is removed from the back contact 109 of the URS relay, to the front contact 274 of the SL relay. The front contact 109 of this URS relay places positive voltage on a circuit through the back contact 275 of TRS relay, back contact 276 of the TDR relay to the 1B terminal of the T4 relay thereby picking it up. It in turn becomes "stuck up" through its front contact 277 since the TRS relay at this time is dropped away, consequently (+) potential is supplied through back contact 241. The pick-up of the T4 relay prepares the TDR relay for pick-up through the front contact 278 of T4. The energization of the TDR relay actually occurs at a later time when the SL relay drops out and closes back contact 280. One will note that the T4P relay is in parallel with the T4 relay therefore it will also be picked up at the same time. At some time prior, the T2P relay had also been picked up in like manner when the T2 relay was picked up. This situation forms a path to pick-up the 1H relay from positive voltage through back contact 285 of the T1 relay, front contact 286 of the T2P relay, back contact 287 of the T3P relay and front contact 244 of the T4P relay. This 1H relay will be "stuck up" through its own front contact 243 and back contact 242 of the TRS relay. When the SL relay drops out, many things happen. Stick voltage is removed from the URS relay since front contact 273 of the SL relay opened. However, at this time the URS relay does not drop out since it is still maintained through its initially established path. Also the UDR relay by virtue of the back contact 111 of the U1 relay, front contact 219 of the U2 relay, back contact 218 of the U3 relay, and front contact 114 of the U4 relay all being closed, from a circuit path energizing the UDR relay. Since the URS relay is still maintained, back contact 109 will remain open and now that the SL relay is dropped away it will open front contact 214 thereby dropping the stick voltage to the group of units relays, consequently U2 and U4 at this time will be released. This action maintains the UDR relay in an energized state. Also the TDR relay will become energized since back contact 280 of the SL relay closed. The preparation of this event was formerly described. Another event which occurs at this same time is that the LCL relay is picked up by back contact 247 of the SL relay closing which establishes the next cycle for reading-in information to the memory unit in the same manner as before. The final event to take place in the address relay system is the drop-out of the URS relay which occurs because of the dropout of the U2 and U4 relays. Either of these latter two relays would open the path to this coil through contact 270 of the U2 relay or contact 268 of the U4 relay. This then is the final condition of the address relay system as shown in the sequence chart of FIG. 20.

*Automatic read-out-typical first, second, third and fourth car sequence*

When switch 53 on FIG. 4B is thrown to the "AUTOMATIC" position and energy is supplied to the read-out system, by throwing switches 56, 57, 58 and 59 to the "ON" position the ROR (read-out rows) relay becomes energized initiating the first cycle. In all cases where the sequence of operation of the relays is important, or in cases where one wishes to note the condition of any relay at a particular time, this can best be understood by referring to the sequence chart FIG. 21. On the other hand, the circuit associated with this sequence chart is shown in FIG. 15. The pick-up of the aforementioned ROR (read-out rows) relay can be followed from positive energy on FIG. 16A through the memory power switch contact 500, which should now be closed, the transistor power switch contact 501, which also should be closed, through wire G8 to back contact 502 of the 00 relay to wire AD7, through switch contact 503 (now in a closed position) to wire AD8, through back contact 504 of the LCS (location code storage) relay, back contact 505 of the DCN ("D" cancellation) relay to wire AD41 transferring to FIG. 15 on this same wire, through back contact 304 of the LAW (line advance-switching) relay, through back contact 305 of the SLW (step limiting-switching) relay and back contact 306 of the ROC (read-out columns) relay and finally to the coil. The pickup of the ROR (read-out rows) relay will pick up the ROC (read-out columns) relay by closing front contact 307 of the ROR relay. When the ROC contacts become transferred it will be "stuck-up" through its own front contact 308 from an energy source through back contact 309 of the LAW relay. By referring to the remarks column on FIG. 21, there is a notation below the pick up of the ROR and ROC relays indicating that no read-out occurs from the 000 core. By referring to FIG. 19 one can check that this condition must result inasmuch as no information was read-into the 000 core. Going back to FIG. 21 the next event which takes place is the deenergization of the ROR relay which occurs when back contact 306 of the ROC relay opens. Since the ROR is a slow release type relay it will drop out in a relatively long period of time compared to the fast release type. When the contacts are transferred, back contact 310 closes completing a circuit path from positive energy through front contact 311 of the ROC relay, through this aforesaid contact, through back contact 312 of the LAW (line advance-switching) relay to the coil of the INHW (inhibit-switching) relay. This event can also be clearly seen by following the vertical dash line of FIG. 21 from the point where the ROR relay drops to the pick-up of the INHW relay. This latter relay closes front contact 313, thereby energizing the RB (read back) relay. This relay, in turn, closes front contact 314 energizing the LAW relay. This LAW relay becomes "stuck up" through its own front contact 315 and back contact 316 of the SLW (step limiting-switching) relay to positive potential. At the same time the LAW relay became energized, back contact 312 opens thereby deenergizing the INHW relay. This is also a slow release type and when its contacts transfer, it will drop the RB relay by opening front contact 313. The RB relay is also a slow release type and when its contacts become transferred several things happen. First, the stick voltage holding the ROC relay in an energized condition is removed by opening front contact 317. Heretofore this stick voltage source had transferred from back contact 309 of the LAW relay, to front contact 317 of the RB relay. Now under present conditions, since the LAW relay remains energized, the only path to positive potential is through contact 317 which is now broken. Secondly, the SAW (step advance-switching) relay at this time becomes energized by virtue of back contact 318 of the RB relay now closing and providing a path to positive potential, through front contact 309 of the LAW relay. The pick up of the SAW relay performs two functions. First, it energizes the SLW relay through front contact 319, and secondly it applies stick voltage to the UDRW (units drive-switching) relay through front contact 320. As can be seen from the sequence chart, the UDRW relay is initially and normally energized in a similar manner to the UDR relay of the read-in programming system. The stick voltage path to the UDRW relay is completed through its own front contact 303. When the SLW relay contacts transfer, positive energy for this stick voltage is applied through front contact 302 of the SLW relay as well as front contact 320 of the SAW relay. The pick-up of this relay is also instrumental in deenergizing the LAW relay by opening its stick circuit through back contact 316. Since this is a slow release type, it causes the SAW relay to eventually drop out by opening front contact 309. The transfer of the contacts on the SAW relay cause the SLW relay to become deenergized by opening front contact 319. This completes the preliminary steps which bypass the 000 core. The next function will be that of setting the address system for car No. 1 and shortly thereafter information will be read-out for this car from the core memory and automatically applied to the storages for the car destinations and subsequently transferred to the automatic switching system.

At the same time, while the contacts of the SLW relay are still closed the U1W (units No. 1-switching) relay becomes energized. Starting with positive potential through back contact 320 of the SAW relay, front contact 321 of the SLW relay, back contact 322 of the URSW (units reset-switching) relay, front contact 323 of the UDRW relay, back contact 324 of the U4W (units No. 4-switching) relay, back contact 325 of the U3W (units No. 3-switching) relay to the positive terminal 1B of the coil through the coil to negative potential, traces the circuit to energize the U1W relay. After the U1W contacts transfer, it will remain "stuck up" through its own front contact 326 and through back contact 327 of the URSW (units reset-switching) relay to positive potential. The pick-up of the U1W relay sets the address system to the 001 core over a path from the row feed cable through back contact 328 of the T1W (tens No. 1-switching) relay, back contact 329 of the T4W (tens No. 4-switching) relay, back contact 330 of the T3W (tens No. 3-switching) relay, back contact 331 of the T2W (tens No. 2-switching) relay, to wire R00W which follows through to FIG. 10C and eventually to FIG. 7 where this feed is applied to row 00 of the core matrix. Similarly, by following the column feed cable through front contact 332 of the U1W (units No. 1-switching) relay, back contact 333 of the U2W (units No. 2-switching) relay, back contact 334 of the U3W (units No. 3-switching) relay, back contact 335 of the U4W (units No. 4-switching) relay, to wire N1W which follows through FIG. 10C and eventually to FIG. 7 where energy is applied to column 1 of the core matrix. When the row and column feed cables become energized later, the address system will now be properly set to select core 001. At the same time the 1E light only becomes illuminated. This can be followed by starting with one side of the line through back contact 336 of the T1W (tens No. 1 repeater-switching) relay, back contact 337 of the T4PW (tens No. 4 repeater-switching) relay, back contact 338 of the T3PW (tens No. 3 repeater-switching) relay, arriving at an open front contact 339 of the T2PW (tens No. 2 repeater-switching) relay. This open circuit, therefore, causes no lights to be illuminated in the tens or hundreds window on the control panel of FIG. 4B. However, the 1E light becomes illuminated in the units window by energy flowing from one side of the line through front contact 340 of the U1W (units No. 1-switching) relay, back contact 341 of the U2PW (units No. 2 repeater-switching) relay, back contact 342 of the U3PW (units No. 3 repeater-switching) relay and back contact 343 of the U4PW (units No. 4 repeater-switching) relay, to wire 1E which carries over to FIG. 23 where the numeral 1 will then show through the window for the units digit. After energy has been removed and a relatively long time interval has elapsed compared with the other relays, the SLW relay contacts will become transferred. The opening of front contact 322 on this relay will remove the stick voltage from the UDRW relay thereby dropping it out. At the same time, a new read-out cycle will start because of the closure of back contact 305 on the SLW relay; consequently the ROR relay will again become energized to start the second cycle.

The energization of the ROR relay will begin the read-out cycle for car No. 1. When the ROR contacts transfer, back contact 345 will open, thereby removing the negative bias from wire 5 of the transistor digital read-out unit (refer to wire 5 of FIG. 9). When the contacts transfer it will close front contacts 350 and 351. The former will supply negative potential through this contact to resistors R11F and R11V to the row feed cable. The variable resistor R11V is adjusted so that a current is established sufficient to produce one-half the field strength necessary for switching the core to the "zero" state. The other end of this row feed cable selects row 00 of the core matrix as heretofore stated. The latter contact 351 of the ROC relay will transfer a similar current to the column feed cable by closure of front contact 352. This ROC relay will be "stuck up" through its own front contact 308 as it was in the prior cycle.

Now that row and column energy have been applied to core 001 of all eight units in the core memory; in particular, the cores which had been switched to the "one" state in the read-in programming procedure will now produce voltages to the input of the transistor digital read-out unit. The cores which are in the "zero" state at this time will produce only small voltages of such a magnitude that they are insufficient to control the output of the digital read-out unit. The schematic diagram for the transistor digital read-out unit is shown in FIG. 9. It consists of a typical PNP type transitsor amplifier 72 and a multivibrator flip-flop circuit 73 both of which are common knowledge in electronics. When the voltage enters the input (wires 1 and 2) it passes through transformer 70 through either diode 71 where it enters the amplifier 72 on the base of transistor 74. Diodes 71 allow only negative going current pulses to be applied to the transistor. Common knowledge in the transistor art tells us that, when a negative going current pulse is applied to a PNP transistor 74, which is connected as shown in FIG. 9, that the output on the collector will be a positive going amplified current pulse. This positive pulse on the output then passes through diode 75 and capacitor 76 to the base of transistor 77 in the multivibrator stage. Here this positive pulse causes transistor 77 to become non-conductive; consequently, transistor 78 will become conductive thereby picking up the ROR relay which is connected across wires 8 and 16 of this digital read-out unit. Note that there is one read-out relay connected across each pair of corresponding terminals in FIG. 10A where the wires 1ROA, 1ROB through 8ROA, 8ROB can be traced to FIG. 15.

Let us now assume that the information which was read into the system for car No. 1, namely, that it was destined for track No. 33, is now read-out of the system. This means that all digits in the memory unit except digits 2 and 6 would have been inhibited. Consequently since only digits 2 and 6 are uninhibited the 001 cores in each of these digits will be switched from the "1" to the "0" state, thereby causing the pick-up of the 2RO and the 6RO relays respectively. This event can be seen clearly by referring to FIG. 21. The pick up of these two read-out relays also picks-up their respective repeater relays. In the case of the 2RO relay there is only one repeater, namely the 2ROP relay. However, in the case of the 6RO relay there are four repeater relays, 6ROP1 through 6ROP4. Each of these repeater relays is "stuck up" through front contacts 353 and 354. By referring to FIG. 15 one can follow the path for the energization of the 33LC relay in the automatic switching system. As formerly stated this relay is assigned to track No. 33 in the classification yard and determines automatically the route the car must follow through the switching system in order to arrive at this track. From the positive potential source, energy is applied to this 33LC relay through back contact 355 of the CTN ("C" storage transfer) relay, back contact 356 of the LCS (location code stick) relay, normally closed push button 349, back contact 357 of the 1ROP (No. 1 read-out repeater) relay, front contact 358 of the 2ROP (No. 2 read-out repeater) relay, back contact 359 of the 3ROP (No. 3 read-out repeater) relay, back contact 360 of the 4ROP (No. 4 read-out repeater) relay, along wide No. 413 to back contact 361 of the 5ROP (No. 5 read-out repeater) relay along wire No. 436 to front contact 362 of the 6ROP3 (No. 6 read-out repeater No. 3) relay, back contact 363 of the 7ROP3 (No. 7 read-out repeater No. 3) relay, and back contact 364 of the 8ROP3 (No. 8 read-out repeater No. 3) to wire 833 which leads to the 33LC relay. This wire is not shown on any other drawing. However, by referring to FIG. 17A there is a cable LCC which leads to the 1LC, 2LC through 79LC group of relays. The 33LC relay is part of this group and therefore the wire 833 is part of this same cable and leads into the 33LC relay which is understood to be part of this group.

The pick up of the 33LC relay can also be seen on the sequence chart FIG. 21. At the same time light 33 is displayed in the "D" window on the panel of the automatic switching system which is represented as block 19 of FIG. 2 due to the 33LC relay being picked-up. In addition, positive potential through back contact 365 of the 1ROP relay, back contact 366 of the 4ROP relay, back contact 367 of the 3ROP relay, and front contact 368 of the 2ROP relay to wire 30E thereby illuminating the 30 light in the testing equipment which is not shown in the embodiment of this invention. The units, or "three" light in this instance, is illuminated by the following circuit. Positive energy is applied through back contact 370 of the 5ROP relay, back contact 371 of the 8ROP1 relay, back contact 372 of the 7ROP1 relay and front contact 373 of the 6ROP1 relay to wire 3E, thereby illuminating the "3" light in the above mentioned test equipment. When the contacts on the 33LC relay (not shown in FIG. 17A) transfer a front contact on this relay will maintain this coil in an energized state through the LCS relay, a front contact 680 of the DSD ("D" storage description) relay, a back contact 681 of the DCN ("D" cancellation) relay and a back contact 682 of the CO (clear out) relay to positive potential. This circuit can be followed in FIG. 17A. The operation is similar no matter which one of the LC relays are selected, e.g., if the 1LC relay were selected then front contact 601 would close and maintain its own relay in an energized state.

In FIG. 21 it will be noted that stick energy is now applied to the 33LC relay. At the same time that the LCS relay is picked up, the CTN ("C" transfer) relay will become energized. This occurs through a circuit path as follows: (Refer to FIG. 16A) from positive potential through back contact 510 of the TC (through coupler) relay, back contact 511 of the CCK (cut check) relay and back contact 512 of the SCC (successive car cancel) relay, front contact 513 of the LCS relay, to back contact 683 of the CSD ("C" storage description) relay. The CTN relay, becomes "stuck up" through its own front contact 684 and front contact 514 on the LCS relay. Now by referring to FIG. 17A it can be seen that the pickup of the CTN relay closes its front contact 685 thereby applying positive potential to back contact 686 of the BTN ("B" storage transfer) relay (shown in FIG. 17B) which energizes the CSD relay (FIG. 17A) through back contact 687 of the CO (clear out) relay and back contact 688 of the CCN ("C" cancellation) to negative potential. The CSD relay becomes "stuck up" through its own front contact 689 and back contact 690 of the BSD ("B" storage description) relay. While this condition is thus maintained let us examine other events which are taking place meanwhile.

Let us examine the point where the ROR relay contacts are actually transferred after the slow release time has been effective to accomplish this as a result of its deenergization by the ROC relay. The reset bias will be turned "ON" by virtue of back contact 345 closing. When this happens the flip-flop multivibrator 73 on all the digital read-out units reverts to its original condition, consequently the ROR relay will be dropped out. At the same time the $-\frac{1}{2}$ currents for the rows and columns will be removed by the opening of front contacts 350 and 351 respectively. At the same time the INHW (inhibit switching) relay will be energized because back contact 310 is now closed. At this time the circuit path is completed through front contact 311 of the ROC relay, this aforesaid contact 310 and back contact 312 of the LAW relay. In the picked-up condition of the INHW relay, front contacts 376 through 383 will be closed, thereby applying negative half ($-\frac{1}{2}$I) currents to the inhibit feed cable IFC. From this cable the proper digits are selected through back contacts 385, 387, 388, 389, 391 and 392 (see FIGS. 15A and 15B) since at this time back contacts 386 and 390 are open. This selection then applies these half currents to these particular digits whose circuits are closed in the memory unit. This can be followed by referring to FIG. 7 and FIG. 15 in this sequence where the common wire returns via K8 through front contact 384 to the positive potential. In many instances it would be helpful to maintain a record of the consist of trains. This is accomplished through the read-back function within the read-out system. The RB (read-back) relay is energized by front contact 313 closing. When the contacts on this relay are transferred front contacts 395 and 396 will be closed completing a positive potential path through back contacts 397 and 398 of the LAW relay, through the aforesaid contacts to the row and column feed cables respectively. This applies positive half currents to the selected row and column according to the contact fan arrangement within both the tens and units group of relays of the address system. In this instance row 00 and column 1 had formerly been selected and this path had previously been traced. It is well to note at this time that front contacts 400 and 401 are also closed completing the circuit path to the negative potential for the row and column common wires H8 and J8 respectively. At the same time the RB relay causes the pick-up of the LAW relay through its front contact 314. As previously explained, this latter relay will be held in an energized position through its own front contact 315 through back contact 316 of the SLW relay. When the contacts on the LAW relay transfer, positive stick voltage is transferred from back contact 309 feeding the ROC relay to front contact 317 of the RB relay. Front contact 309 of LAW prepares a circuit path to pick up the SAW relay the operation of which will be described later. At present back contacts 397 and 398 of the LAW relay open, thereby removing the positive half currents to the row and column feed cables respectivley. At the same time back contact 312 opens, thereby deenergizing the INHW relay. This results in opening contacts 376 through 384 thereby eliminating the inhibit feed currents from the memory unit.

After some relatively long time intervals after the DSD relay becomes deenergized, contacts are finally transferred (see FIG. 17A). This event has occurred during the time the INHW relay is dropping out. The drop out of the DSD relay opens front contact 680 thereby deenergizing the LCS relay and its associated LC relay which is connected in series to it, consequently, the 33LC relay will drop out simultaneously. The drop out of the LCS relay prepares a path for initiating a new read-out cycle by closing back contact 504 (see FIG. 16A).

Since the INHW relay is a slow release type relay, it will eventually transfer its contacts and at that time front contact 313 will open dropping out the RB relay. This is also a slow release type relay, but after some time its contacts will transfer closing back contact 318 completing the circuit path to the SAW relay which will now become energized. At the same time front contact 314 opens; however, this does not drop out the LAW relay inasmuch as it is maintained through its own front contact 315 and back contact 316 of the SLW relay. Front contact 317 also opens removing the stick voltage from the ROC relay which now becomes deenergized and contacts 395 and 396, 400 and 401 of the ROC relay return to their initial position. The drop out of the ROC relay causes the 2ROP and the 6ROP1 through 6ROP4 relays to drop out since the opening of front contact 311 removed positive potential from the ROP stick bus. At this point the read-back information has been completed into the memory unit. An example of this can be followed by referring to FIG. 8 which shows that the cores initially in the "1" state have now been returned to this state and those initially in the "0" state still remain in this state. Specifically, for track No. 33 the 001 cores in digits 2 and 6 are now returned to the "1" state.

Again referring to FIG. 15, when the SAW contacts transfer, front contact 319 will be closed to pick up the SLW relay. When this occurs the LAW relay becomes deenergized through back contact 316 of the SLW relay and finally when its contacts are transferred it drops out the SAW relay by opening front contact 309. At the same instant the stick voltage is removed from the CTN relay by the opening of front contact 393, thereby deenergizing it. This event will be later described in detail. Note at this time that the ROC relay had previously been dropped-out and consequently the ROP relays had also been dropped which indicates that no further storage can take place. Therefore, it is now safe to transfer data into the "B" and "A" storages respectively. Under these conditions the address system again takes one step forward by picking-up the U4W relay through back contact 323 of UDRW, back contact 322, front contact 321 and back contact 320. This relay gets "stuck up" through its own front contact 402 thereby transferring the address system to core 002 preparing the memory unit for the next read-out cycle.

As stated before, the CSD relay is "stuck up" through its own front contact 689 and back contact 690 of the BSD ("B" storage description) relay. When the CSD relay is picked up its front contacts 691 through 697 close the circuits to the CCS1 through CCS7 ("C" code storage No. 1 through No. 7) relays. Contacts (not shown) on these relays will transfer the light numerals 33 to the "C" storage window. In this system where there are more than 64 tracks and less than 128, seven of these relays are required in order for a binary system to count to 79 tracks. By referring to FIG. 22 it is possible to arrive at the proper combination of code storage relays for track 33, which, in this instance, will result in the energization of CCS1 and CCS6 in particular. CCS1 and CCS6 relays were energized because of the selection of the buses feeding them by the front contacts on the 33LC relay (not shown). A front contact 698 energizes the stick voltage bus for this group of relays. The final event which occurs at this time is the pick-up of the CSDP ("C" storage description repeater) relay by the closure of a front contact (not shown) on the CSD relay.

By referring to FIG. 16A front contact 515 of this relay energizes the CCK (cut check) relay through wire AH36, a closed contact 516 on the MANUAL-HOLD-AUTOMATIC switch 53 then to wire BH5 and to the coil. The CCK relay is "stuck up" through its own front contact 517 and back contact 518 on the WC1 (wheel counter binary 1) relay.

When this CCK relay is energized it tells us in essence that we have passed a car's data into the "C" storage and beyond and that we must now make a "cut check" to determine whether or not this car has another coupled to it. At this time it should be noted by referring to FIG. 15D that inasmuch as the LAW relay is still energized, front contact 393 is closed which supplies positive energy to wire AH34 of FIG. 16A and through front contact 539 supplies stick voltage to the CTN relay. This function is required to prevent a flooding of all the storages for the car destination with the same track number since at this time the ROP relays are still energized. Later in the time sequence it will be noted that the ROP relays are deenergized at which time the CTN relay will be allowed to drop out. This event will cause the DSD relay to again become energized through back contact 715 (see FIG. 17A). At the same time the BTN relay will become energized from positive potential through back contact 703, front contact 702, back contact 701, to the coil of the BTN relay. The closure of front contact 716 will energize the BSD relay and thereby transfer the coded information from the CCS group of relays into the BCS group. The selection of the BSD relay will deenergize the CSD relay and when its contacts transfer it will drop out the CSDP relay and the CCS1 relay and the CCS6 relay. This action removes the data stored within the "C" storage group of relays and now since the same data has been transferred to the "B" storage group the BCS1 relay and the BCS6 relay will become energized. A similar transfer operation takes place from the "B" storage group into the "A" storage group. The sequence can readily be followed from FIG. 21 and by following the circuitry of FIG. 17. When the information arrives in the "A" storage group of relays light 33 will be indicated in window A of the destination indicator 19 of FIG. 2. The remaining windows at this time, that is windows B, C and D, will be blank preparing the system for the acceptance of additional information.

The start of the cycle 3 (read-out from core 002) occurs when the SLW relay closes its back contacts in a similar manner by which cycle 2 was initiated. After the ROR and ROC relays are picked up the read-out relays become energized as in the second cycle except in this case let us assume that the car destination will be track No. 20. By referring to the code conversion chart, FIG. 12, one can determine that the 3RO, the 4RO and the 8RO relays become energized for code 20. This, in turn, energizes their respective repeater relays and through the fan arrangement of contacts on the repeater relays the 20LC relay becomes energized. When this occurs the 20 light becomes visible in the D window of the control panel 19. This is a static condition which is represented by the second group for four blocks in FIG. 21. It should be noted at this time that the No. 20 will not transfer automatically from the D into the C and then into the B window, the final one being the first empty window, because at this time the CCK relay is held up. This in essence calls for a cut-length check. Because of back contact 511 on this CCK relay now being open, a complete circuit to energize the CTN relay cannot be formed. The read-out and the read-back function is performed during this cycle in a similar manner to that of cycle 2, and the address system rests ready to read-out core 003 when the D window become empty again. The progression of the automatic system will now cease at this point until a car rolls down the incline from the hump. At a point ahead of the hump retarder a photocell and light beam is introduced across the track so that an approaching car will break this light beam thereby dropping away the LCPC (long cut photocell) relay. From FIG. 16A it can be seen that when back contact 520 on this relay closes it will complete a circuit path to energize the TC (through coupler) relay. Nearby to the light beam, which is installed across the track, a wheel counter treadle switch is located such that the flange of each wheel as it passes over the treadle will cause the switch to close intermittently (one closure for each wheel). When the first wheel closes the treadle switch 521 a circuit path is completed (refer to FIG. 16A) from positive potential through the MANUAL-HOLD-AUTOMATIC switch contact 522 to wire BG5, through the aforesaid switch 521, through front contact 523 of the TC relay to one coil of the WC (wheel counter) relay. When the contacts on this relay are transferred a circuit path is formed from positive potential through back contact 524 of the SCC (successive car cancel) relay, through front contact 525 of the TC relay, front contact 526 of the WC relay, back contact 527 of the WDR (wheel counter drive) relay, back contact 528 of the WC3 (wheel counter binary 3) relay, to the coil of WC1 causing it to become energized. This relay is "stuck up" through its own front contact 529 and front contact 510 of the TC relay to positive potential. At the same time back contact 518 of the WC1 relay will open, thereby removing positive voltage from the stick circuit of the CCK relay which causes it to become deenergized. When the wheel treadle switch 521 opens after a momentary depression by the wheel, the WC relay drops out slowly for it is maintained through front contact 430 of its secondary coil. When its contacts are transferred, back contact 531 closes forming a circuit path through front contact 532 of the WC1 relay, back contact 533 of the WC2 relay, back contact 534 of the WC3 relay, to the WDR coil resulting in its pick-up. When the second wheel of the car comes by the wheel counter treadle switch 521 and closes it, the pick-up of the WC relay at this time applies positive stick voltage energy through front contact 531 of the WC relay and front contact 535 of the WDR relay to maintain the WDR in a held-up condition. At the same time a circuit path is formed to energize the WC3 relay. This is accomplished through back contact 524 of the SCC relay, front contact 525 of the TC relay, front contact 526 of the WC relay, front contact 527 of the WDR relay and finally to the coil of WC3. This relay will also become "stuck up" through its own front contact 536.

The next time the WC relay drops out it will remove stick voltage from the WDR relay causing it to drop out, for at this time the other circuit path to it is open by virtue of back contact 534 of the WC3 relay being open. The next time (wheel No. 3) the WC relay becomes energized it will form a circuit path to pick up the WC2 relay through front contact 528 of the WC3 relay, back contact 527 of the WDR relay, front contact 526 of the WC relay, front contact 525 of the TC relay and back contact 524 of the SCC relay. The WC2 relay likewise will become "stuck up" through its own front contact 537. In a similar manner to the functioning of the WC relay during the time it was operated by wheel No. 1, it will again be released after wheel No. 3 passes over the treadle switch. At this time a circuit path will be formed to reenergize the WDR relay through back contact 531 of the WC relay, front contact 532 of the WC1 relay, front contact 538 of the WC2 relay, and front contact 534 of the WC3 relay to the coil. Shortly thereafter when wheel No. 4 comes along and picks up the WC relay for the fourth time, stick voltage will again be applied to the WDR relay, but at this time it will be noted that the WC3 relay is going to release. This occurs because a circuit path is formed through back contact 540 of the SCC relay, front contact 541 of the TC relay, front contact 542 of the WC relay, and front contact 543 of the WDR relay to the 4A terminal of the coil, through the coil to the 4B terminal, through front contact 544 of the WC2 relay, through front contact 545 of the WC1 relay to negative potential. The two coils on the WC1, WC2 and WC3 relays are each wound with the same number of turns and have equal resistances. Consequently, when positive energy is fed to the 4A terminal it neutralizes the magnetic field of the relay and causes it to drop out in a similar manner to that described for the address system relays in the read-in programming unit.

The next event to occur will be the restoration of the light beam which converges on the photocell after the car has progressed far enough to remove its coupler from the photocell beam thereby again energizing the LCPC relay. This, in turn, causes the TC relay to drop away. When this happens the stick voltage is removed from the bus supplying the WC1, WC2 and WC3 relays by the opening of front contact 510 of the TC relay. Positive voltage is transferred from this contact to back contact 510 completing a circuit path through back contact 511 of the CCK relay, back contact 512 of the SCC relay, front contact 513 of the LCS relay, to wire 38AH5. By referring to FIG. 17A this same circuit can be found on this drawing, so if we continue with wire 38HA5 through back contact 683 of the CSD relay, to the coil of the CTN relay, this relay then becomes energized.

The transfer of information and the 20 light then proceeds from the "D" storage window to the first empty window in direct alphabetical progression in the same manner in which the transfer formerly occurred. At this moment lights for numerals 33 will be displayed in the "A" window and similarly the numerals 20 will be displayed in the "B" window. During the "C" stroage transfer process when the DSD relay contacts transfer, the LCS elay will be dropped out by virtue of front contact 680 n the former relay (DSD) opening (see (FIG. 17A). When the contacts on the LCS are transferred the fourth ead-out cycle is allowed to start because at this time wire AD41 becomes energized through back contact 504 of the CS relay (see FIG. 16A).

Let us now assume that the fourth cycle or third cut onsists of two cars destined for track 64. The read-out ycle proceeds in the same manner as before except that elays 2RO, 3RO, 4RO, 6RO and 8RO become energized or the 64 code. When the 64LC relay becomes energized he numerals 64 will appear in the window "D." The epresentation within the four storage blocks is then in a tatic condition since the storage for car 64 cannot proeed until the wheel counter again comes into operation. At the end of the read-out cycle the address system is advanced to the next step for core 004.

After some time has elapsed the second car which is lesined for track 20 will be released from the hump, and fter the wheel counter determines that this cut consists of nly one car or four wheels the CTN relay again becomes nergized and the 64 storage will be transferred from the D" into the "C" window. When the LCS relay becomes leenergized it starts the next read-out cycle for car No. 4 nd shortly thereafter when the 64LC relay again becomes nergized the numerals 64 appear in the "D" window. This is again a static condition which is shown in the four torages above this point in the sequence chart. After he second code 64 has been completely read-out the address system will be advanced to the next step for core 005.

Just about this time let us assume that the third cut of ars is released from the hump. This cut consists of two ars coupled together which are destined for track 64. The wheel counter will again come into play, however, this ime eight wheels are counted. Just about this time let us lso assume that car No. 1 has advanced down the hump o the point where it picks up the track circuit relay. This emoves the stick voltage from the ASD relay causing it to rop away. When the contacts on this relay are transerred it drops the ACS1 through ACS7 group of relays nd at the same time the ATN relay becomes energized.

When the ACS group of relays drop out the "A" storage vindow becomes empty, consequently making it available or the "B" storage to advance into the "A" storage. The nergization of the ATN relay, in turn, energizes the ASD elay which, in turn, transfers the BCS3 to the ACS3 relay nd the BCS5 to the ACS5 relay respectively. The 20 ghts will then be illuminated in the "A" window. Shortly hereafter a similar operation proceeds, advancing the ghts and information from the "C" storage into the "B" torage and at this time it will be noted that the "C" vindow remains empty. This condition is another static osition of the storages which is indicated at this point in FIG. 21. Meanwhile, the wheel counter has been proceedng. At the point when the seventh count occurs the SCC successive car cancel) relay will become energized. The ount of 7 has been selected for then cars with six wheels an be intermixed with four wheel cars during the humpng operation. At the 7th count it will be noted from FIG. 16B that relay WC1 and WC2 are deenergized and WC3 is energized. Under these conditions positive potenal is applied through front contact 546 of the WC3 relay, ack contact 547 of the WC2 relay and back contact 548 f the WC1 relay to the coil of the SCC relay. The pickp of the SCC relay causes positive potential to be applied hrough front contact 540 of the SCC relay to wire 38AH14.

It will be noted at this time that the LCS relay is still n an energized position therefore the positive energy on vire 38AH14 is transferred through front contact 549 f the LCS relay to the coil of the DCN relay which then ecomes energized. This relay is "stuck up" through its wn front contact 550 for at this time front contact 551 n the LCS relay is closed. When the contacts on the DCN relay are transferred, back contact 681 of this relay opens, thereby removing positive potential from the LCS relay causing it to drop out (refer to FIG. 17A). Since this relay was supplying the stick voltage for the 64LC relay, this latter relay now drops out. When this occurs the 64 lights in storage window "D" will disappear, consequently, this cancels the information for the routing of this second car 64 inasmuch as it will be properly routed by the code now stored in the "B" storage section. Shortly after the eighth wheel count is completed and the car passes beyond the light beam, the through coupler relay again becomes deenergized as before. The wheel counter binary relays at this time again return to the "0" count as shown in FIG. 16B and at the same time the SCC relay will become deenergized by virtue of front contact 546 of the WC3 relay opening. This action causes the DCN relay to lose its stick voltage via front contact 552 by virtue of front contact 540 of the SCC relay now being open. There is another path for stick energy for the DCN relay; however, at this time the LCS relay is also deenergized, therefore front contact 551 of the LCS relay is also open, consequently, the DCN relay becomes deenergized. At this point all the relays within the wheel counter unit and in the read-out programming unit are reset to their initial condition in preparation for the acceptance of a new code.

In connection with the above description of the operation of the system, it should be understood that the operations described are typical of the various operations which may be performed. Also, the sequence charts have been shown to make more definite the typical operation considered, but it should be understood that these charts should not be interpreted as limiting such typical operation with regard to exact times or the like since obviously in practice the relays and associated devices would be constructed with suitable time characteristics to accomplish the functions pointed out without regard to the exact relative timing shown in these charts.

Having described a memory routing system for railroads as one specific embodiment of the present invention, it is desired to be understood that this form is selected to facilitate in the disclosure of the invention rather than to limit the number of forms which it may assume; and it is to be further understood that various modifications, adaptations and alterations may be applied to the specific form shown to meet the requirements of practice and the particular usages of the system, without in any manner departing from the spirit or scope of the present invention.

What we claim is:

1. In a system for receiving and registering codes for the routing of successive cars of a train to selected ones of a plurality of destinations, said codes being formed by code characters characteristic of each of the plurality of destinations of said cars, comprising code receiving means for storing temporarily a plurality of the codes in a predetermined sequence, a permanent and replaceable code storage means to permanently store magnetically in a selected row and column a plurality of code characters characteristic of the destination of each car, line address selection means when activated to select each code stored in the permanent storage means in a predetermined succession, circuit control means governed by the line address selection means operative when initiated to transfer to the code receiving means a code stored in the permanent code storage means for a distinct car, means for manually initiating said circuit control means, a route control means, means controlled by the passage of each successive car through a predetermined location in the route to govern said permanent code storage means to transfer a code to the code receiving means and to govern said route control means to route a car in response to a predetermined one of the codes stored in the code receiving means.

2. In a system according to claim 1 including manual access selection means when distinctively activated to govern the address selection means to cancel a distinct code stored in the permanent storage means, and means operative upon the subsequent inactivation of the access selection means to cause said circuit control means to transfer to the code receiving means each destination in the same sequence subsequent to said distinct destination.

3. In a system for routing a plurality of cars of a train to selected ones of a plurality of destinations, comprising permanent storage means including a plurality of laterally disposed magnetic core matrices having their magnetic condition selectively determined in accordance with the order and destination information of said plurality of cars, route control means for routing said cars in accordance with the destination information transferred thereto by said magnetic core matrices, line address selection means to select in a predetermined sequence from said matrices the destination information for each of said cars, read out circuit means controlled by said magnetic core matrices operative when initiated to transfer to the route control means each bit of destination information for each car in turn as governed by the line address selection means, and means for initiating the operation of the read out circuit means.

4. In a system for routing a plurality of cars of a train to selected ones of a plurality of destinations, comprising permanent storage means including a plurality of magnetic toroids arranged in rows and columns each toroid being capable of having either a positive or negative flux density, car counting means responsive to the passage of each car past a predetermined point, temporary storage means for holding said car destination information until said car counting means determines a number of successive cars having identical destinations, read out circuit means including means for applying current to selected magnetic toroids in the permanent storage means for transferring the destination in the permanent storage means to the temporary storage means for each one of said cars, read back means including means to apply current to the same selected toroids after application of current by said read out means for reverting said toroids to their previous condition prior to the application of current by the read out means, line address means including a decimal counter for selection of the proper row and column of the toroid during operation of said read out and read back means, step advance means to advance said address means to the next predetermined toroid of the permanent storage means, interlocking means to govern said read out means operative only after said step advance means advances to the next predetermined toroid, means operatively connecting said car counting means to the temporary storage means operative to cancel a car destination in the temporary storage means identical to the next preceding destination stored in the temporary storage means, and means responsive to the destination stored in the temporary storage means for the preceding car to route the succeeding car to the identical destination.

5. A system for routing a plurality of cars of a train to selected ones of a plurality of destinations comprising destination information transfer means for controlling the routes required to establish the appropriate destinations for each car, a plurality of magnetic core matrices, each matrix having a plurality of cores selectively conditioned in accordance with the destination for each car, a first line address selection means governed by the destination information transfer means operative to condition selectively cores of each matrix in accordance with the order and destination of said cars, a second line address selection means, read out circuit means for each matrix governed by the second line address selection means and rendered active in response to each car passing a predetermined point to be operated to a distinctive condition as governed by the condition of selected cores in the matrices, means including read back circuit means controlled by said read out means to recondition said selected cores of the magnetic core matrices with the destination data that has been read out by the respective activation of the read out circuit means.

6. In a system for controlling the routing of a plurality of moving cars of a train to selected ones of a plurality of individual destinations, an electro-magnetic storage matrix means capable of having stored therein magnetically in selected rows and columns distinct destination information for each one of said cars, storing means operatively connected to said storage matrix means to store in said matrix means destination information for each of the plurality of cars in a predetermined sequence, circuit means electrically connected operatively to said storage matrix means to sense a stored destination upon the movement of each car past a predetermined point to route the car to the sensed destination, a line address selection means electrically connected operatively to said storage matrix means and said circuit means normally effective to select the rows and columns in a predetermined order to govern said circuit means upon each successive operation thereof to sense the stored destination information commencing with a predetermined car and successive cars in said predetermined sequence, a normally inactive access selection means electrically connected operatively to said line address selection means operative when distinctively activated to govern said read out circuit means to sense a distinct destination stored in said matrix means for a selected car, and means governed by the line address selection means in response to each operation of the circuit means subsequent to the activation of the access means to sense each bit of destination information stored in the storage matrix for cars following the selected car in the same predetermined sequence.

7. In a system according to claim 6 including a correction means to govern said line address selection means to select another destination for a particular individual destination stored in said matrix, and means operatively connecting electrically said correction means and said storing means operative to change a distinct one of said stored destinations as selected by said correction means.

8. In a system according to claim 6 wherein each said storage matrix means comprises a plurality of groups of saturable magnetic cores, said cores of each group being arranged in rows and columns, one group being for each digit of a binary code, conducting means operatively connecting electrically a core of each group to a corresponding core of another group, inhibit circuit means operatively connecting electrically the cores within each group to one another, and means effective to apply energy of opposite polarities to said conducting means and said inhibit means respectively to condition corresponding cores of each group according to a binary code, whereby corresponding cores of said plurality of groups are capable of storing destination information for a respective one of said plurality of cars.

9. In a system according to claim 8 wherein each magnetic core of the matrix means includes a sensing means and said circuit means responds for each of said groups of cores operative upon a car passing said predetermined point to produce an output from said corresponding cores that are in one state only, and a bi-stable device for each of said detection means effective to be operated simultaneously to one of two states in accordance with the output from the associated sensing means.

10. In a system for routing each of a plurality of moving cars of a train in succession to a selected one of a plurality of destinations, a permanent storage means for storing a selected destination for each one of said plurality of cars, storing means operative to store a selected destination in said permanent storage means for each one of said cars, read out circuit means operative upon each successive activation thereof to sense a distinctive destination stored in said storage means for each of said cars in predetermined succession, control means responsive to each activation of said read out means to store destination information for a predetermined number of successive cars, means governed by said control means to activate said read out means when less than said predetermined number of destinations are stored in said control means, detecting means responsive to the passage of a single car past a predetermined point to cancel the destination information for a single car from said control means, sensing means responsive to the passage of adjacent successive cars operative to determine identical destinations for the said adjacent cars, means controlled by said sensing means operative to cancel in said control means all but one of said identical destinations stored in said control means for said adjacent cars, and routing means responsive to said one remaining stored destination in said control means operative to route said adjacent successive cars to the identical destination.

References Cited by the Examiner

UNITED STATES PATENTS

| | | | |
|---|---|---|---|
| 2,194,352 | 3/40 | Brixner | 246—2 |
| 2,533,326 | 12/50 | Putt | 340—147 |
| 2,549,071 | 4/51 | Dusek | 340—174 |
| 2,691,152 | 10/54 | Williams | 178—23 |
| 2,700,728 | 1/55 | Brixner | 246—2 |
| 2,719,962 | 10/55 | Karnaugh | 178—23 |
| 2,736,880 | 2/56 | Forrester | 340—174 |
| 2,784,391 | 3/57 | Rajchman et al. | 340—174 |
| 2,814,031 | 11/57 | Davis | 340—174 |
| 2,863,991 | 12/58 | Mishelevich | 246—2 |
| 2,941,068 | 6/60 | Karlet et al. | 246—2 |
| 3,005,092 | 10/61 | Tsiang | 246—2 |

EUGENE G. BOTZ, *Primary Examiner.*

JAMES S. SHANK, LEO QUACKENBUSH, *Examiners.*